US008712667B2

(12) United States Patent
Nakano et al.

(10) Patent No.: US 8,712,667 B2
(45) Date of Patent: Apr. 29, 2014

(54) AIR-FUEL RATIO CONTROL APPARATUS FOR AN INTERNAL COMBUSTION ENGINE

(75) Inventors: Tomohiro Nakano, Nagoya (JP); Takahiko Fujiwara, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 245 days.

(21) Appl. No.: 13/320,666

(22) PCT Filed: May 21, 2009

(86) PCT No.: PCT/JP2009/059729
§ 371 (c)(1), (2), (4) Date: Nov. 15, 2011

(87) PCT Pub. No.: WO2010/134209
PCT Pub. Date: Nov. 25, 2010

(65) Prior Publication Data

US 2012/0060805 A1 Mar. 15, 2012

(51) Int. Cl.
*B60T 7/12* (2006.01)

(52) U.S. Cl.
USPC ............................ 701/103; 701/108; 123/672

(58) Field of Classification Search
USPC ................. 701/103–105, 108, 109, 114, 115; 123/672
See application file for complete search history.

(56) References Cited

U.S. PATENT DOCUMENTS

| | | | | |
|---|---|---|---|---|
| 8,230,846 | B2 * | 7/2012 | Fujiwara et al. | 123/696 |
| 2001/0022081 | A1 | 9/2001 | Oguma et al. | |
| 2006/0242948 | A1 | 11/2006 | Nakagawa | |

FOREIGN PATENT DOCUMENTS

| | | | |
|---|---|---|---|
| DE | 601 11 906 | T2 | 6/2006 |
| DE | 10 2006 000 199 | A1 | 11/2006 |
| EP | 1 130 239 | A2 | 9/2001 |
| JP | A-5-248285 | | 9/1993 |
| JP | A-2003-304015 | | 10/2001 |
| JP | A-2004-84537 | | 3/2004 |
| JP | A-2005-171982 | | 6/2005 |
| JP | A-2006-307704 | | 11/2006 |
| JP | A-2008-95598 | | 4/2008 |
| JP | A-2008-255964 | | 10/2008 |
| WO | WO 2008/126845 | A1 | 10/2008 |

OTHER PUBLICATIONS

International Search Report issued in International Application No. PCT/JP2009/059759 dated Jun. 30, 2009 (with translation).

* cited by examiner

*Primary Examiner* — John Kwon
(74) *Attorney, Agent, or Firm* — Oliff PLC

(57) ABSTRACT

A air-fuel ratio control apparatus, applied to an internal combustion engine having a catalyst disposed in an exhaust passage of the engine, includes a downstream air-fuel ratio sensor (oxygen concentration cell type oxygen concentration sensor) disposed at a position downstream of the catalyst, and air-fuel ratio control means for controlling, based on an output value of the downstream air-fuel ratio sensor, an air-fuel ratio of a mixture supplied to the engine so as to change an air-fuel ratio of a catalyst inflow gas. Further, the air-fuel ratio control means controls the air-fuel ratio of the mixture supplied to the engine.

19 Claims, 35 Drawing Sheets

Case in which oxygen storage amount is small.

Case in which oxygen storage amount is large.

Case in which oxygen storage amount is large.

Case in which oxygen storage amount is small.

AIR-FUEL RATIO CONTROL APPARATUS FOR AN INTERNAL COMBUSTION ENGINE

TECHNICAL FIELD

The present invention relates to an air-fuel ratio control apparatus for an internal combustion engine comprising a catalyst in an exhaust passage.

BACKGROUND ART

Conventionally, a three-way catalyst is disposed in an exhaust passage of an internal combustion engine in order to purify an exhaust gas discharged from the engine. As is well known, the three-way catalyst has an "oxygen storage function" for storage or release oxygen depending on components included in a gas flowing into the three-way catalyst. Hereinafter, the three-way catalyst is also simply referred to as a "catalyst", and the gas flowing into the catalyst may also be referred to as a "catalyst inflow gas".

A conventional air-fuel ratio control apparatus (conventional apparatus) comprises a downstream air-fuel ratio sensor disposed downstream of the catalyst in the exhaust passage of the engine. The conventional apparatus obtains a "base fuel injection amount to have an air-fuel ratio of a mixture supplied to the engine coincide with (becomes equal to) a stoichiometric air-fuel ratio" based on an air amount introduced into a cylinder, and corrects the base fuel injection amount base on at least an output value of the downstream air-fuel ratio sensor.

More specifically, the downstream air-fuel ratio sensor is an oxygen concentration sensor of an oxygen concentration cell type, and outputs an output value Voxs (refer to FIG. 3). The output value Voxs of the downstream air-fuel ratio sensor becomes (reaches) a maximum output value Vmax when an air-fuel ratio of a gas flowing out from the catalyst (hereinafter, also referred to as a "catalyst outflow gas") is smaller than the stoichiometric air-fuel ratio (i.e., richer than the stoichiometric air-fuel ratio), that is, when an excessive amount of the oxygen is not included in the catalyst outflow gas. The "case in which the excessive amount of oxygen is not included in the catalyst outflow gas" means a case in which the oxygen is insufficient, and unburnt substances remain as a result of a combination of "the unburnt substances and the oxygen" both included in the catalyst outflow gas. In other words, the "case in which the excessive amount of the oxygen is not included in the catalyst outflow gas" means a case in which an amount of the oxygen included in the catalyst outflow gas is smaller than an amount necessary to oxidize all of the unburnt substances included in the catalyst outflow gas.

Further, the output value Voxs of the downstream air-fuel ratio sensor becomes (reaches) a minimum output value Vmin when the air-fuel ratio of the catalyst outflow gas is larger than the stoichiometric air-fuel ratio (i.e., leaner than the stoichiometric air-fuel ratio), that is, when an excessive amount of the oxygen is included in the catalyst outflow gas. The "case in which the excessive amount of the oxygen is included in the catalyst outflow gas" means a case in which the unburnt substances disappears (are consumed), and the oxygen remains as a result of the combination of "the unburnt substances and the oxygen" both included in the catalyst outflow gas. In other words, the "case in which the excessive amount of the oxygen is included in the catalyst outflow gas" means a case in which an amount of the oxygen included in the catalyst outflow gas is larger than the amount necessary to oxidize all of the unburnt substances included in the catalyst outflow gas.

In this manner, the output value becomes the minimum output value Vmin when the excessive amount of the oxygen is included in the catalyst outflow gas, and the output value becomes the maximum output value Vmax when the excessive amount of the oxygen is not included in the catalyst outflow gas. Accordingly, it is assumed that the air-fuel ratio of the catalyst outflow gas coincides with the stoichiometric air-fuel ratio, when the output value Voxs is equal to a "value Vmid which is a middle value (mid-value, mean value) between the maximum output value Vmax and the minimum output value Vmin (i.e., the middle value Vmid=(Vmax+Vmin)/2)".

In view of the above, the conventional apparatus calculates an air-fuel ratio feedback amount according to a proportional-integral control (PI control) and the like in such a manner that the output value Voxs of the downstream air-fuel ratio sensor becomes equal to (coincides with) a "target downstream-side value Voxsref which is set at a value corresponding to the stoichiometric air-fuel ratio (that is, the middle value Vmid)". The air-fuel ratio feedback amount is also referred to as a "sub feedback control amount", for convenience. The conventional apparatus corrects the base fuel injection amount based on the sub feedback amount to thereby control the air-fuel ratio of the mixture supplied to the engine, so that it controls the air-fuel ratio of the catalyst inflow gas (refer to, for example, Japanese Patent Application Laid-Open (kokai) No. 2005-171982).

SUMMARY OF THE INVENTION

FIG. 39 is a timing chart describing the air-fuel ratio control by the "conventional apparatus described above" and an "air-fuel ratio control apparatus according to the present invention (hereinafter, also simply referred to as a "present apparatus"), using broken lines and solid lines, respectively. In the example shown in FIG. 39, the output value Voxs of the downstream air-fuel ratio sensor changes from a value smaller than the middle value Vmid to a value larger than the middle value Vmid at time t0. As described above, the conventional apparatus set the target downstream-side value Voxsref at (or to) the middle value Vmid.

Accordingly, since the output value Voxs becomes larger than the middle value Vmid after the time t0, the sub feedback amount calculated by the conventional apparatus becomes a value which decreases the base fuel injection amount (value which makes a decreasing-correction on the base fuel injection amount). As a result, the air-fuel ratio of the catalyst inflow gas is controlled so as to be an air-fuel ratio leaner than the stoichiometric air-fuel ratio. Hereinafter, an air-fuel leaner than the stoichiometric air-fuel ratio may also be simply referred to as a "lean air-fuel ratio".

Consequently, an excessive amount of the oxygen is included in the catalyst outflow gas, and therefore, an amount (hereinafter, also referred to as an "oxygen storage amount OSA") of oxygen stored in the catalyst increases. When the oxygen storage amount OSA is relatively small, the catalyst can store the oxygen efficiently. Accordingly, if the oxygen storage amount OSA is relatively small at the time t0, most of the excessive oxygen included in the catalyst inflow gas is stored in the catalyst after the time t0. As a result, a state in which the oxygen is not included in the catalyst outflow gas continues, and therefore, the output value Voxs of the downstream air-fuel ratio sensor continues to increase toward the maximum output value Vmax.

When and after the oxygen storage amount OSA of the catalyst reaches a predetermined upper limit value CHI at time t1, the catalyst can no longer store the oxygen efficiently.

Accordingly, a relatively large amount of the oxygen starts to be included in the catalyst outflow gas. Consequently, the output value Voxs of the downstream air-fuel ratio sensor starts to decrease toward the minimum output value Vmin from time t2 which is immediately after the time t1.

However, in a period from the time t2 to time t5 which is after the time t2, the output value Voxs is larger than the middle value Vmid (the target downstream-side value Voxsref used in the conventional apparatus), and therefore, the sub feedback amount continues to be the value which decreases the base fuel injection amount. Consequently, the oxygen storage amount OSA continues to increase after the time t2, and reaches a "maximum oxygen storage amount Cmax which is the largest value of the oxygen storage amount OSA of the catalyst" at time t4 which is before the time t5.

At that moment, the air-fuel ratio of the catalyst inflow gas is leaner than the stoichiometric air-fuel ratio, and therefore, the air-fuel ratio of the mixture supplied to the engine is leaner than the stoichiometric air-fuel ratio. Accordingly, a large amount of NOx (nitrogen oxide) is included in the catalyst inflow gas. However, since the oxygen storage amount OSA reaches the maximum oxygen storage amount Cmax, the catalyst can not purify the NOx sufficiently. As a result, in a period from the time t4 to the time t5, there may be a case in which a relatively large amount of NOx is discharged to a position downstream of the catalyst. As described, there is a case in which the conventional apparatus makes the "decreasing-correction on the fuel injection amount" which is unnecessary for an exhaust gas purifying operation of the catalyst (refer to regions hatched in FIG. 39). In other words, according to the conventional apparatus, the air-fuel ratio of the catalyst inflow gas is controlled/adjusted to an air-fuel ratio leaner than an air-fuel ratio (hereinafter, also referred to as a "required air-fuel ratio of the catalyst inflow gas") which is necessary to maintain an efficiency of the exhaust gas purification of the catalyst at a good value.

Meanwhile, when the output value Voxs of the downstream air-fuel ratio sensor is smaller than the "target downstream-side value which is set at (or to) the middle value Vmid", the sub feedback amount calculated by the conventional apparatus becomes a value which increases the base fuel injection amount (value which makes an increasing-correction on the base fuel injection amount). As a result, the air-fuel ratio of the catalyst inflow gas is controlled so as to be an air-fuel ratio richer than the stoichiometric air-fuel ratio. Hereinafter, an air-fuel richer than the stoichiometric air-fuel ratio may also be simply referred to as a "rich air-fuel ratio".

Consequently, an excessive amount of the unburnt substances (CO, HC, $H_2$, or the like) are included in the catalyst inflow gas, and therefore, the oxygen which has been stored in the catalyst is used to purify the unburnt substances. Accordingly, the oxygen storage amount OSA decreases. However, when the oxygen storage amount OSA of the catalyst is relatively large, the oxygen included in the catalyst inflow gas flows out to the position downstream of the catalyst without change. Further, an amount of the unburnt substances, which are sufficiently large to consume oxygen remaining in the vicinity of the downstream air-fuel ratio sensor or in a diffusion resistance layer of the downstream air-fuel ratio sensor, do not flow out to the position downstream of the catalyst Consequently, the output value Voxs of the downstream air-fuel ratio sensor continues to be a value close to the minimum output value Vmin.

Thereafter, when the oxygen storage amount OSA of the catalyst decreases down to a predetermined lower limit value CLo (<CHi), the catalyst starts to store the oxygen included in the catalyst inflow gas and can not completely purify the unburnt substances included in the catalyst inflow gas. Accordingly, the oxygen is not included in the catalyst outflow gas, and a relatively large amount of the unburnt substances begin to be included in the catalyst outflow gas. These unburnt substances consume the oxygen remaining in the vicinity of the downstream air-fuel ratio sensor or in the diffusion resistance layer of the downstream air-fuel ratio sensor. Consequently, the output value Voxs of the downstream air-fuel ratio sensor starts to change from a value close to the minimum output value Vmin to a value close to the maximum output value Vmax.

However, for a while after that point in time, the output value Voxs is smaller than the target downstream-side value Voxsref (middle value Vmid), and therefore, the sub feedback amount according to the conventional apparatus continues to be the value which increases the base fuel injection amount. Consequently, the oxygen storage amount OSA of the catalyst continues to decrease to reach "0".

At that moment, the air-fuel ratio of the catalyst inflow gas is richer than the stoichiometric air-fuel ratio, and therefore, the air-fuel ratio of the mixture supplied to the engine is richer than the stoichiometric air-fuel ratio. Accordingly, a large amount of the unburnt substances are included in the catalyst inflow gas. In addition, since the oxygen storage amount OSA reaches "0", the catalyst can not purify the unburnt substances sufficiently. As a result, there may be a case in which a relatively large amount of the unburnt substances are discharged to the position downstream of the catalyst. As described, there is a case in which the conventional apparatus makes the "increasing-correction on the fuel injection amount" which is unnecessary for the exhaust gas purifying operation of the catalyst. In other words, according to the conventional apparatus, the air-fuel ratio of the catalyst inflow gas is controlled/adjusted to an air-fuel ratio richer than the "required air-fuel ratio of the catalyst inflow gas".

The present invention is made to cope with the problems described above. That is, one of objects of the present invention is to provide an air-fuel ratio control apparatus for an internal combustion engine, which controls the "air-fuel ratio of the mixture supplied to the engine" in such a manner that an actual air-fuel ratio of the catalyst inflow gas coincides with (becomes equal to) the "required air-fuel ratio of the catalyst inflow gas" as much as possible, to thereby be able to further improve emissions. In addition, another object of the present invention is to provide the air-fuel ratio control apparatus capable of avoiding worsening the emissions, even when the maximum oxygen storage amount Cmaxis lowered by reducing an amount of precious metals supported by the catalyst.

The inventors have found the followings. The temporal change (change through time, or rate of change) in the output value Voxs of the downstream air-fuel ratio sensor represents a state of the catalyst (oxygen storage state). Accordingly, it is possible to have the air-fuel ratio of the catalyst inflow gas coincide with the "required air-fuel ratio of the catalyst inflow gas", by controlling the "air-fuel ratio of the catalyst inflow gas (that is, air-fuel ratio of the mixture supplied to the engine)" based on the temporal change in the output value Voxs of the downstream air-fuel ratio sensor.

Next will be described the reason why the temporal change in the output value Voxs of the downstream air-fuel ratio sensor represents the "state of the catalyst", for each of various cases.

(1) In a case in which a combustion gas whose air-fuel ratio is leaner than the stoichiometric air-fuel ratio is supplied to the catalyst which is in a state in which the oxygen storage amount OSA of the catalyst is smaller than or equal to the lower limit value Up (i.e., a certain value close to "0")

described above (that is, the catalyst in a state in which the oxygen is short, or oxygen-shortage-catalyst).

In this case, as conceptually (schematically) shown in FIG. 4, the "unburnt substances (HC, and the like)" and the "excessive oxygen ($O_2$)" are included in the combustion gas which is the catalyst inflow gas. The oxygen combines with oxygen storage component in the catalyst 43 to thereby be stored in the catalyst 43. The unburnt substances combine with "the oxygen included in the catalyst inflow gas or the oxygen remaining in the catalyst 43". In this manner, the oxygen included in the catalyst inflow gas is stored or consumed in the catalyst 43, and therefore, the oxygen does not exist in the catalyst outflow gas. Consequently, the output value Voxs of the downstream air-fuel ratio sensor becomes the value in the vicinity of the maximum output value Vmax.

(2) In a case in which the combustion gas whose air-fuel ratio is leaner than the stoichiometric air-fuel ratio is continued to be supplied to the catalyst, and thereby, the oxygen storage amount OSA becomes larger than or equal to the upper limit value CHi described above (that is, the oxygen storage amount OSA reaches a value in the vicinity of the maximum oxygen storage amount Cmax).

In this case, as conceptually (schematically) shown in FIG. 5, the "unburnt substances" and the "excessive oxygen" are included in the catalyst inflow gas which is the combustion gas. At this moment, an available capacity of the catalyst 43 to store the oxygen is small, and therefore, a part of the oxygen included in the catalyst inflow gas is stored in the catalyst 43, but a considerable amount of the rest of the oxygen included in the catalyst inflow gas starts to flow out to the position downstream of the catalyst 43. The unburnt substances combine with the "oxygen stored in the catalyst 43". Accordingly, the catalyst outflow gas starts to include the excessive oxygen. Consequently, the output value Voxs of the downstream air-fuel ratio sensor rapidly decreases toward the minimum output value Vmin, and thereafter, reaches the minimum output value Vmin.

As is understood from the description above, when the output value Voxs of the downstream air-fuel ratio sensor starts to decrease from the value in the vicinity of the maximum output value Vmax while the combustion gas whose air-fuel ratio is leaner than the stoichiometric air-fuel ratio is being supplied to the catalyst, the oxygen storage amount OSA of the catalyst is considerably large. Accordingly, it is not appropriate to supply a "gas whose air-fuel ratio is leaner than the stoichiometric air-fuel ratio" to the catalyst under this state. In other words, when the output value Voxs of the downstream air-fuel ratio sensor rapidly decreases, the "required air-fuel ratio of the catalyst inflow gas" is the stoichiometric air-fuel ratio or richer than the stoichiometric air-fuel ratio.

(3) In a case in which a combustion gas whose air-fuel ratio is richer than the stoichiometric air-fuel ratio is supplied to the catalyst which is in a state in which the oxygen storage amount OSA is larger than or equal to the upper limit value CHi described above (that is, the catalyst in a state in which the oxygen is excessive (redundant), or oxygen-excessive-catalyst).

In this case, as conceptually (schematically) shown in FIG. 6, the "excessive (amount of) unburnt substances" and the "oxygen" are included in the catalyst inflow gas which is the combustion gas. The unburnt substances combine with "the oxygen stored in the catalyst 43". Accordingly, the oxygen included in the catalyst inflow gas passes through the catalyst 43, and flows out to the position downstream of the catalyst 43. Consequently, the output value Voxs of the downstream air-fuel ratio sensor becomes the value in the vicinity of the minimum output value Vmin.

(4) In a case in which the combustion gas whose air-fuel ratio is richer than the stoichiometric air-fuel ratio is continued to be supplied to the catalyst, and thereby, the oxygen storage amount OSA becomes smaller than or equal to the lower limit value CLo described above (that is, the oxygen storage amount OSA reaches a value in the vicinity of "0").

In this case, as conceptually (schematically) shown in FIG. 7, the "excessive unburnt substances" and the "oxygen" are included in the catalyst inflow gas which is the combustion gas. At this moment, an available capacity of the catalyst 43 to provide the oxygen which has been stored in the catalyst 43 to the unburnt substances is small, and therefore, a part of the unburnt substances included in the catalyst inflow gas combine with the "oxygen stored in the catalyst 43" and another part of the unburnt substances included in the catalyst inflow gas combine with the "oxygen included in the catalyst inflow gas", but a considerable amount of the rest of the unburnt substances included in the catalyst inflow gas start to flow out to the position downstream of the catalyst 43. Accordingly, the oxygen is not included in the catalyst outflow gas, and the unburnt substances start to be included in the catalyst outflow gas. Consequently, the output value Voxs of the downstream air-fuel ratio sensor rapidly increases toward the maximum output value Vmax, and thereafter, reaches the maximum output value Vmax.

As is understood from the description above, when the output value Voxs of the downstream air-fuel ratio sensor starts to increase from the value in the vicinity of the minimum output value Vmin while the combustion gas whose air-fuel ratio is richer than the stoichiometric air-fuel ratio is being supplied to the catalyst, the oxygen storage amount OSA of the catalyst is considerably small. Accordingly, it is not appropriate to supply a "gas whose air-fuel ratio is richer than the stoichiometric air-fuel ratio" to the catalyst under this state. In other words, when the output value Voxs of the downstream air-fuel ratio sensor rapidly increases, the "required air-fuel ratio of the catalyst inflow gas" is the stoichiometric air-fuel ratio or leaner than the stoichiometric air-fuel ratio.

The air-fuel ratio control apparatus for an internal combustion engine according to the present invention based on the above views is applied to the internal combustion engine having the catalyst disposed in the exhaust passage, and comprises:

a downstream air-fuel ratio sensor disposed in the exhaust passage at a position downstream of the catalyst, the downstream air-fuel ratio sensor being an oxygen concentration cell type sensor; and air-fuel ratio control means for controlling an "air-fuel ratio of the mixture supplied to the engine" so as to change an air-fuel ratio of a "catalyst inflow gas" which is a gas flowing into the catalyst", based on an output value of the downstream air-fuel ratio sensor.

The downstream air-fuel ratio sensor is configured so as to output the "maximum output value Vmax" when an amount of oxygen included in a "catalyst outflow gas which is a gas flowing out from the catalyst" is smaller than an "amount necessary to oxidize unburnt substances included in the catalyst outflow gas", and so as to output the "minimum output value Vmin" when the amount of oxygen included in the catalyst outflow gas is larger than the "amount necessary to oxidize the unburnt substances included in the catalyst outflow gas".

Further, the air-fuel ratio control means controls the air-fuel ratio of the mixture supplied to the engine in such a manner that the "air-fuel ratio of the catalyst inflow gas" becomes an "air-fuel ratio richer than the stoichiometric air-fuel ratio" when the output value of the downstream air-fuel ratio sensor decreases (i.e., when it is becoming smaller with time), and in such a manner that the "air-fuel ratio of the catalyst inflow gas" becomes an "air-fuel ratio leaner than the stoichiometric air-fuel ratio" when the output value of the downstream air-fuel ratio sensor increases (i.e., when it is becoming larger with time). This feedback control on the air-fuel ratio is referred to as a "normal air-fuel ratio control".

As described above, in a case in which the output value of the downstream air-fuel ratio sensor is relatively rapidly decreasing, the oxygen storage amount OSA of the catalyst is not an amount in the vicinity of "0", but rather has increased to a value in the vicinity of the maximum oxygen storage amount Cmax, even when the output value of the downstream air-fuel ratio sensor is larger than the middle value Vmid. Accordingly, when the output value Voxs of the downstream air-fuel ratio sensor is decreasing (more specifically, when a magnitude of the change rate of the output value of the downstream air-fuel ratio sensor is larger than or equal to a "predetermined first change rate threshold equal to 0, or a predetermined first change rate threshold larger than 0"), the required air-fuel ratio of the catalyst inflow gas is an air-fuel ratio richer than the stoichiometric air-fuel ratio.

Accordingly, the above configuration allows the "air-fuel ratio of the catalyst inflow gas" to be set at (to) an "air-fuel ratio richer than the stoichiometric air-fuel ratio" at a point in time before the oxygen storage amount OSA reaches the maximum oxygen storage amount Cmax, so that the oxygen storage amount OSA can be started to be decreased (refer to the solid lines before the time t3 shown in FIG. 39). That is, unlike the conventional apparatus, the apparatus of the present invention does not make the unnecessary decreasing-correction on the fuel injection amount. Consequently, the apparatus of the present invention can prevent a large amount of NOx from being flowed out to the position downstream of the catalyst.

Further, as described above, in a case in which the output value of the downstream air-fuel ratio sensor is relatively rapidly increasing, the oxygen storage amount OSA of the catalyst is not an amount in the vicinity of the maximum oxygen storage amount Cmax, but rather has decreased to a value in the vicinity of "0", even when the output value of the downstream air-fuel ratio sensor is smaller than the middle value Vmid. Accordingly, when the output value Voxs of the downstream air-fuel ratio sensor is increasing (more specifically, when the magnitude of the change rate of the output value of the downstream air-fuel ratio sensor is larger than or equal to "a predetermined second change rate threshold equal to 0, or a predetermined second change rate threshold larger than 0"), the required air-fuel ratio of the catalyst inflow gas is an air-fuel ratio leaner than the stoichiometric air-fuel ratio.

Accordingly, the above configuration allows the "air-fuel ratio of the catalyst inflow gas" to be set at (to) an "air-fuel ratio leaner than the stoichiometric air-fuel ratio" at a point in time before the oxygen storage amount OSA reaches "0", so that the oxygen storage amount OSA can be started to be increased (refer to the solid lines after the time t7 shown in FIG. 39). That is, unlike the conventional apparatus, the apparatus of the present invention does not make the unnecessary increasing-correction on the fuel injection amount. Consequently, the apparatus of the present invention can prevent a large amount of the unburnt substances from being discharged.

It should be noted that the first change rate threshold and the second change rate threshold may be equal to each other, or may be different from each other. Further, each of the first change rate threshold and the second change rate threshold may be "0", or a small value which is substantially equal to "0".

As is understood from the description above, the conventional apparatus controls the "air-fuel ratio of the catalyst inflow gas (i.e., the air-fuel ratio of the engine)" in such a manner that the oxygen storage amount OSA varies in a "region between 0 and the maximum oxygen storage amount Cmax", whereas the apparatus of the present invention controls the "air-fuel ratio of the catalyst inflow gas (i.e., the air-fuel ratio of the engine)" in such a manner that the oxygen storage amount OSA varies in a "region between a value (the value in the vicinity of the lower limit value CLo) larger than 0 and a value (the value in the vicinity of the upper limit value CHi) smaller than the maximum oxygen storage amount Cmax". Accordingly, the present apparatus can maintain the state of the catalyst at a "state that allows the catalyst to purify the unburnt substances and NOx efficiently", and therefore can further reduce a discharge amount of the unburnt substances and NOx.

In addition, according to the present apparatus, it is unlikely that the oxygen storage amount OSA reaches "0", or the maximum oxygen storage amount Cmax. Accordingly, even if the "air-fuel ratio of the catalyst inflow gas (i.e., the air-fuel ratio of the engine)" is set at (t0) an "air-fuel ratio which greatly deviates from the stoichiometric air-fuel ratio" during the air-fuel ratio feedback control (the normal air-fuel ratio feedback control), the emission is unlikely to be worsen. This enables to avoid substantial lowering of the maximum oxygen storage amount Cmaxdue to a catalyst-rich-poisoning and a catalyst-lean-poisoning, and to thereby avoid lowering of the efficiency of purifying the emissions.

That is, the catalyst-rich-poisoning occurs in a case in which HC, or the like adheres (attaches) to circumferences of the precious metals supported by the catalyst when a state continues for a relatively long time in which the "air-fuel ratio of the catalyst inflow gas" is richer than the stoichiometric air-fuel ratio. This catalyst-rich-poisoning decreases the efficiency of purifying emissions of the catalyst. The catalyst-rich-poisoning can be eliminated by supplying a gas "whose air-fuel ratio greatly deviates toward leaner side from the stoichiometric air-fuel ratio" to the catalyst.

The catalyst-lean-poisoning occurs in a case in which the precious metals supported by the catalyst become oxidized so that a superficial area of each of the precious metals substantially decreases when a state continues for a relatively long time in which the "air-fuel ratio of the catalyst inflow gas" is leaner than the stoichiometric air-fuel ratio. This catalyst-lean-poisoning also decreases the efficiency of purifying emissions of the catalyst. The catalyst-lean-poisoning can be eliminated by supplying a gas "whose air-fuel ratio greatly deviates toward richer side from the stoichiometric air-fuel ratio" to the catalyst.

The air-fuel ratio control means included in the air-fuel ratio control apparatus of the present invention may be configured so as to perform the normal air-fuel ratio feedback control when the output value of the downstream air-fuel ratio sensor is smaller than a "predetermined first threshold" and larger than a "predetermined second threshold which is smaller than the first threshold".

The first threshold may be set at (to) a value between a middle value and the maximum output value, the middle value being a "middle value (i.e., mid-value, mean value) of the maximum output value and the minimum output value.

The first threshold may be set at (to) the value which is closer to the maximum output value than to the middle value.

More specifically, the first threshold is set at (to) a value equal to the "output value of the downstream air-fuel ratio sensor" obtained when the "air-fuel ratio of the catalyst inflow gas" is an "air-fuel ratio leaner than the stoichiometric air-fuel ratio", the oxygen storage amount OSA of the catalyst is increasing, and the "air-fuel ratio of the catalyst outflow gas" is equal to the "stoichiometric air-fuel ratio".

When the output value of the downstream air-fuel ratio sensor is larger than the first threshold, it is considered that the catalyst is in the state in which the oxygen is short. That is, when the oxygen storage amount OSA of the catalyst is equal to "0" or substantially equal to "0" (i.e., when the catalyst is in the state in which the oxygen is short), the oxygen does not flow out to the position downstream of the catalyst regardless of the air-fuel ratio of the catalyst inflow gas (refer to FIGS. 4 and 7). Accordingly, when the catalyst is in the state in which the oxygen is short, the output value of the downstream air-fuel ratio sensor becomes a value in the vicinity of the maximum output value Vmax, and therefore, the output value of the downstream air-fuel ratio sensor becomes larger than or equal to the first threshold.

Accordingly, in such a case, it is favorable that the "air-fuel ratio of the catalyst inflow gas" is not set at (to) an "air-fuel ratio richer than the stoichiometric air-fuel ratio", even when the output value of the downstream air-fuel ratio sensor decreases. It is therefore preferable that the normal air-fuel ratio feedback control is not performed, when the first threshold is set at (to) the value described above, and when the output value of the downstream air-fuel ratio sensor is larger than or equal to the first threshold.

The second threshold may be set at (to) a value between the middle value and the minimum output value, and may be closer to the minimum output value than to the middle value.

More specifically, the second threshold is set at (to) a value equal to the "output value of the downstream air-fuel ratio sensor" obtained when the "air-fuel ratio of the catalyst inflow gas" is an "air-fuel ratio richer than the stoichiometric air-fuel ratio", the oxygen storage amount OSA of the catalyst is decreasing, and the "air-fuel ratio of the catalyst outflow gas" is equal to the "stoichiometric air-fuel ratio".

When the output value of the downstream air-fuel ratio sensor is smaller than the second threshold, it is considered that the catalyst is in the state in which the oxygen is excessive (the amount is excessively large). That is, when the oxygen storage amount OSA is equal to the maximum oxygen storage amount Cmax, or substantially equal to the maximum oxygen storage amount Cmax (i.e., when the catalyst is in the state in which the oxygen is excessive), the oxygen flows out to the position downstream of the catalyst regardless of the air-fuel ratio of the catalyst inflow gas (refer to FIGS. 5 and 6). Accordingly, when the catalyst is in the state in which the oxygen is excessive, the output value of the downstream air-fuel ratio sensor becomes a value in the vicinity of the minimum output value Vmin, and therefore, the output value of the downstream air-fuel ratio sensor becomes smaller than or equal to the second threshold.

Accordingly, in such a case, it is favorable that the "air-fuel ratio of the catalyst inflow gas" is not set at (to) an "air-fuel ratio leaner than the stoichiometric air-fuel ratio", even when the output value of the downstream air-fuel ratio sensor increases. It is therefore preferable that the normal air-fuel ratio feedback control is not performed, when the second threshold is set at (to) the value described above, and when the output value of the downstream air-fuel ratio sensor is smaller than or equal to the second threshold.

It is preferable that the air-fuel ratio control means included in the air-fuel ratio control apparatus of the present invention be configured so as to control the "air-fuel ratio of the mixture supplied to the engine" in such a manner that the "air-fuel ratio of the catalyst inflow gas" becomes (is set to) an "air-fuel ratio leaner than the stoichiometric air-fuel ratio" when the output value of the downstream air-fuel ratio sensor is larger than or equal to a value within a predetermined range including the first threshold.

As described above, the output value Voxs of the downstream air-fuel ratio sensor becomes the value in the vicinity of the maximum output value Vmax, when the oxygen storage amount OSA of the catalyst is equal to "0" or is substantially equal to "0", and the catalyst is in the state in which the oxygen is short.

More specifically, when a predetermined operating condition (e.g., condition for performing an increasing fuel amount for preventing an overheat of the catalyst) is satisfied, the air-fuel ratio of the mixture supplied to the engine is set at (to) an air-fuel ratio richer than the stoichiometric air-fuel ratio. When this state continues, the oxygen stored in the catalyst is consumed, and the oxygen storage amount OSA reaches "0".

When the "combustion gas whose air-fuel ratio is richer than the stoichiometric air-fuel ratio" continues to flow into such a catalyst which is in the state in which the oxygen is short, the oxygen does not flow out to the position downstream of the catalyst and the unburnt substances flow out to the position downstream of the catalyst, as shown in FIG. 7. Accordingly, the oxygen remaining in the vicinity of the downstream air-fuel ratio sensor and in the diffusion resistance layer of the downstream air-fuel ratio sensor is completely consumed by the unburnt substances. Consequently, as shown in a period from the time t1 to the time t2 in FIG. 8, the output value Voxs of the downstream air-fuel ratio sensor substantially becomes equal to the maximum output value Vmax.

Thereafter, when the "combustion gas whose air-fuel ratio is leaner than the stoichiometric air-fuel ratio" flows into such a catalyst which is in the state in which the oxygen is short, the oxygen does not flow out to the position downstream of the catalyst, as shown in FIG. 4. Further, the unburnt substances included in the catalyst inflow gas become oxidized in the catalyst. At this moment, the catalyst outflow gas includes neither the unburnt substances nor the oxygen. That is, the air-fuel ratio of the catalyst outflow gas is equal to the stoichiometric air-fuel ratio. However, since the oxygen remaining in the vicinity of the downstream air-fuel ratio sensor and in the diffusion resistance layer of the downstream air-fuel ratio sensor has been completely consumed, the output value of the downstream air-fuel ratio sensor slightly decreases as shown in a period from the time t2 to the time t3 in FIG. 8, but continues to be a value (e.g., a stoichiometric-upper-limit-value VHilimit) in the vicinity of the maximum output value Vmax, the value being between the middle value Vmid and the maximum output value Vmax, for a while as shown in a period from the time t3 to the time t4.

Thereafter, when the oxygen storage amount OSA becomes relatively large, the oxygen starts to be included in the catalyst outflow gas, as shown in FIG. 5. As a result, as shown in a period after the time t4 in FIG. 8, the output value Voxs of the downstream air-fuel ratio sensor starts to rapidly decrease.

As is clear from the above description, when the output value Voxs of the downstream air-fuel ratio sensor is larger than or equal to the "value (corresponding to a value Vmax−$\alpha$1 in FIG. 8) which is within the range including the first threshold closer to the maximum output value Vmax than to the middle value Vmid", the oxygen storage amount OSA is very small, and therefore, the required air-fuel ratio of the catalyst inflow gas is an "air-fuel ratio leaner than the stoichiometric air-fuel ratio". Accordingly, as the configuration described above, it is preferable that, when the output value Voxs of the downstream air-fuel ratio sensor is larger than or equal to the value (Vmax−α1) which is within the range including the first threshold, the "air-fuel ratio of the mixture supplied to the engine" be controlled in such a manner that the "air-fuel ratio of the catalyst inflow gas" become an "air-fuel ratio leaner than the stoichiometric air-fuel ratio", regardless of the change rate of the output value Voxs of the downstream air-fuel ratio sensor. This allows the oxygen storage amount OSA to be rapidly increased. Consequently, the efficiency of purifying emissions of the catalyst can be rapidly increased. It should be noted that the value (Vmax−α1) preferably coincides with the first threshold or the stoichiometric-upper-limit-value VHilimit.

Based on the similar reason, it is preferable that the air-fuel ratio control means included in the air-fuel ratio control apparatus of the present invention be configured so as to control the "air-fuel ratio of the mixture supplied to the engine" in such a manner that the "air-fuel ratio of the catalyst inflow gas" becomes (is set to) an "air-fuel ratio richer than the stoichiometric air-fuel ratio" when the output value of the downstream air-fuel ratio sensor is smaller than or equal to a value within a predetermined range including the second threshold.

As described above, the output value Voxs of the downstream air-fuel ratio sensor becomes a value in the vicinity of the minimum output value Vmin, when the oxygen storage amount OSA is equal to the maximum oxygen storage amount Cmaxor substantially equal to the maximum oxygen storage amount Cmax, and the catalyst is in the state in which the oxygen is excessive.

More specifically, for example, when a condition for performing a fuel cut (F/C) operation is satisfied, and therefore, the fuel cut operation is performed, a large amount of the oxygen flows into the catalyst. When this state continues, the oxygen storage amount OSA reaches the maximum oxygen storage amount Cmax.

When the "combustion gas whose air-fuel ratio is leaner than the stoichiometric air-fuel ratio" continues to flow into such a catalyst which is in the state in which the oxygen is excessive, the oxygen continues to flow out to the position downstream of the catalyst, as shown in FIG. 5. Consequently, as shown in a period from the time t1 to the time t2 in FIG. 9, the output value Voxs of the downstream air-fuel ratio sensor substantially becomes equal to the minimum output value Vmin.

Thereafter, when the "combustion gas whose air-fuel ratio is richer than the stoichiometric air-fuel ratio" flows into such a catalyst which is in the state in which the oxygen is excessive, the "unburnt substances included in the catalyst inflow gas" become oxidized by combining with the "oxygen stored in the catalyst" and the "oxygen included in the catalyst inflow gas", and an extremely small amount of the "remained oxygen which is included in the catalyst inflow gas" flows out to the position downstream of the catalyst, as shown in FIG. 6. That is, it can be said that the air-fuel ratio of the catalyst outflow gas is substantially equal to the stoichiometric air-fuel ratio. However, the oxygen remains in the vicinity of the downstream air-fuel ratio sensor and in the diffusion resistance layer of the downstream air-fuel ratio sensor. Accordingly, the output value Voxs of the downstream air-fuel ratio sensor slightly increases as shown in a period from the time t2 to the time t3 in FIG. 9, but continues to be a value (e.g., a stoichiometric-lower-limit-value VLolimit) in the vicinity of the minimum output value Vmin, the value being between the middle value Vmid and the minimum output value Vmin, for a while as shown in a period from the time t3 to the time t4.

Thereafter, when the oxygen storage amount OSA becomes small to some degree, the unburnt substances start to be included in the catalyst outflow gas, as shown in FIG. 7. This causes the oxygen remaining in the vicinity of the downstream air-fuel ratio sensor and in the diffusion resistance layer of the downstream air-fuel ratio sensor to be consumed by the unburnt substances. As a result, as shown a period after the time t4 in FIG. 9, the output value Voxs of the downstream air-fuel ratio sensor starts to rapidly increase.

As is clear from the above description, when the output value Voxs of the downstream air-fuel ratio sensor is smaller than or equal to the "value (corresponding to a value Vmin+α2 in FIG. 9) which is within the range including the second threshold closer to the minimum output value Vmin than to the middle value Vmid", the oxygen storage amount OSA is very large, and therefore, the required air-fuel ratio of the catalyst inflow gas is an "air-fuel ratio richer than the stoichiometric air-fuel ratio". Accordingly, as the configuration described above, it is preferable that, when the output value Voxs of the downstream air-fuel ratio sensor is smaller than the value (Vmin+α2) which is within the range including the second threshold, the "air-fuel ratio of the mixture supplied to the engine" be controlled in such a manner that the "air-fuel ratio of the catalyst inflow gas" become an "air-fuel ratio richer than the stoichiometric air-fuel ratio", regardless of the change rate of the output value Voxs of the downstream air-fuel ratio sensor. This allows the oxygen storage amount OSA to be rapidly decreased. Consequently, the efficiency of purifying emissions of the catalyst can be rapidly increased. It should be noted that the value (Vmin+α2) preferably coincides with the second threshold or the stoichiometric-lower-limit-value VLolimit.

Further, in one aspect of the air-fuel ratio control apparatus of the present invention, the air-fuel ratio control means comprises base fuel injection amount calculating means, sub feedback amount calculating means, and fuel injection means.

The base fuel injection amount calculating means obtains (detects, or estimates) an intake air amount introduced into the engine, and calculate a "base fuel injection amount for having the air-fuel ratio of the mixture supplied to the engine coincide with the stoichiometric air-fuel ratio" based on the obtained intake air amount.

The sub feedback amount calculating means calculates a "sub feedback amount" which is a "feedback amount to correct the base fuel injection amount" based on the output value of the downstream air-fuel ratio sensor.

The fuel injection means injects and supplies to the engine a fuel whose amount is obtained by correcting the base fuel injection amount with the sub feedback amount (i.e., fuel of an instructed injection amount, fuel of a final fuel injection amount).

In this case, it is preferable that the sub feedback amount calculating means be configured so as to calculate the sub feedback amount in order to perform the normal air-fuel ratio feedback control in such a manner that:

(1) the sub feedback amount becomes a "value which more greatly increases the base fuel injection amount as a magnitude of the change rate of the output value of the downstream air-fuel ratio sensor becomes larger" when the output value of the downstream air-fuel ratio sensor is decreasing (i.e., the change rate of the output value of the downstream air-fuel ratio sensor is negative); and (2) the sub feedback amount becomes a "value which more greatly decreases the base fuel injection amount as a magnitude of the change rate of the output value of the downstream air-fuel ratio sensor becomes larger" when the output value of the downstream air-fuel ratio sensor is increasing (i.e., the change rate of the output value of the downstream air-fuel ratio sensor is positive).

When the output value Voxs of the downstream air-fuel ratio sensor is decreasing toward the minimum output value Vmin, it can be considered that the oxygen storage amount OSA becomes a value in the vicinity of the maximum oxygen storage amount Cmax, and therefore, the oxygen starts to flow out from the catalyst. Further, it can be considered that the oxygen storage amount OSA becomes much closer to the maximum oxygen storage amount Cmaxas the magnitude of the decreasing rate of the output value Voxs becomes larger. Accordingly, when the output value Voxs of the downstream air-fuel ratio sensor is decreasing, it is preferable that the "air-fuel ratio of the catalyst inflow gas be set to (at) a much richer air-fuel ratio than the stoichiometric air-fuel ratio" as the magnitude of the decreasing rate of the output value Voxs becomes larger, to thereby rapidly decrease the oxygen storage amount OSA.

In view of the above, according to the configuration described above, when the output value of the downstream air-fuel ratio sensor is decreasing, the sub feedback amount is calculated so as to be the "value which more greatly increases the base fuel injection amount as the magnitude of the change rate of the output value of the downstream air-fuel ratio sensor is larger". Consequently, the oxygen storage amount OSA can be appropriately decreased at a point in time before the oxygen storage amount OSA reaches the maximum oxygen storage amount Cmax, and therefore, the efficiency of purifying emissions of the catalyst can be maintained at a high value.

In contrast, when the output value Voxs of the downstream air-fuel ratio sensor is increasing toward the maximum output value Vmax, it can be considered that the oxygen storage amount OSA becomes a value in the vicinity of "0", and therefore, the excessive unburnt substances start to flow out from the catalyst. Further, it can be considered that the oxygen storage amount OSA becomes much closer to "0" as the magnitude of the increasing rate of the output value Voxs becomes larger. Accordingly, when the output value Voxs of the downstream air-fuel ratio sensor is increasing, it is preferable that the "air-fuel ratio of the catalyst inflow gas be set to (at) a much leaner air-fuel ratio than the stoichiometric air-fuel ratio" as the magnitude of the increasing rate of the output value Voxs becomes larger, to thereby rapidly increase the oxygen storage amount OSA.

In view of the above, according to the configuration described above, when the output value of the downstream air-fuel ratio sensor is increasing, the sub feedback amount is calculated so as to be the "value which more greatly decreases the base fuel injection amount as the magnitude of the change rate of the output value of the downstream air-fuel ratio sensor is larger". Consequently, the oxygen storage amount OSA can be appropriately increased at a point in time before the oxygen storage amount OSA reaches "0", and therefore, the efficiency of purifying emissions of the catalyst can be maintained at a high value.

In another aspect of the air-fuel ratio control apparatus of the present invention, the air-fuel ratio control means comprises:

base fuel injection amount calculating means for obtaining an intake air amount introduced into the engine, and calculating, based on the obtained intake air amount, a base fuel injection amount for having the air-fuel ratio of the mixture supplied to the engine coincide with the stoichiometric air-fuel ratio;

sub feedback amount calculating means for calculating, based on the output value of the downstream air-fuel ratio sensor, a sub feedback amount which is a feedback amount to correct the base fuel injection amount; and fuel injection means for injecting and supplying to the engine a fuel whose amount is obtained by correcting the base fuel injection amount with the sub feedback amount.

Further, it is preferable that (A) in order to perform the normal air-fuel ratio feedback control, the sub feedback amount calculating means include time-derivative term calculating means for calculating a time-derivative term of the sub feedback amount by multiplying the "change rate of the output value of the downstream air-fuel ratio sensor" by a "certain (predetermined) time-derivative gain Kd", wherein the time-derivative term of the sub feedback amount is a value, which more greatly increases the base fuel injection amount as the magnitude of the change rate of the output value of the downstream air-fuel ratio sensor is larger when the output value of the downstream air-fuel ratio sensor is decreasing, and which more greatly decreases the base fuel injection amount as the magnitude of the change rate of the output value of the downstream air-fuel ratio sensor is larger when the output value of the downstream air-fuel ratio sensor is increasing.

As described above, when the output value Voxs of the downstream air-fuel ratio sensor is decreasing, it is preferable that the "air-fuel ratio of the catalyst inflow gas be set to (at) a much richer air-fuel ratio than the stoichiometric air-fuel ratio" as the magnitude of the decreasing rate of the output value Voxs becomes larger. That is, when the output value Voxs of the downstream air-fuel ratio sensor is decreasing, the required air-fuel ratio of the catalyst inflow gas is the "rich air-fuel ratio which more greatly deviates from the stoichiometric air-fuel ratio as the magnitude of the decreasing rate of the output value Voxs is larger".

Furthermore, as described above, when the output value Voxs of the downstream air-fuel ratio sensor is increasing, it is preferable that the "air-fuel ratio of the catalyst inflow gas be set to (at) a much leaner air-fuel ratio than the stoichiometric air-fuel ratio" as the magnitude of the increasing rate of the output value Voxs becomes larger. That is, when the output value Voxs of the downstream air-fuel ratio sensor is increasing, the required air-fuel ratio of the catalyst inflow gas is the "lean air-fuel ratio which more greatly deviates from the stoichiometric air-fuel ratio as the magnitude of the increasing rate of the output value Voxs is larger".

In view of the above, according to the configuration described above, a value obtained by multiplying the change rate of the output value of the downstream air-fuel ratio sensor (the change rate corresponding to an amount of change in the output value Voxs of the downstream air-fuel ratio sensor per unit time) by the predetermined time-derivative gain Kd is calculated as the "time-derivative term of the sub feedback amount". The time-derivative gain Kd is determined in such a manner that the time-derivative term becomes a positive value (that is, a value which increases the base fuel injection amount) when the output value of the downstream air-fuel ratio sensor is decreasing with time. Further, the time-derivative gain Kd is determined in such a manner that the time-derivative term becomes a negative value (that is, a value which decreases the base fuel injection amount) when the output value of the downstream air-fuel ratio sensor is increasing with time. Using this time-derivative term allows a gas whose air-fuel ratio corresponds to the required air-fuel ratio of the catalyst inflow gas to be flowed into the catalyst. Consequently, the oxygen storage amount OSA reaches neither the maximum oxygen storage amount Cmax nor "0", and therefore, the efficiency of purifying emissions of the catalyst can be maintained at a high value.

In addition, when the sub feedback amount calculating means includes time-derivative term calculating means, it is preferable that the sub feedback amount calculating means further include proportional term calculating means configured as follows.

That is, the proportional term calculating means:

(B1) when the output value of the downstream air-fuel ratio sensor is larger than or equal to the first threshold, calculates a sum of a value obtained by multiplying a "difference between the first threshold and the output value of the downstream air-fuel ratio sensor" by a lean control gain KpL, and a value obtained by multiplying a "difference between a predetermined target value (e.g., the middle value) and the first threshold" by a first gain KpS1, wherein the target value being set between the first threshold and the second threshold, as the "proportional term of the sub feedback control amount" for controlling the "air-fuel ratio of the mixture supplied to the engine" in such a manner that the "air-fuel ratio of the mixture supplied to the engine becomes an air-fuel ratio leaner than the stoichiometric air-fuel ratio" by "decreasing the base fuel injection amount";

(B2) when the output value of the downstream air-fuel ratio sensor is smaller than or equal to the second threshold, calculates a sum of a value obtained by multiplying a "difference between the second threshold and the output value of the downstream air-fuel ratio sensor" by a rich control gain KpR, and a value obtained by multiplying a "difference between the target value and the second threshold" by a second gain KpS2, as the "proportional term of the sub feedback control amount" for controlling the "air-fuel ratio of the mixture supplied to the engine" in such a manner that the "air-fuel ratio of the mixture supplied to the engine becomes an air-fuel ratio richer than the stoichiometric air-fuel ratio" by "increasing the base fuel injection amount"; and (B3) when the output value of the downstream air-fuel ratio sensor is between the first threshold and the second threshold, calculates a value obtained by multiplying a difference between the target value and the output value of the downstream air-fuel ratio sensor by a third gain KpS3, as the "proportional term of the sub feedback control amount".

It can be considered that the oxygen storage amount OSA of the catalyst is an appropriate amount, when the output value Voxs of the downstream air-fuel ratio sensor is between the "value ((Vmax−α1) in FIG. 8, preferably the stoichiometric-upper-limit-value VHilimit) in the range including the first threshold" and the "value ((Vmin+α2) in FIG. 9, preferably the stoichiometric-lower-limit-value VLolimit) in the range including the second threshold". That is, in this case, it is clear that the oxygen storage amount OSA is neither in the vicinity of the maximum oxygen storage amount Cmax nor in the vicinity of "0". Accordingly, when the output value Voxs of the downstream air-fuel ratio sensor is between the first threshold and the second threshold, it is not necessary to have the large proportional term of the sub feedback amount in order to have the output value Voxs come closer to the "target value (e.g., the middle value Vmid) which is set between the first threshold and the second threshold".

In contrast, when the output value Voxs of the downstream air-fuel ratio sensor is larger than or equal to the value within the predetermined range including the first threshold, the oxygen storage amount OSA is in the vicinity of "0", and therefore, the required air-fuel ratio of the catalyst inflow gas is an air-fuel ratio leaner than the stoichiometric air-fuel ratio. In this case, the conventional apparatus calculates the "proportional term of the sub feedback amount" by multiplying a "difference between the output value Voxs of the downstream air-fuel ratio sensor and the target value which is set at the middle value Vmid" by a "predetermined gain". However, as described above, a necessity is small to have the air-fuel ratio of the catalyst inflow gas shift to the lean air-fuel ratio by the proportional term having a large value, when the output value Voxs of the downstream air-fuel ratio sensor is smaller than or equal to the value within the range including the first threshold. Accordingly, if the proportional gain is obtained according to the conventional apparatus, the proportional term when the output value Voxs of the downstream air-fuel ratio sensor is larger than or equal to the first threshold may be excessively large.

In view of the above, in the configuration described above (refer to B1), when the output value Voxs of the downstream air-fuel ratio sensor is larger than or equal to the first threshold, the sum of the value obtained by multiplying the "difference between the first threshold and the output value of the downstream air-fuel ratio sensor" by the lean control gain KpL, and the value obtained by multiplying the "difference between the predetermined target value which is set between the first threshold and the second threshold and the first threshold" by the first gain KpS1 is calculated, as the "proportional term of the sub feedback control amount". That is, an error between the output value and the target value is divided into an "error between the output value and the first threshold" and an "error between the first threshold value and the target value", then each of the divided errors is multiplied by each of unique gains to thereby obtain the proportional term.

According to this configuration, the lean control gain KpL can be set to a value different from the first gain KpS1 (e.g., KpL>KpS1). Thus, it is possible to avoid an "occurrence of a state in which the oxygen storage amount OSA increases up to a value in the vicinity of the maximum oxygen storage amount Cmaxat once due to the excessively large proportional term which is for having the air-fuel ratio of the catalyst inflow gas set to the air-fuel ratio leaner than the stoichiometric air-fuel ratio".

Similarly, when the output value Voxs of the downstream air-fuel ratio sensor is smaller than or equal to the value within the predetermined range including the second threshold, the oxygen storage amount OSA is in the vicinity of the maximum oxygen storage amount Cmax, and therefore, the required air-fuel ratio of the catalyst inflow gas is an air-fuel ratio richer than the stoichiometric air-fuel ratio. In this case as well, the conventional apparatus calculates the "proportional term of the sub feedback amount" by multiplying the "difference between the output value Voxs of the downstream air-fuel ratio sensor and the target value which is set at the middle value Vmid" by the "predetermined gain". However, as described above, a necessity is small to have the air-fuel ratio of the catalyst inflow gas shift to the rich air-fuel ratio by the proportional term having a large value, when the output value Voxs of the downstream air-fuel ratio sensor is larger than or equal to the value within the range including the second threshold. Accordingly, if the proportional gain is obtained according to the conventional apparatus, the proportional term when the output value Voxs of the downstream air-fuel ratio sensor is smaller than or equal to the second threshold may be excessively large.

In view of the above, in the configuration described above (refer to B2), when the output value Voxs of the downstream air-fuel ratio sensor is smaller than or equal to the second threshold, the sum of the value obtained by multiplying the "difference between the second threshold and the output value of the downstream air-fuel ratio sensor" by the rich control gain KpR, and the value obtained by multiplying the "difference between the target value and the second threshold" by the second gain KpS2 is calculated, as the "proportional term of the sub feedback control amount". That is, the error between the output value and the target value is divided into an "error between the output value and the second threshold" and an "error between the second threshold value and the target value", then each of the divided errors is multiplied by each of unique gains to thereby obtain the proportional term.

According to this configuration, the rich control gain KpR can be set to a value different from the second gain KpS2 (e.g., KpR>KpS2). Thus, it is possible to avoid an "occurrence of a state in which the oxygen storage amount OSA decreases down to a value in the vicinity of "0" at once due to the excessively large proportional term which is for having the air-fuel ratio of the catalyst inflow gas set to the air-fuel ratio richer than the stoichiometric air-fuel ratio".

Further, as described above, when the output value Voxs of the downstream air-fuel ratio sensor is between the first threshold and the second threshold, a necessity is small to have the proportional term having a large value. Accordingly, in the configuration described above (refer to B3), when the output value Voxs of the downstream air-fuel ratio sensor is between the first threshold and the second threshold, the value obtained by multiplying the difference between the target value and the output value Voxs of the downstream air-fuel ratio sensor by the appropriate third gain KpS3 (e.g., gain smaller than the gain KpL and the gain KpR) is calculated as the "proportional term of the sub feedback amount". In this manner described above, the proportional term to maintain the oxygen storage amount OSA within an appropriate range is calculated.

It should be noted that an absolute value of the lean control gain KpL and an absolute value of the rich control gain KpR may be different from each other, or may be the same as each other (gain for an error outside of threshold). Also, the first gain KpS1, the second gain KpS2, and the third gain KpS3 may be different from each other, or may the same as each other (gain for an error inside of threshold). The third gain KpS3 may be smaller than each of the first gain KpS1 and the second gain KpS2, or may be "0".

In the air-fuel ratio control apparatus for an internal combustion engine which includes the proportional term calculating means, the proportional term calculating means may be configured so as to:

(C1) set the target value to (at) a first target value which is a value between the first threshold and the middle value, when the output value of the downstream air-fuel ratio sensor is larger than a value within a predetermined range including the first threshold;

(C2) set the target value to (at) a second target value which is a value between the second threshold and the middle value, when the output value of the downstream air-fuel ratio sensor is smaller than a value within a predetermined range including the second threshold; and (C3) set the target value to (at) a third target value (preferably, the middle value) which is a value between the first target value and the second target value, when the output value of the downstream air-fuel ratio sensor is between the value within the predetermined range including the first threshold and the value within the predetermined range including the second threshold.

According to the configuration (C1) described above, when the output value of the downstream air-fuel ratio sensor is larger than the value within the predetermined range including the first threshold, the target value is set to (at) the "value (i.e., the first target value) between the first threshold and the middle value". Therefore, as compared with the case in which the target value is set to (at) the "middle value", a "magnitude of a difference between the first threshold and the target value (first target value) (that is, the error to be multiplied by the first gain KpS1)" does not become excessively large. Accordingly, the proportional term can be set to (at) a "value which is necessary to have the output value of the downstream air-fuel ratio sensor shift to a value smaller than or equal to the first threshold, but is not excessively large".

Similarly, according to the configuration (C2) described above, when the output value of the downstream air-fuel ratio sensor is smaller than the value within the predetermined range including the second threshold, the target value is set to (at) the "value (i.e., the second target value) between the second threshold and the middle value". Therefore, as compared with the case in which the target value is set to (at) the "middle value", a "magnitude of a difference between the second threshold and the target value (second target value) (that is, the error to be multiplied by the second gain KpS2)" does not become excessively large. Accordingly, the proportional term can be set to (at) a "value which is necessary to have the output value of the downstream air-fuel ratio sensor shift to a value larger than or equal to the second threshold, but is not excessively large".

Further, according to the configuration (C3) described above, when the output value of the downstream air-fuel ratio sensor is between the value within the predetermined range including the first threshold and the value within the predetermined range including the second threshold, the target value is set to (at) the "value (i.e., the third target value) between the first target value and the second target value". Therefore, the proportional term can be set to (at) a "value which is appropriate to maintain the output value of the downstream air-fuel ratio sensor between the first threshold and the second threshold".

In the air-fuel ratio control apparatus for an internal combustion engine which includes the time-derivative term calculating means and the proportional term calculating means, it is preferable that the proportional term calculating means be configured so as to decrease the magnitude of the proportional term of the sub feedback amount as the magnitude of the change rate of the output value of the downstream air-fuel ratio sensor is larger (i.e., so as to correct the proportional term in such a manner that the proportional term becomes smaller as the magnitude of the change rate of the output value of the downstream air-fuel ratio sensor becomes larger).

As described above, it can be considered that the oxygen storage amount OSA becomes much closer to the maximum oxygen storage amount Cmaxas the magnitude of the change rate of the output value Voxs becomes larger when the output value Voxs is decreasing. Accordingly, when the output value Voxs is decreasing, it is preferable that the sub feedback amount be a value to make an increasing correction on the base fuel injection amount so that the base fuel injection amount is more greatly increased as the magnitude of the change rate of the output value Voxs becomes larger. However, if the output value Voxs of the downstream air-fuel ratio sensor is larger than the target value, the proportional term becomes a value which makes a decreasing correction on the base fuel injection amount. Accordingly, as the configuration described above, by decreasing the magnitude of the proportional term of the sub feedback amount as the magnitude of the change rate of the output value of the downstream air-fuel ratio sensor becomes larger, the proportional term does not disturb the "appropriate air-fuel ratio control by the time-derivative term based on the change in the output value of the downstream air-fuel ratio sensor", and therefore, a likelihood that the oxygen storage amount OSA reaches a value in the vicinity of the maximum oxygen storage amount Cmax can be reduced.

Similarly, it can be considered that the oxygen storage amount OSA becomes much closer to "0" as the magnitude of the change rate of the output value Voxs becomes larger when the output value Voxs is increasing. Accordingly, when the output value Voxs is increasing, it is preferable that the sub feedback amount be a value to make an decreasing correction on the base fuel injection amount so that the base fuel injection amount is more greatly decreased as the magnitude of the change rate of the output value Voxs becomes larger. However, if the output value Voxs of the downstream air-fuel ratio sensor is smaller than the target value, the proportional term becomes a value which makes an increasing correction on the base fuel injection amount. Accordingly, as the configuration described above, by decreasing the magnitude of the proportional term of the sub feedback amount as the magnitude of the change rate of the output value of the downstream air-fuel ratio sensor becomes larger, the proportional term does not disturb the "appropriate air-fuel ratio control by the time-derivative term based on the change in the output value of the downstream air-fuel ratio sensor", and therefore, a likelihood that the oxygen storage amount OSA reaches a value in the vicinity of "0" can be reduced.

The air-fuel ratio control means included in the air-fuel ratio control apparatus of the present invention comprises:

base fuel injection amount calculating means for obtaining an intake air amount introduced into the engine, and calculating a base fuel injection amount for having the air-fuel ratio of the mixture supplied to the engine coincide with the stoichiometric air-fuel ratio based on the obtained intake air amount;

an upstream air-fuel ratio sensor disposed in the exhaust passage at a position upstream of the catalyst, the upstream air-fuel ratio sensor outputting an output value in accordance with an air-fuel ratio of a gas flowing through the position at which the upstream air-fuel ratio sensor is disposed;

main feedback amount calculating means;

sub feedback amount calculating means; and fuel injection means.

The main feedback amount calculating means calculates a "feedback amount (main feedback amount) which corrects the base fuel injection amount" in such a manner that an "upstream-side air-fuel ratio represented by the output value of the upstream air-fuel ratio sensor" coincides with the stoichiometric air-fuel ratio.

The sub feedback amount calculating means calculates a "sub feedback amount" which:

(D1) corrects the base fuel injection amount so as to increase the base fuel injection amount when the output value of the downstream air-fuel ratio sensor is decreasing, and (D2) corrects the base fuel injection amount so as to decrease the base fuel injection amount when the output value of the downstream air-fuel ratio sensor is increasing.

The fuel injection means injects and supplies to the engine a fuel whose amount is obtained by correcting the base fuel injection amount with an "air-fuel ratio correction amount" including (formed of) the main feedback amount and the sub feedback amount".

Further, the main feedback amount calculating means may be configured so as to:

(E1) decrease a magnitude of the main feedback amount or set the magnitude of the main feedback amount at (to) 0, if the main feedback amount is a "value which decreases the base fuel injection amount" while the output value Voxs is decreasing; and (E2) decrease the magnitude of the main feedback amount or set the magnitude of the main feedback amount at (to) 0, if the main feedback amount is a "value which increases the base fuel injection amount" while the output value Voxs is increasing.

Generally, in order to compensate for a transient (temporary) disturbance in the air-fuel ratio of the mixture supplied to the engine, a main feedback control using the "main feedback amount calculated using the output value of the upstream air-fuel ratio sensor" is often carried out together with a sub feedback control using the "sub feedback amount calculated based on the output value of the downstream air-fuel ratio sensor".

Meanwhile, as described above, when the output value of the downstream air-fuel ratio sensor is decreasing (especially, when the output value Voxs of the downstream air-fuel ratio sensor is decreasing and the magnitude of the change rate of the output value Voxs is larger than or equal to the first change rate threshold), the oxygen storage amount OSA is no longer close to "0", but rather is a value in the vicinity of the maximum oxygen storage amount Cmax. Accordingly, the required air-fuel ratio of the catalyst inflow gas is an "air-fuel ratio richer than the stoichiometric air-fuel ratio". At this moment, it is not preferable to decrease (make the decreasing correction on) the base fuel injection amount (i.e., the air-fuel ratio of the catalyst inflow gas is controlled to be the lean air-fuel ratio), for the catalyst. However, for example, when the main feedback amount becomes a "value which corrects the base fuel injection amount so as to greatly decrease the base fuel injection amount" due to the "transient change of the air-fuel ratio of the mixture supplied to the engine", the "air-fuel ratio correction amount consisting of the main feedback amount and the sub feedback amount" becomes a value which makes a decreasing correction on the base fuel injection amount (or the value to decrease the base fuel injection amount)" as a whole. That is, there is a case in which the air-fuel ratio correction amount becomes a value which sets the "air-fuel ratio of the catalyst inflow gas" to an "air-fuel ratio leaner than the stoichiometric air-fuel ratio".

In view of the above, as described in (E1) above, when the output value of the downstream air-fuel ratio sensor is decreasing (that is, when the required air-fuel ratio of the catalyst inflow gas is an "air-fuel ratio richer than the stoichiometric air-fuel ratio"), it is preferable that the magnitude of the main feedback amount be decreased or be set at 0, if the main feedback amount is the "value which decreases the base fuel injection amount".

According to the above configuration, the likelihood that "the main feedback amount decreases the base fuel injection amount excessively, and thus, a gas whose air-fuel ratio is different from the required air-fuel ratio of the catalyst inflow gas (in this case, the gas whose air-fuel ratio is leaner than the stoichiometric air-fuel ratio) is flowed into the catalyst" can be reduced.

Similarly, when the output value of the downstream air-fuel ratio sensor is increasing (especially, when the output value Voxs of the downstream air-fuel ratio sensor is increasing, and the magnitude of the change rate of the output value Voxs is larger than or equal to the second change rate threshold), the oxygen storage amount OSA is no longer close to the maximum oxygen storage amount Cmax, but rather is a value in the vicinity of 0. Accordingly, the required air-fuel ratio of the catalyst inflow gas is an "air-fuel ratio leaner than the stoichiometric air-fuel ratio". At this moment, it is not preferable to increase (make the increasing correction on) the base fuel injection amount, for the catalyst. However, for example, when the main feedback amount becomes a "value which corrects the base fuel injection amount so as to greatly increase the base fuel injection amount" due to the "transient change of the air-fuel ratio of the mixture supplied to the engine", the "air-fuel ratio correction amount consisting of the main feedback amount and the sub feedback amount" becomes a value which makes an increasing correction on the base fuel injection amount (or the value to increase the base fuel injection amount)" as a whole. That is, there is a case in which the air-fuel ratio correction amount becomes a value which sets the "air-fuel ratio of the catalyst inflow gas" to an "air-fuel ratio richer than the stoichiometric air-fuel ratio".

In view of the above, as described in (E2) above, when the output value of the downstream air-fuel ratio sensor is increasing (that is, when the required air-fuel ratio of the catalyst inflow gas is an "air-fuel ratio leaner than the stoichiometric air-fuel ratio", it is preferable that the magnitude of the main feedback amount be decreased or be set at 0, if the main feedback amount is the "value which increases the base fuel injection amount".

According to the above configuration, the likelihood that "the main feedback amount increases the base fuel injection amount excessively, and thus, a gas whose air-fuel ratio is different from the required air-fuel ratio of the catalyst inflow gas (in this case, the gas whose air-fuel ratio is richer than the stoichiometric air-fuel ratio) is flowed into the catalyst" can be reduced.

Further, the main feedback amount calculating means may preferably be configured so as to:

(F1) set the main feedback amount at (to) 0, if the main feedback amount is a "value which increases the base fuel injection amount" when the output value Voxs of the downstream air-fuel ratio sensor is larger than or equal to a value within a range including the first threshold; and (F2) set the main feedback amount at (to) 0, if the main feedback amount is a "value which decreases the base fuel injection amount" when the output value Voxs of the downstream air-fuel ratio sensor is smaller than or equal to a value within a range including the second threshold.

As described above, when the output value of the downstream air-fuel ratio sensor is larger than or equal to the value within the range including the first threshold, the oxygen storage amount OSA is equal to "0" or is substantially equal to "0". Accordingly, the required air-fuel ratio of the catalyst inflow gas is the "air-fuel ratio leaner than the stoichiometric air-fuel ratio", and thus, it is not preferable for the main feedback amount to increase (or make the increasing correction on) the base fuel injection amount, for the catalyst.

In view of the above, as described in (F1) above, when the main feedback amount is a value which increases the base fuel injection amount in a case in which the output value of the downstream air-fuel ratio sensor is larger than or equal to the value within the range including the first threshold, the main feedback amount is set to "0". This can prevent the main feedback amount from operating to have a gas whose air-fuel ratio is different from the required air-fuel ratio of the catalyst inflow gas flow into the catalyst.

Similarly, when the output value of the downstream air-fuel ratio sensor is smaller than or equal to the value within the range including the second threshold, the oxygen storage amount OSA is equal to the maximum oxygen storage amount Cmaxor is substantially equal to the maximum oxygen storage amount Cmax. Accordingly, the required air-fuel ratio of the catalyst inflow gas is the "air-fuel ratio richer than the stoichiometric air-fuel ratio", and thus, it is not preferable for the main feedback amount to decrease (or make the decreasing correction on) the base fuel injection amount, for the catalyst.

In view of the above, as described in (F2) above, when the main feedback amount is a value which decreases the base fuel injection amount in a case in which the output value of the downstream air-fuel ratio sensor is smaller than or equal to the value within the range including the second threshold, the main feedback amount is set to "0". This can prevent the main feedback amount from operating to have a gas whose air-fuel ratio is not appropriate for the catalyst flow into the catalyst.

Further, the air-fuel ratio control means in the air-fuel ratio control apparatus of the present invention may preferably include stoichiometric upper limit value obtaining means for controlling the "air-fuel ratio of the catalyst inflow gas" in such a manner that the "air-fuel ratio of the catalyst inflow gas" is set to a "predetermined lean air-fuel ratio leaner than the stoichiometric air-fuel ratio" when the output value of the downstream air-fuel ratio sensor is equal to the maximum output value, and for obtaining thereafter, as the first threshold, the "output value of the downstream air-fuel ratio sensor" at a "point in time when the magnitude of the change rate of the output value of the downstream air-fuel ratio sensor becomes minimum" in a period up to a point in time when the output value of the downstream air-fuel ratio sensor reaches the "minimum output value" or a "value obtained by adding a predetermined value to the minimum output value".

As shown in a period from the time t1 to the time t2 in FIG. 8, when a state in which the air-fuel ratio of the catalyst inflow gas is an air-fuel ratio richer than the stoichiometric air-fuel ratio continues, the output value Voxs of the downstream air-fuel ratio sensor reaches the maximum output value Vmax. At this moment (the time t2), if the air-fuel ratio of the catalyst inflow gas is controlled so as to be an air-fuel ratio leaner than the stoichiometric air-fuel ratio, the output value Voxs of the downstream air-fuel ratio sensor slightly decreases in a period from the time t2 to the time t3, becomes a substantially constant value in a period from the time t3 to the time t4, and rapidly decreases toward the minimum output value Vmin after the time t4. In the period from the time t3 to the time t4, the catalyst intensively (rapidly) absorbs the oxygen included in the catalyst inflow gas, and the air-fuel ratio of the catalyst outflow gas is equal to the stoichiometric air-fuel ratio. In other words, if the air-fuel ratio of the catalyst inflow gas is controlled in such a manner that the output value Voxs of the downstream air-fuel ratio sensor does not exceed a "value shown in the period from the time t3 to the time t4", the oxygen storage amount OSA of the catalyst does not become a value in the vicinity of "0", and thus, the unburnt substances and the NOx can be purified excellently.

The output value Voxs in the period from the time t3 to the time t4 is the output value Voxs obtained when "the magnitude of the change rate of the output value Voxs becomes smallest" in a period from the time at which the output value Voxs is equal to the maximum output value Vmax to the time at which the output value Voxs reaches the minimum output value Vmin or a value in the vicinity of the minimum output value Vmin. Therefore, according to the above configuration, the output value Voxs in the period from the time t3 to the time t4 can be obtained as "the first threshold, or the stoichiometric-upper-limit-value".

Further, the air-fuel ratio control means in the air-fuel ratio control apparatus of the present invention may preferably include stoichiometric lower limit value obtaining means for controlling the "air-fuel ratio of the catalyst inflow gas" in such a manner that the "air-fuel ratio of the catalyst inflow gas" is set to a "predetermined rich air-fuel ratio richer than the stoichiometric air-fuel ratio" when the output value of the downstream air-fuel ratio sensor is equal to the minimum output value, and for obtaining thereafter, as the second threshold, the "output value of the downstream air-fuel ratio sensor" at a "point in time when the magnitude of the change rate of the output value of the downstream air-fuel ratio sensor becomes minimum" in a period up to a point in time when the output value of the downstream air-fuel ratio sensor reaches the "maximum output value" or a "value obtained by subtracting a predetermined value from the maximum output value".

As shown in a period from the time t1 to the time t2 in FIG. 9, when a state in which the air-fuel ratio of the catalyst inflow gas is an air-fuel ratio leaner than the stoichiometric air-fuel ratio continues (in the example shown in FIG. 9, the state is the fuel cut operation), the output value Voxs of the downstream air-fuel ratio sensor reaches the minimum output value Vmin. At this moment (the time t2), if the air-fuel ratio of the catalyst inflow gas is controlled so as to be an air-fuel ratio richer than the stoichiometric air-fuel ratio, the output value Voxs of the downstream air-fuel ratio sensor slightly increases in a period from the time t2 to the time t3, becomes a substantially constant value in a period from the time t3 to the time t4, and rapidly increases toward the maximum output value Vmax after the time t4. In the period from the time t3 to the time t4, the catalyst intensively (rapidly) releases the oxygen stored in the catalyst to oxidize the unburnt substances, and the air-fuel ratio of the catalyst outflow gas is equal to the stoichiometric air-fuel ratio. In other words, if the air-fuel ratio of the catalyst inflow gas is controlled in such a manner that the output value Voxs of the downstream air-fuel ratio sensor does not become smaller than a "value shown in the period from the time t3 to the time t4", the oxygen storage amount OSA of the catalyst does not become a value in the vicinity of the maximum oxygen storage amount Cmax, and thus, the unburnt substances and the NOx can be purified excellently.

The output value Voxs in the period from the time t3 to the time t4 is the output value Voxs obtained when "the magnitude of the change rate of the output value Voxs becomes smallest" in a period from the time at which the output value Voxs is equal to the minimum output value Vmin to the time at which the output value Voxs reaches the maximum output value Vmax or a value in the vicinity of the maximum output value Vmax. Therefore, according to the above configuration, the output value Voxs in the period from the time t3 to the time t4 can be obtained as "the second threshold, or the stoichiometric-lower-limit-value".

Further, in the air-fuel ratio control apparatus of the present invention, the air-fuel ratio control means preferably comprises:

base fuel injection amount calculating means for obtaining an intake air amount introduced into the engine, and calculating a base fuel injection amount for having the air-fuel ratio of the mixture supplied to the engine coincide with the stoichiometric air-fuel ratio based on the obtained intake air amount;

an upstream air-fuel ratio sensor disposed in the exhaust passage at a position upstream of the catalyst, the upstream air-fuel ratio sensor outputting an output value in accordance with an air-fuel ratio of a gas flowing through the position at which the upstream air-fuel ratio sensor is disposed;

main feedback amount calculating means for calculating a "main feedback amount which corrects the base fuel injection amount" in such a manner that an upstream-side air-fuel ratio represented by the output value of the upstream air-fuel ratio sensor coincides with the stoichiometric air-fuel ratio;

sub feedback amount calculating means for calculating a "sub feedback amount which corrects the base fuel injection amount" in such a manner that the sub feedback amount increases the base fuel injection amount whent the output value of the downstream air-fuel ratio sensor is decreasing, and that the sub feedback amount decreases the base fuel injection amount when the output value of the downstream air-fuel ratio sensor is increasing;

fuel injection means for injecting and supplying to the engine a fuel whose amount is obtained by correcting the base fuel injection amount with an air-fuel ratio correction amount formed of "the main feedback amount and the sub feedback amount"; and catalyst capability restoring means (first restoring means) for obtaining an integrated value of an "amount by which the base fuel injection amount is increased by the air-fuel ratio correction amount" in a case when a state continues in which the air-fuel ratio correction amount is a value which increases the base fuel injection amount, and for controlling an "amount of the fuel injected and supplied from the fuel injection means" in such a manner that the "air-fuel ratio of the mixture supplied to the engine (thus, the air-fuel ratio of the catalyst inflow gas)" becomes an "air-fuel ratio leaner than the stoichiometric air-fuel ratio" for a "predetermined first catalyst-restoring-time" regardless of the air-fuel ratio correction amount, when the obtained integrated value reaches a predetermined increasing-amount-threshold.

As described above, when a state continues for a relatively long time in which the "air-fuel ratio of the catalyst inflow gas" is richer than the stoichiometric air-fuel ratio, HC adheres (attaches) to circumferences of the precious metals supported by the catalyst, and thus, the catalyst-rich-poisoning occurs. The catalyst-rich-poisoning decreases the efficiency of purifying emissions of the catalyst. The catalyst-rich-poisoning can be eliminated by supplying a gas whose air-fuel ratio greatly deviates toward leaner side from the stoichiometric air-fuel ratio to the catalyst.

In view of the above, the catalyst capability restoring means obtains an integrated value of an "amount by which the base fuel injection amount is increased by the correction amount for the base fuel injection amount, the correction amount being formed of the main feedback amount and the sub feedback amount (i.e., by the air-fuel correction amount)" in a case when a state in which the air-fuel ratio correction amount is a value which increases the base fuel injection amount continues, determines that the catalyst-rich-poisoning is likely to occur when a magnitude of the integrated value reaches a "predetermined increasing-amount-threshold", and controls the "air-fuel ratio of the mixture supplied to the engine" in such a manner that the "air-fuel ratio of the mixture supplied to the engine" coincides with an "air-fuel ratio leaner than the stoichiometric air-fuel ratio" for a predetermined first catalyst-restoring-time. Consequently, the catalyst-rich-poisoning can be eliminated/resolved, and therefore, it can be avoided that the efficiency of purifying emissions of the catalyst lowers due to the catalyst-rich-poisoning.

Similarly, in a case in which the air-fuel ratio control means comprises the base fuel injection amount calculating means, the upstream air-fuel ratio sensor, the main feedback amount calculating means, the sub feedback amount calculating means, and the fuel injection means, the air-fuel ratio control means may preferably include;

catalyst capability restoring means (second restoring means) for obtaining an integrated value of an "amount by which the base fuel injection amount is decreased by the air-fuel ratio correction amount" in a case when a state in which the air-fuel ratio correction amount is a value which decreases the base fuel injection amount continues, and for controlling an "amount of the fuel injected and supplied from the fuel injection means" in such a manner that the air-fuel ratio of the mixture supplied to the engine (thus, the air-fuel ratio of the catalyst inflow gas) becomes an "air-fuel ratio richer than the stoichiometric air-fuel ratio" for a "predetermined second catalyst-restoring-time" regardless of the air-fuel ratio correction amount, when the obtained integrated value reaches a predetermined decreasing-amount-threshold.

As described above, when a state continues for a relatively long time in which the "air-fuel ratio of the catalyst inflow gas" is leaner than the stoichiometric air-fuel ratio, the precious metals supported by the catalyst become oxidized so that a superficial area of each of the precious metals substantially decreases, and thus, the catalyst-lean-poisoning occurs. The catalyst-lean-poisoning decreases the efficiency of purifying emissions of the catalyst. The catalyst-lean-poisoning can be eliminated by supplying a gas whose air-fuel ratio greatly deviates toward richer side from the stoichiometric air-fuel ratio to the catalyst.

In view of the above, the catalyst capability restoring means obtains an integrated value of an "amount by which the base fuel injection amount is decreased by the correction amount for the base fuel injection amount, the correction amount being formed of the main feedback amount and the sub feedback amount (i.e., by the air-fuel correction amount)" in a case when a state in which the air-fuel ratio correction amount is a value which decreases the base fuel injection amount continues, determines that the catalyst-lean-poisoning is likely to occur when a magnitude of the integrated value reaches a "predetermined decreasing-amount-threshold", and controls the "air-fuel ratio of the mixture supplied to the engine" in such a manner that the "air-fuel ratio of the mixture supplied to the engine" coincides with an "air-fuel ratio richer than the stoichiometric air-fuel ratio" for a predetermined second catalyst-restoring-time. Consequently, the catalyst-lean-poisoning can be eliminated/resolved, and therefore, it can be avoided that the efficiency of purifying emissions of the catalyst lowers due to the catalyst-lean-poisoning.

Further, in another aspect of the air-fuel ratio control apparatus of the present invention, the air-fuel ratio control means is configured so as to:

obtain a "fluctuation frequency of the output value of the downstream air-fuel ratio sensor" in a "period in which the normal air-fuel ratio feedback control is being performed" when the output value is a "value smaller than the first threshold and larger than the second threshold"; and perform an "oxygen storage amount feedback control" in place of the "normal air-fuel ratio feedback control" when the obtained fluctuation frequency becomes smaller than or equal to a predetermined threshold frequency, by estimating an oxygen storage amount of the catalyst, and by controlling the "air-fuel ratio of the mixture supplied to the engine" based on the estimated oxygen storage amount in such a manner that the "estimated oxygen storage amount" stays (is) "between a predetermined oxygen storage amount lower limit and a predetermined oxygen storage amount upper limit larger than the oxygen storage amount lower limit".

When the normal air-fuel ratio feedback control is being carried out, a case occurs in which the fluctuation frequency of the output value of the downstream air-fuel ratio sensor becomes small. The fluctuation frequency of the output value of the downstream air-fuel ratio sensor means an inverse number of a period when the output value of the downstream air-fuel ratio sensor repeatedly becomes larger than and then smaller than the middle value Vmid around the middle value Vmid. More specifically, the fluctuation frequency of the output value of the downstream air-fuel ratio sensor, for example, is a frequency corresponding to one period which is equal to a "time duration from a point in time at which the output value of the downstream air-fuel ratio sensor changes from a value smaller than the middle value Vmid to a value larger than the middle value Vmid to a point in time at which the output value again changes from a value smaller than the middle value Vmid to a value larger than the middle value Vmid after the output value changes from a value larger than the middle value Vmid to a value smaller than the middle value Vmid". Accordingly, the fluctuation frequency of the output value of the downstream air-fuel ratio sensor is also a frequency corresponding to one period which is equal to a "time duration from a point in time at which the output value of the downstream air-fuel ratio sensor changes from a value larger than the middle value Vmid to a value smaller than the middle value Vmid to a point in time at which the output value again changes from a value larger than the middle value Vmid to a value smaller than the middle value Vmid after the output value changes from a value smaller than the middle value Vmid to a value larger than the middle value Vmid".

The state in which the fluctuation frequency of the output value of the downstream air-fuel ratio sensor is small is a state in which the air-fuel ratio of the catalyst inflow gas continues to be very close to the stoichiometric air-fuel ratio. In such a case, it is hard for the catalyst-rich-poisoning and the catalyst-lean-poisoning to be eliminated. In other words, the efficiency of purifying emissions of the catalyst is higher when the "air-fuel ratio of the catalyst inflow gas" is greatly varied around the stoichiometric air-fuel ratio" as long as the emissions does not become worse than when the "air-fuel ratio of the catalyst inflow gas" is "maintained at a substantially constant air-fuel ratio in the vicinity of the stoichiometric air-fuel ratio".

In view of the above, according to the configuration described above, when the "fluctuation frequency during the normal air-fuel ratio control is being performed" becomes lower than the predetermined threshold frequency, the "normal air-fuel ratio control" is stopped, and the "air-fuel ratio of the mixture supplied to the engine" is controlled in such a manner that the oxygen storage amount of the catalyst varies in a "region (range) between the oxygen storage amount lower limit and the oxygen storage amount upper limit". This control allows the air-fuel ratio of the catalyst inflow gas to vary more greatly, and thus, the efficiency of purifying emissions of the catalyst can be improved. It should be noted that the oxygen storage amount lower limit and the oxygen storage amount upper limit are determined in such a manner that a difference between these limits is smaller than the maximum oxygen storage amount Cmax.

Further, the air-fuel ratio control means performing the above "oxygen storage amount feedback control" is preferably configured so as to:

stop (terminate, end) the oxygen storage amount feedback control, when the output value of the downstream air-fuel ratio sensor becomes larger than or equal to the first threshold or becomes smaller than or equal to the second threshold, while the oxygen storage amount feedback control is being performed; and start again (resume) a "control of the air-fuel ratio of the mixture supplied to the engine based on the output value of the downstream air-fuel ratio sensor".

According to the configuration described above, in a case in which the emissions are likely to worsen when the output value of the downstream air-fuel ratio sensor becomes larger than or equal to the first threshold, the air-fuel ratio control to make the output value of the downstream air-fuel ratio sensor become smaller than the first threshold is immediately carried out, and in a case in which the emissions are likely to worsen when the output value of the downstream air-fuel ratio sensor becomes smaller than or equal to the second threshold, the air-fuel ratio control to make the output value of the downstream air-fuel ratio sensor become larger than the first threshold is immediately carried out.

Accordingly, it can be avoided that the emissions becomes worse by performing the oxygen storage feedback control, even when the oxygen storage amount approaches "0" or the maximum oxygen storage amount Cmax.

DESCRIPTION OF THE BEST EMBODIMENT TO CARRY OUT THE INVENTION

Each of embodiments of an air-fuel ratio control apparatus for an internal combustion engine according to the present invention will next be described with reference to the drawings.

1. First Embodiment

Structure (Structure)

Figure 1:
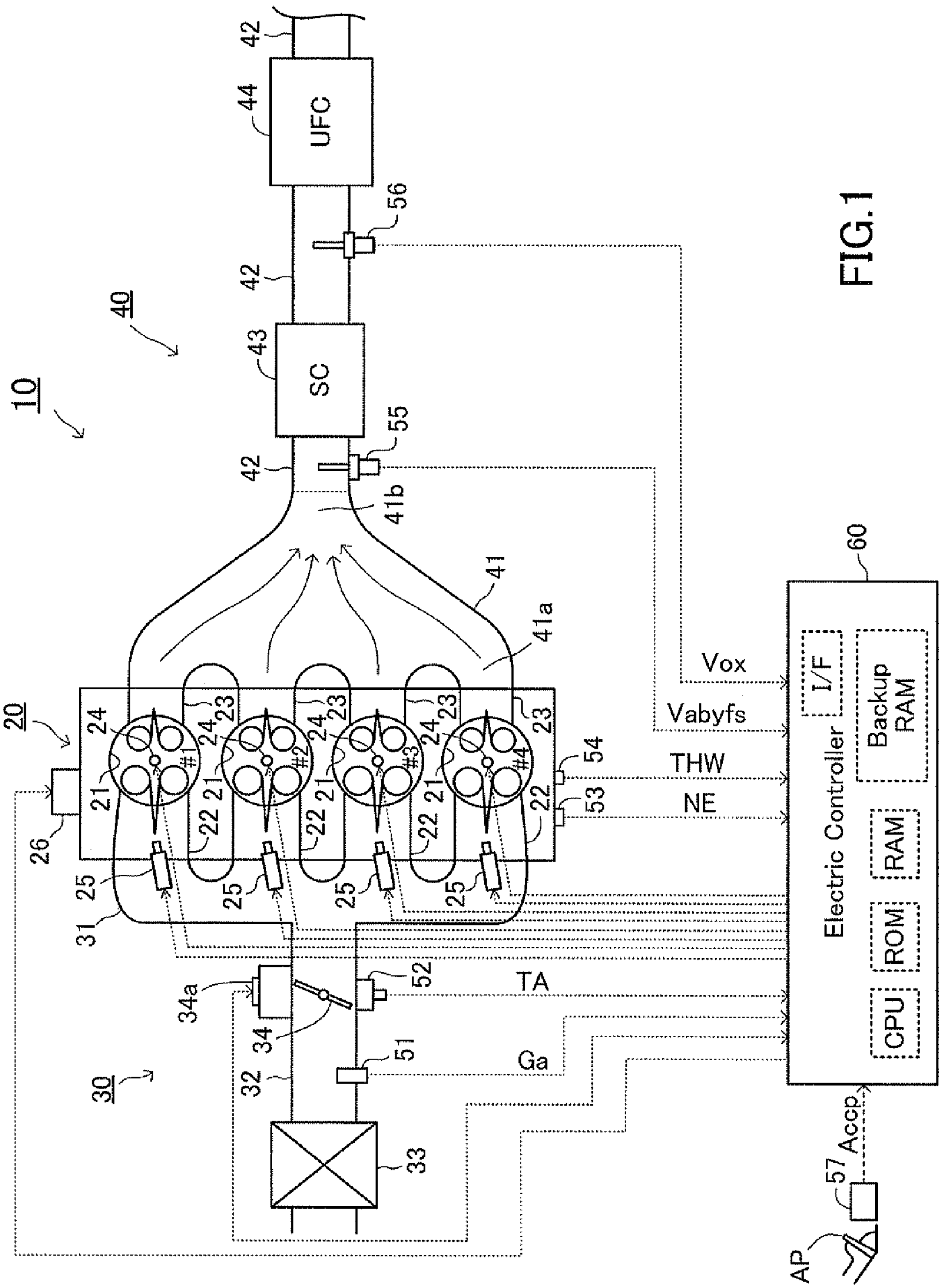
FIG. 1 is a schematic view of an internal combustion engine to which an air-fuel ratio control apparatus for the internal combustion engine (first control apparatus) according to a first embodiment of the present invention is applied.

FIG. 1 schematically shows a configuration of an internal combustion engine 10 to which an air-fuel ratio control apparatus according to a first embodiment of the present invention (hereinafter, referred to as a "first control apparatus") is applied. The engine 10 is a 4 cycle, spark-ignition, multi-cylinder (in the present example, 4 cylinder), gasoline engine. The engine 10 includes a main body section 20, an intake system 30, and an exhaust system 40.

The main body section 20 comprises a cylinder block section and a cylinder head section. The main body section 20 includes a plurality (four) of combustion chambers (a first cylinder #1 to a fourth cylinder #4) 21, each being formed of an upper surface of a piston, a wall surface of the cylinder, and a lower surface of the cylinder head section.

In the cylinder head section, intake ports 22, each of which is for supplying a "mixture comprising an air and a fuel" to each of combustion chambers (each of the cylinders) 21, are formed, and exhaust ports 23, each of which is for discharging an exhaust gas (burnt gas) from each of the combustion chambers 21, are formed. Each of the intake ports 22 is opened and closed by an intake valve which is not shown, and each of the exhaust ports 23 is opened and closed by an exhaust valve which is not shown.

A plurality (four) of spark plugs 24 are fixed in the cylinder head section. Each of the spark plugs 24 are provided in such a manner that its spark generation portion is exposed at a center portion of each of the combustion chambers 21 and at a position close to the lower surface of the cylinder head section. Each of the spark plugs 24 is configured so as to generate a spark for an ignition from the spark generation portion in response to an ignition signal.

A plurality (four) of fuel injection valves (injectors) 25 are fixed in the cylinder head section. Each of the fuel injectors 25 is provided for each of the intake ports 22 one by one (i.e., one injector per one cylinder). Each of the fuel injectors 25 is configured so as to inject, in response to an injection instruction signal, a "fuel of an instructed injection amount included in the injection instruction signal" into the corresponding intake port 22.

An intake valve control apparatus 26 is further provided in the cylinder head section. The intake valve control apparatus 26 comprises a well known configuration for hydraulically adjusting a relative angle (phase angle) between an intake cam shaft (now shown) and intake cams (not shown). The intake valve control apparatus 26 operates in response to an instruction signal (driving signal) so as to change opening timing of the intake valve.

The intake system 30 comprises an intake manifold 31, an intake pipe 32, an air filter 33, a throttle valve 34, and a throttle valve actuator **34*a***.

The intake manifold 31 includes a plurality of branch portions each of which is connected to each of the intake ports 22, and a surge tank to which the branch portions aggregate. The intake pipe 32 is connected to the surge tank. The intake manifold 31, the intake pipe 32, and a plurality of the intake ports 22 constitute an intake passage. The air filter is provided at an end of the intake pipe 32. The throttle valve 34 is rotatably supported by the intake pipe 32 at a position between the air filter 33 and the intake manifold 31. The throttle valve 34 is configured so as to adjust an opening sectional area of the intake passage provided by the intake pipe 32 when it rotates. The throttle valve actuator **34*a* includes a DC motor, and rotates the throttle valve 34** in response to an instruction signal (driving signal).

The exhaust system 40 includes an exhaust manifold 41, an exhaust pipe 42, an upstream-side catalytic converter (catalyst) 43, and a downstream-side catalytic converter (catalyst) 44.

The exhaust manifold 41 comprises a plurality of branch portions **41*a*, each of which is connected to each of the exhaust ports 23, and an aggregated (merging) portion (exhaust gas aggregated portion) 41*b* into which the branch portions 41*a* aggregate (merge). The exhaust pipe 42 is connected to the aggregated portion 41*b* of the exhaust manifold 41. The exhaust manifold 41, the exhaust pipe 42, and a plurality of the exhaust ports 23 constitute a passage through which the exhaust gas passes. It should be noted that a passage formed by the aggregated portion 41*b* of the exhaust manifold 41 and the exhaust pipe 42** is referred to as an "exhaust passage" for convenience, in the present specification.

The upstream-side catalytic converter 43 is a three-way catalyst which supports "noble (precious) metals which are catalytic substances" and "ceria ($CeO_2$) which is an oxygen storage substance", on a support made of ceramics to provide an oxygen storage function and an oxygen release function (oxygen storage function). The upstream-side catalytic converter 43 is disposed (interposed) in the exhaust pipe 42. When a temperature of the upstream-side catalytic converter reaches a certain activation temperature, it exerts a "catalytic function for purifying unburnt substances (HC, CO, $H_2$, and so on) and nitrogen oxide (NOx) simultaneously" and the "oxygen storage function". It should be noted that the upstream-side catalytic converter 43 is also referred to as a "start-catalytic converter (SC)" or a "first catalyst".

The downstream-side catalytic converter 44 is the three-way catalyst similar to the upstream-side catalytic converter 43. The downstream-side catalytic converter 44 is disposed (interposed) in the exhaust pipe 42 at a position downstream of the upstream-side catalytic converter 43. The downstream-side catalytic converter 44 is also referred to as an "under-floor-catalytic converter (UFC)" or a "second catalyst", since it is disposed under a floor of a vehicle. It should be noted that, when the term "catalyst" is used, the catalyst means the upstream-side catalytic converter 43 in the present specification.

The first control apparatus includes a hot-wire air flowmeter 51, a throttle position sensor 52, an engine rotational speed sensor 53, a water temperature sensor 54, an upstream (upstream-side) air-fuel ratio sensor 55, a downstream (downstream-side) air-fuel ratio sensor 56, and an accelerator opening sensor 57.

The hot-wire air flowmeter 51 measures a mass flow rate of an intake air flowing through the intake pipe 32 so as to output an signal representing the mass flow rate (intake air amount of the engine 10 per unit time) Ga.

The throttle position sensor 52 detects an opening (degree) of the throttle valve 34, and outputs a signal representing the throttle valve opening TA.

The engine rotational speed sensor 53 outputs a signal which includes a narrow pulse generated every time the intake cam shaft rotates 5 degrees and a wide pulse generated every time the intake cam shaft rotates 360 degrees. The signal output from the engine rotational speed sensor 53 is converted into a signal representing an engine rotational speed NE by an electric controller 60 described later. Further, the electric controller 60 obtains, based on the signal from the engine rotational speed sensor 53 and a signal from a crank angle sensor which is not shown, a crank angle (absolute crank angle) of the engine 10.

The water temperature sensor 54 detects a temperature of a cooling water (coolant) of the internal combustion engine 10 so as to output a signal representing the cooling water temperature THW.

The upstream air-fuel ratio sensor 55 is disposed at a position between the aggregated portion 41*b* of the exhaust manifold 41 and the upstream-side catalyst 43, and in either one of the exhaust manifold 41 and the exhaust pipe 42 (that is, in the exhaust passage)". The upstream air-fuel ratio sensor 55 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 2:
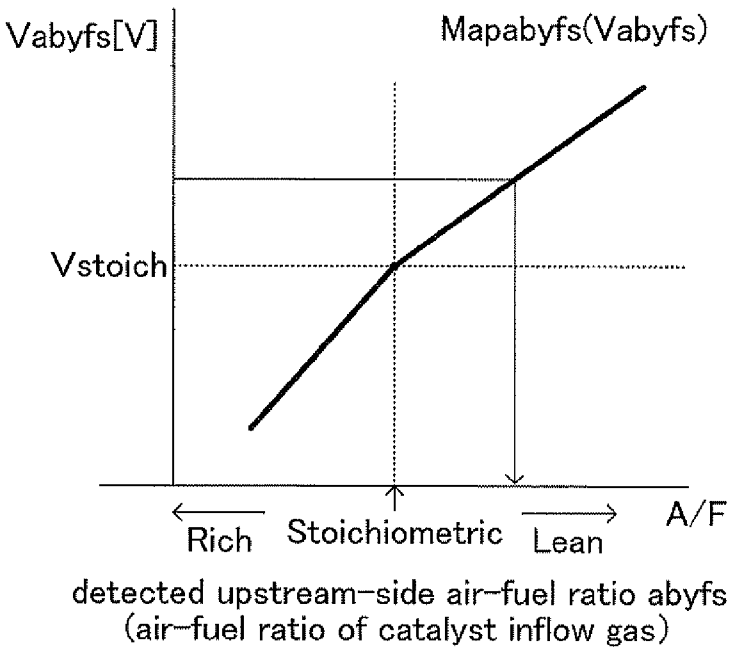
FIG. 2 is a graph showing a relationship between an output voltage of an upstream air-fuel ratio sensor shown in FIG. 1 and an air-fuel ratio.

As shown in FIG. 2, the upstream air-fuel ratio sensor 55 outputs an output value Vabyfs according to an air-fuel ratio (air-fuel ratio of a "catalyst inflow gas" which is a gas flowing into the catalyst 43, or detected upstream-side air-fuel ratio abyfs) of an exhaust gas flowing through the position at which the upstream air-fuel ratio sensor 55 is disposed. The output values Vabyfs increases (or becomes larger), as the air-fuel ratio of the catalyst inflow gas becomes larger (i.e. as the air-fuel ratio of the catalyst inflow gas becomes leaner).

The electric controller 60 stores an air-fuel ratio conversion table (map) Mapabyfs shown in FIG. 2. The electric controller 60 detects an actual upstream-side air-fuel ratio abyfs (or obtains the detected upstream-side air-fuel ratio abyfs) by applying the output value Vabyfs to the air-fuel ratio conversion table Mapabyfs.

Referring back to FIG. 1 again, the downstream air-fuel ratio sensor 56 is disposed in the exhaust pipe 42 (i.e., in the exhaust passage), and at a position between the upstream-side catalytic converter 43 and the downstream-side catalytic converter 44. The downstream air-fuel ratio sensor 56 is a well-known oxygen-concentration-cell-type oxygen concentration sensor (O2 sensor). For example, the downstream air-fuel ratio sensor 56 comprises a solid electrolyte layer, an exhaust-gas-side electrode layer formed on an outer surface of the solid electrolyte layer, an atmosphere-side electrode layer formed on an inner surface of the solid electrolyte layer in such a manner that it is exposed in an atmosphere chamber (inside of the solid electrolyte layer) and faces (opposes) to the exhaust-gas-side electrode layer to sandwich the solid electrolyte layer therebetween, and a diffusion resistance layer which covers the exhaust-gas-side electrode layer and with which the exhaust gas contacts (or which is exposed in the exhaust gas). The downstream air-fuel ratio sensor 56 may have a test-tube shape or plate shape. The downstream air-fuel ratio sensor 56 outputs an output value Voxs in accordance with an air-fuel ratio (downstream-side air-fuel ratio afdown) of an exhaust gas (i.e., a "catalyst outflow gas" which is a gas flowing out from the catalyst 43) passing through the position at which the downstream air-fuel ratio sensor 56 is disposed.

Figure 3:
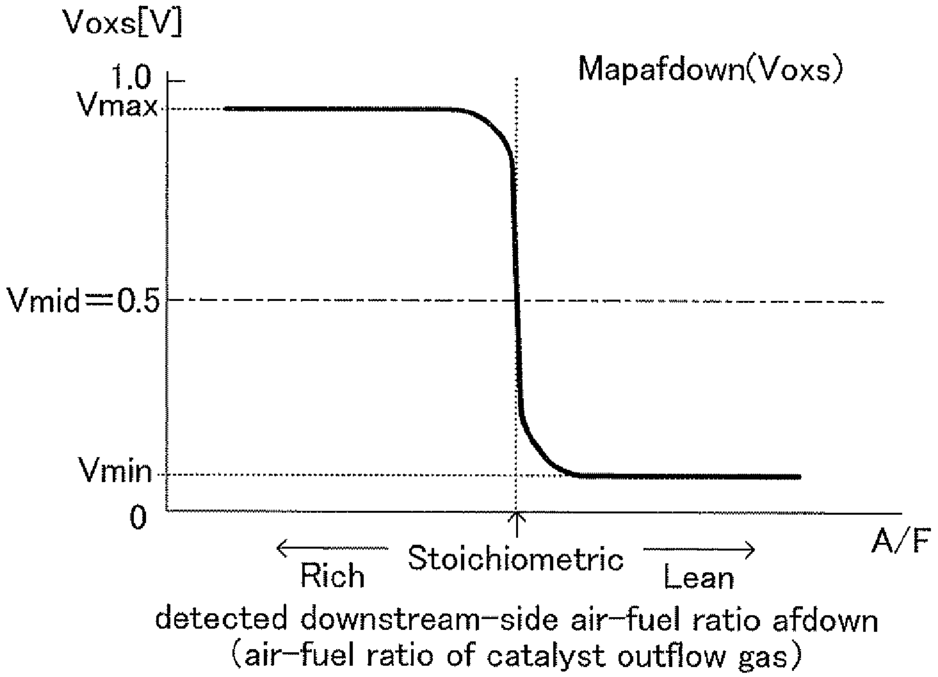
FIG. 3 is a graph showing a relationship between an output voltage of a downstream air-fuel ratio sensor shown in FIG. 1 and an air-fuel ratio.
Figure 4:
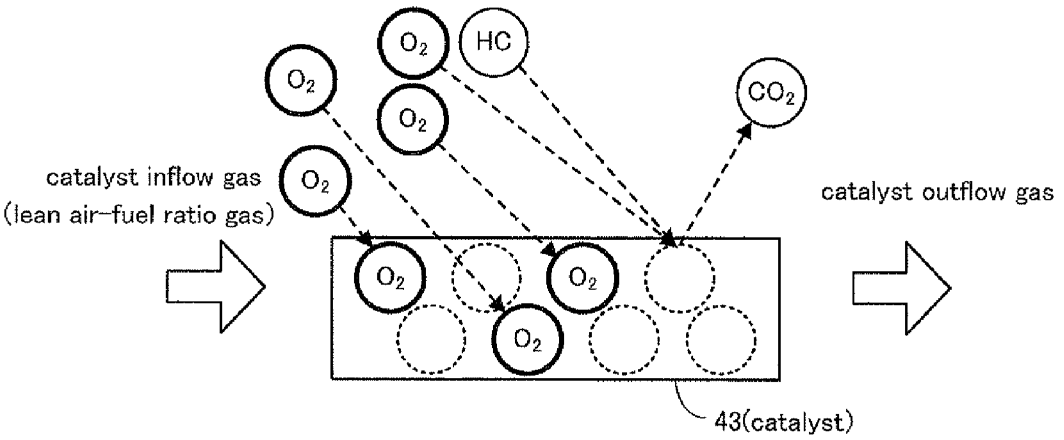
FIG. 4 is a conceptual view showing a behavior/function of a catalyst which is in a state in which oxygen is short, when a gas whose air-fuel ratio is a lean air-fuel ratio (air-fuel ratio leaner than the stoichiometric air-fuel ratio) flows into the catalyst.
Figure 5:
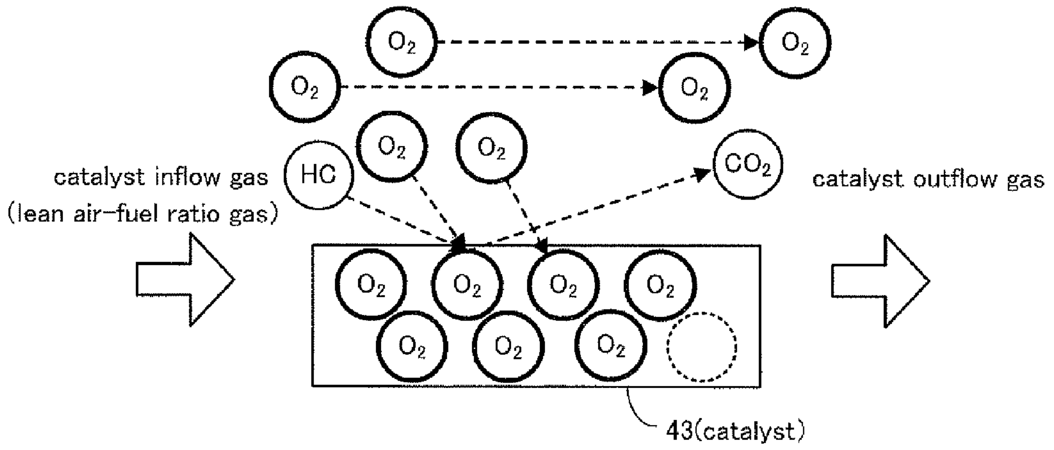
FIG. 5 is a conceptual view showing a behavior/function of the catalyst which is in a state in which oxygen is excessive, when a gas whose air-fuel ratio is the lean air-fuel ratio flows into the catalyst.
Figure 6:
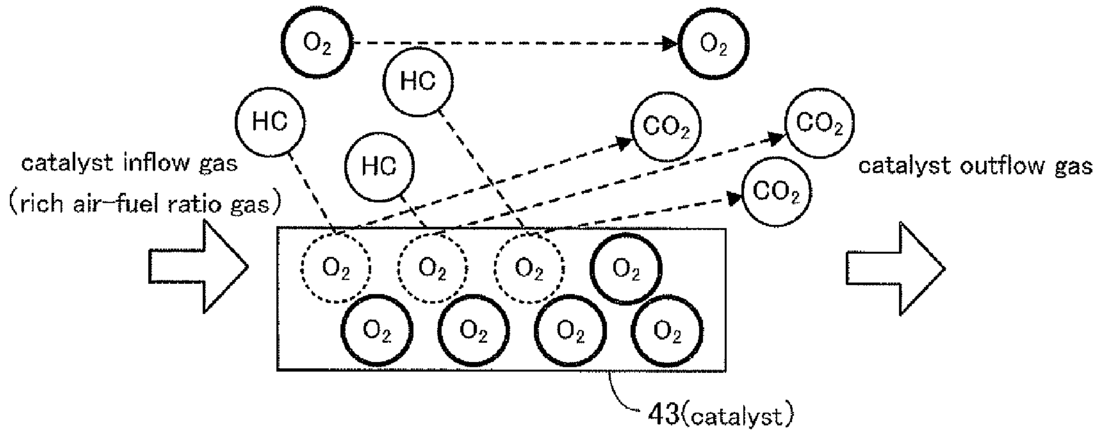
FIG. 6 is a conceptual view showing a behavior/function of the catalyst which is in the state in which oxygen is excessive, when a gas whose air-fuel ratio is a rich air-fuel ratio (air-fuel ratio richer than the stoichiometric air-fuel ratio) flows into the catalyst.
Figure 7:
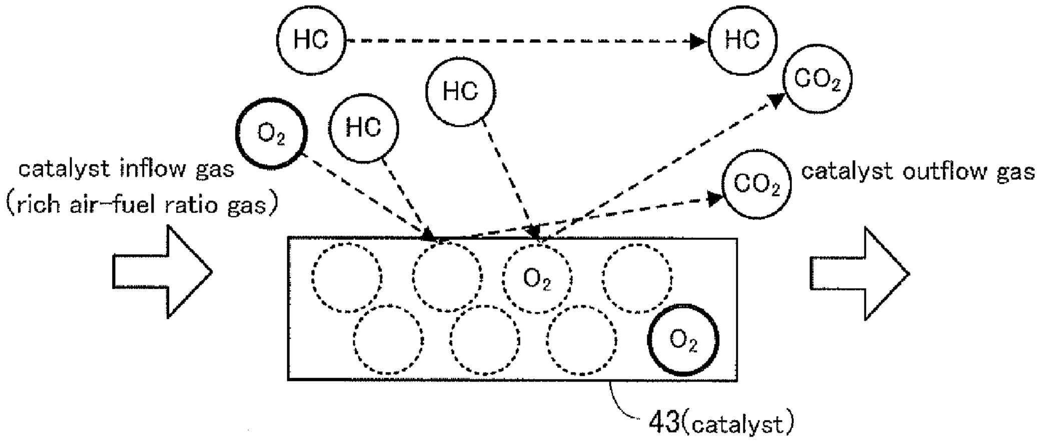
FIG. 7 is a conceptual view showing a behavior/function of the catalyst which is in the state in which oxygen is short, when a gas whose air-fuel ratio is the rich air-fuel ratio flows into the catalyst.

As shown in FIG. 3, the output value Voxs of the downstream air-fuel ratio sensor 56 becomes equal to a maximum output value Vmax (e.g., about 0.9 V or 1.0 V) when the air-fuel ratio of the catalyst outflow gas (air-fuel ratio of the gas to be detected) is richer than the stoichiometric air-fuel ratio, and therefore, when a partial pressure of oxygen in the catalyst outflow gas after an oxidation equilibrium is small. That is, the downstream air-fuel ratio sensor 56 outputs the maximum output value Vmax when the oxygen is not included in the catalyst outflow gas.

Further, the output value Voxs becomes equal to a minimum output value Vmin (e.g., about 0.1 V or 0 V) when the air-fuel ratio of the catalyst outflow gas is leaner than the stoichiometric air-fuel ratio, and therefore, when the partial pressure of oxygen in the catalyst outflow gas after the oxidation equilibrium is large. That is, the downstream air-fuel ratio sensor 56 outputs the minimum output value Vmin when the excessive oxygen (an excessively large amount of oxygen) is included in the catalyst outflow gas.

Further, the output value Voxs rapidly decreases from the maximum output value Vmax to the minimum output value Vmin, when the air-fuel ratio of the catalyst outflow gas changes from an air-fuel ratio richer than the stoichiometric air-fuel ratio to an air-fuel ratio leaner than the stoichiometric air-fuel ratio. In contrast, the output value Voxs rapidly increases from the minimum output value Vmin to the maximum output value Vmax, when the air-fuel ratio of the catalyst outflow gas changes from an air-fuel ratio leaner than the stoichiometric air-fuel ratio to an air-fuel ratio richer than the stoichiometric air-fuel ratio.

The accelerator opening sensor 57 shown in FIG. 1 detects an operation amount of the accelerator pedal AP operated by a driver so as to output a signal representing the operation amount Accp of the accelerator pedal AP.

The electric controller 60 is a circuit including a "well-known microcomputer", comprising "a CPU, a ROM, a RAM, a backup RAM, an interface including an AD converter, and so on".

The backup RAM which the electric controller 60 comprises is supplied with an electric power from a battery mounted on a vehicle on which the engine 10 is mounted, regardless of a position (off-position, start position, on-position, and so on) of an unillustrated ignition key switch of the vehicle. The backup RAM is configured in such a manner that data is stored in (written into) the backup RAM according to an instruction of the CPU while the electric power is supplied to the backup RAM, and the backup RAM holds (retains, stores) the data in such a manner that the data can be read out. When the electric power supply to the backup RAM is stopped due to a removal of the battery from the vehicle, or the like, the backup RAM can not hold the data. That is, the stored data is lost (eliminated, broken).

The interface of the electric controller 60 is connected to the sensors 51 to 57 and supplies signals from the sensors to the CPU. Further, the interface sends instruction signals (drive signals), in accordance with instructions from the CPU, to each of the spark plugs 24 of each of the cylinders, each of the fuel injectors 25 of each of the cylinders, the intake valve control apparatus 26, the throttle valve actuator 34*a*, and so on. It should be noted that the electric controller 60 sends the instruction signal to the throttle valve actuator 34*a*, in such a manner that the throttle valve opening angle TA is increased as the obtained accelerator pedal operation amount Accp becomes larger.

(Outlines of an Air-Fuel Ratio Control of the First Control Apparatus)

Figure 10:
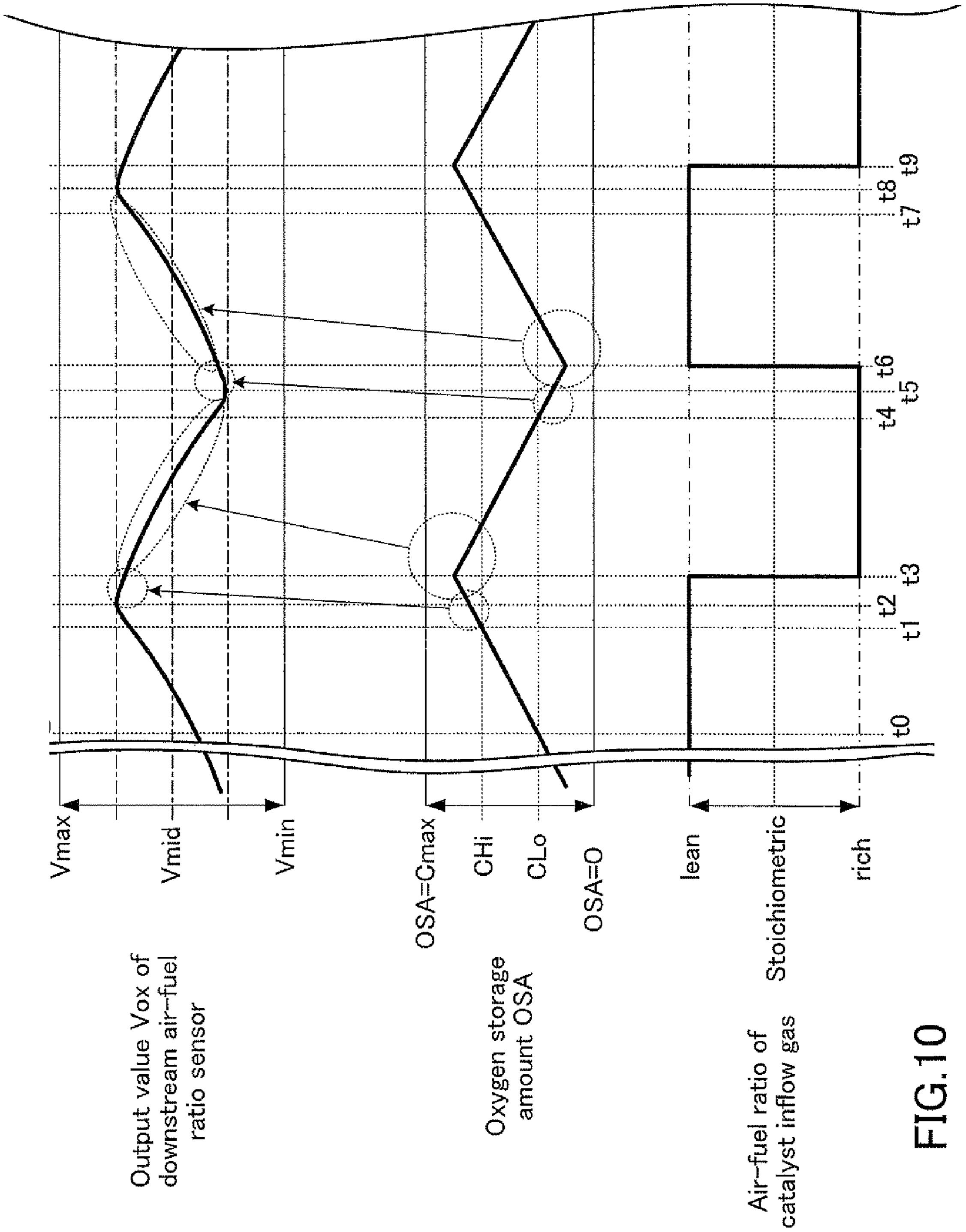
FIG. 10 is a timing chart showing "the output value of the downstream air-fuel ratio sensor, the oxygen storage amount of the catalyst, and an air-fuel ratio of a catalyst inflow gas" while the first control apparatus is performing a normal air-fuel ratio feedback control.
Figure 11:
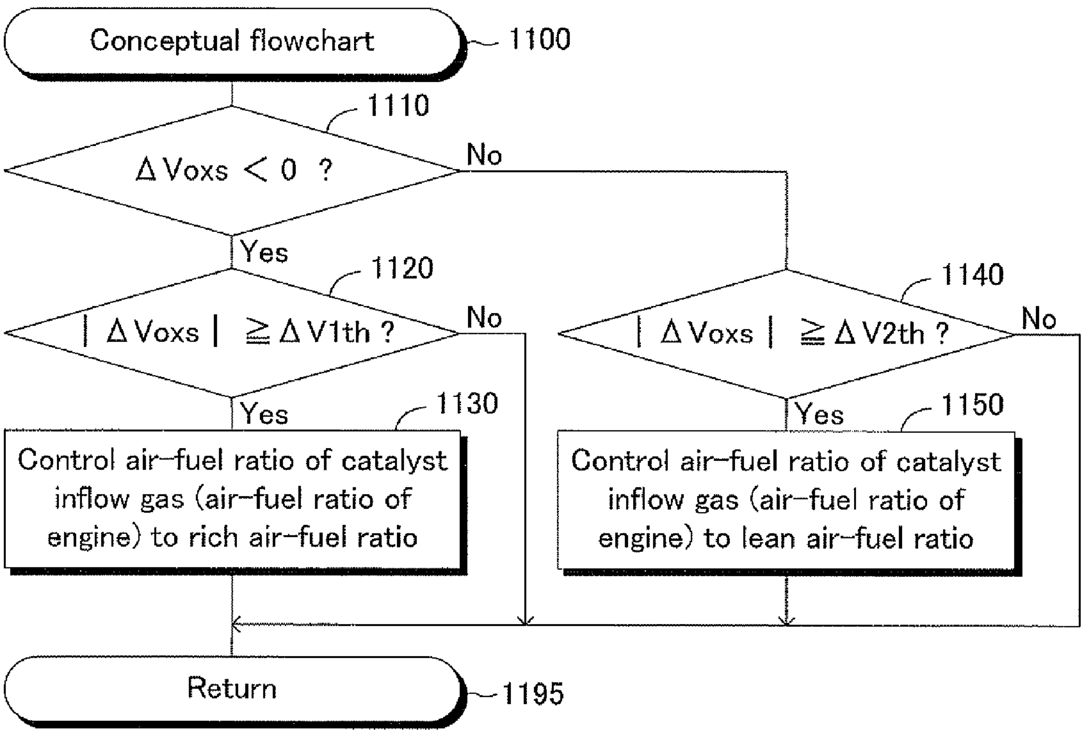
FIG. 11 is a conceptual flowchart showing an operation of the first control apparatus.

Next will be described the outlines of an "air-fuel ratio feedback control" according to the first control apparatus. FIG. 10 is a timing chart showing "the output value Voxs of the downstream air-fuel ratio sensor 56, the oxygen storage amount OSA of the catalyst 43, and the air-fuel ratio of the catalyst inflow gas which is the gas flowing into the catalyst 43" while an air-fuel ratio feedback control in a stable (normal) state (hereinafter, referred to as a "normal air-fuel ratio feedback control") is being performed. It should be noted that simplified waveforms of the actual waveforms of the various values are shown in FIG. 10, for easy understanding. FIG. 11 is a conceptual flowchart showing an operation relating to the air-fuel ratio control by the first control apparatus. It should be also noted that the first control apparatus substantially performs the operation shown in FIG. 11 when the output value Voxs of the downstream air-fuel ratio sensor 56 is between "a first threshold and a second threshold" described later.

In the example shown in FIG. 10, it is assumed that the oxygen storage amount OSA at the time t0 is equal to a lower limit CLo (value in the vicinity of "0"), and the air-fuel ratio of the catalyst inflow gas is controlled so as to be an air-fuel ratio (lean air-fuel ratio) leaner than the stoichiometric air-fuel ratio. Under this assumption, since the air-fuel ratio of the catalyst inflow gas is the lean air-fuel ratio, an excessive (amount of) oxygen flows into the catalyst 43. Accordingly, the oxygen storage amount OSA gradually increases.

Thereafter, the oxygen storage amount OSA reaches an "upper limit (value in the vicinity of a maximum oxygen storage amount Cmax) CHi" at the time t1. At this state, the catalyst 43 can no longer absorb/store the oxygen efficiently. Accordingly, a relatively large amount of the oxygen starts to be included in the catalyst outflow gas which is the gas flows out of the catalyst 43. Consequently, the output value Voxs of the downstream air-fuel ratio sensor 56 starts to decrease toward the minimum output value Vmin from the time t2 which is immediately after the time t1. After that, a magnitude |ΔVoxs| of a change rate of the output value Voxs becomes larger than or equal to a first change rate threshold ΔV1th at the time 13. The first change rate threshold ΔV1th is a predetermined value equal to "0" or larger than "0".

At this point in time, the first control apparatus makes a "Yes" determination at "step 1110 for determining whether or not the change rate ΔVoxs of the output value Voxs is negative" shown in FIG. 11, and also makes a "Yes" determination at "step 1120 for determining whether or not the magnitude |ΔVoxs| of the change rate of the output value Voxs is larger than or equal to the first change rate threshold ΔV1th". It should be noted that, if the first change rate threshold ΔV1th is equal to "0", the step 1120 can be omitted.

Then, the first control apparatus proceeds to step 1130 at which it controls an air-fuel ratio of the mixture supplied to the engine (herinafter, also referred to as an "air-fuel ratio of the engine") in such a manner that the air-fuel ratio of the engine is set at (to) an air-fuel ratio (rich air-fuel ratio) richer than the stoichiometric air-fuel ratio, to have the air-fuel ratio of the catalyst inflow gas become the rich air-fuel ratio. Consequently, excessive unburnt substances (excessive amount of the unburnt substances) are flowed into the catalyst 43, and the oxygen storage amount OSA starts to decrease, as shown in the period after the time t3 in FIG. 10.

In this manner, when the output value Voxs of the downstream air-fuel ratio sensor 56 starts to decrease (the time t2) while the air-fuel ratio of the catalyst inflow gas is the lean air-fuel ratio, the oxygen storage amount OSA of the catalyst 43 is no longer an amount in the vicinity of "0", but rather has increased to a value (value larger than the upper limit CHi) in the vicinity of the maximum oxygen storage amount Cmax, even when the output value Voxs is larger than the middle value Vmid (which is a mid value or a mean value of the maximum output value Vmax and the minimum output value Vmin, i.e., Vmid=(Vmax+Vmin)/2).

Accordingly, when the output value Voxs of the downstream air-fuel ratio sensor 56 is decreasing (especially, when the output value Voxs is decreasing and the magnitude |ΔVoxs| of the change rate of the output value Voxs is larger than or equal to the first change rate threshold ΔV1th), an air-fuel ratio of a gas which should be supplied to the catalyst 43 (i.e., required air-fuel ratio of the catalyst inflow gas) is the rich air-fuel ratio. In view of the above, the first control apparatus sets the air-fuel ratio of the catalyst inflow gas at (to) the rich air-fuel ratio, when the magnitude |ΔVoxs| of the change rate of the output value Voxs of the downstream air-fuel ratio sensor 56 becomes larger than or equal to the first change rate threshold ΔV1th while the output value Voxs is decreasing (the time t3). Consequently, the oxygen storage amount OSA of the catalyst 43 can be started to be decreased at a point in time before the oxygen storage amount OSA reaches the maximum oxygen storage amount Cmax (refer to a period after the time t3). Accordingly, the first control apparatus can avoid a "case in which a large amount of NOx is flowed out to the position downstream of the catalyst due to a state in which the oxygen storage amount OSA reaches the maximum oxygen storage amount Cmax".

The oxygen storage amount OSA gradually decreases after the time t3. Meanwhile, the "excessive oxygen included in the gas flowed out from the catalyst 43 (catalyst outflow gas) immediately after the time t1" remains in the vicinity of the downstream air-fuel ratio sensor 56 and in the diffusion resistance layer of the downstream air-fuel ratio sensor 56. Consequently, the output value Voxs of the downstream air-fuel ratio sensor 56 continues to decrease.

Thereafter, the oxygen storage amount OSA reaches the lower limit CLo at the time t4. At this point in time, the catalyst 43 has reached a state in which the catalyst can not purify a large amount of the unburnt substances included in the catalyst inflow gas. Accordingly, a relatively large amount of the unburnt substances start to be included in the catalyst outflow gas. The unburnt substances consume the oxygen remaining in the vicinity of the downstream air-fuel ratio sensor 56 and in the diffusion resistance layer of the downstream air-fuel ratio sensor 56. Consequently, the output value Voxs of the downstream air-fuel ratio sensor 56 starts to increase toward the maximum output value Vmax from the time t5 which is immediately after the time t4. Then, the magnitude |ΔVoxs| of the change rate of the output value Voxs becomes larger than or equal to a second change rate threshold ΔV2th at the time t6. The second change rate threshold ΔV2th is a predetermined value equal to "0" or larger than "0".

At this point in time, the first control apparatus makes a "No" determination at "step 1110 for determining whether or not the change rate ΔVoxs of the output value Voxs is negative" shown in FIG. 11, and makes a "Yes" determination at "step 1140 for determining whether or not the magnitude |ΔVoxs| of the change rate of the output value Voxs is larger than or equal to the second change rate threshold ΔV2th". It should be noted that, if the second change rate threshold ΔV2th is equal to "0", the step 1140 can be omitted.

Then, the first control apparatus proceeds to step 1150 at which it controls the air-fuel ratio of the engine in such a manner that the air-fuel ratio of the engine is set at (to) the lean air-fuel ratio, to have the air-fuel ratio of the catalyst inflow gas become the lean air-fuel ratio. Consequently, excessive oxygen (excessive amount of the oxygen) is flowed into the catalyst 43, the oxygen storage amount OSA starts to increase, as shown in the period after the time t6 in FIG. 10.

In this manner, when the output value Voxs of the downstream air-fuel ratio sensor 56 starts to increase (the time t6) while the air-fuel ratio of the catalyst inflow gas is the rich air-fuel ratio, the oxygen storage amount OSA of the catalyst 43 is no longer an amount in the vicinity of the maximum oxygen storage amount Cmax, but rather has decreased to a value (value smaller than the lower limit CLo) in the vicinity of "0", even when the output value Voxs is smaller than the middle value Vmid.

Accordingly, when the output value Voxs of the downstream air-fuel ratio sensor 56 is increasing (especially, when the output value Voxs is increasing and the magnitude |ΔVoxs| of the change rate of the output value Voxs is larger than or equal to the second change rate threshold ΔV2th), the required air-fuel ratio of the catalyst inflow gas is the lean air-fuel ratio. In view of the above, the first control apparatus sets the air-fuel ratio of the catalyst inflow gas at (to) the lean air-fuel ratio, when the magnitude |ΔVoxs| of the change rate of the output value Voxs of the downstream air-fuel ratio sensor 56 becomes larger than or equal to the second change rate threshold ΔV2th while the output value Voxs is increasing (the time t6). Consequently, the oxygen storage amount OSA can be started to be increased at a point in time before the oxygen storage amount OSA reaches "0" (refer to a period after the time t6). Accordingly, the first control apparatus can avoid a "case in which an amount of the unburnt substances discharged (to the exterior of the engine) increases due to a state in which the oxygen storage amount OSA reaches "0"".

The oxygen storage amount OSA gradually increases after the time t6. Meanwhile, the "excessive unburnt substances included in the catalyst outflow gas immediately after the time t4" remain in the vicinity of the downstream air-fuel ratio sensor 56 and in the diffusion resistance layer of the downstream air-fuel ratio sensor 56. Consequently, the output value Voxs of the downstream air-fuel ratio sensor 56 continues to increase.

Thereafter, the oxygen storage amount OSA again reaches the upper limit CHi at the time t7. As a result, the output value Voxs of the downstream air-fuel ratio sensor 56 starts to decrease at the time t8. Thereafter, when the magnitude |ΔVoxs| of the change rate of the output value Voxs becomes larger than or equal to the first change rate threshold ΔV1th at the time t9, the first control apparatus sets the catalyst inflow gas at (to) the rich air-fuel ratio, similarly to the period after the time t3.

It should be noted that, when the first control apparatus makes a "No" determination at either step 1120 shown in FIG. 11 or step 1140 shown in FIG. 11, the first apparatus maintains the air-fuel ratio of the catalyst inflow gas at an air-fuel ratio at (to) which the air-fuel ratio of the catalyst inflow gas has been set previously. These are the outlines of the "normal air-fuel ratio feedback control by the first control apparatus" under the stable state. In this way, the first control apparatus varies the oxygen storage amount OSA within a range between a value in the vicinity of the lower limit CLo and a value in the vicinity of the upper limit CHi, without having the oxygen storage amount OSA reach "0" and the maximum oxygen storage amount Cmax. Accordingly, it can prevent NOx and the unburnt substances from being discharged by a great amount.

As is understood from the above description, the first control apparatus determines whether the state of the catalyst 43 is the "state in which the oxygen is excessive (i.e., the oxygen storage amount OSA is in the vicinity of the maximum oxygen storage amount Cmax)" or the "state in which the oxygen is short (i.e., the oxygen storage amount OSA is in the vicinity of "0")", based on the change rate ΔVoxs of the output value Voxs of the downstream air-fuel ratio sensor 56 (i.e., sign of the change rate ΔVoxs and/or the magnitude of the change rate ΔVoxs), to control the air-fuel ratio of the catalyst inflow gas.

More specifically, the first control apparatus determines that the state of the catalyst 43 is no longer the state in which the oxygen is short when the output value Voxs of the downstream air-fuel ratio sensor 56 is decreasing. Further, the first control apparatus determines that the state of the catalyst 43 is the state in which the oxygen is excessive or a state close to the state in which the oxygen is excessive, when the magnitude |ΔVoxs| of the change rate of the output value Voxs of the downstream air-fuel ratio sensor 56 is larger than or equal to the first change rate threshold ΔV1th while the output value Voxs is decreasing.

Further, the first control apparatus may be configured so as to determine that the state of the catalyst 43 is becoming much closer to the state in which the oxygen is excessive, as the magnitude |ΔVoxs| of the change rate of the output value Voxs of the downstream air-fuel ratio sensor 56 becomes larger while the output value Voxs is decreasing.

Accordingly, the first control apparatus may be configured so as to set the air-fuel ratio of the catalyst inflow gas to (at) a "much richer (deeper) air-fuel ratio", as the state of the catalyst 43 is becoming much closer to the state in which the oxygen is excessive (i.e, as the magnitude |ΔVoxs| of the change rate of the output value Voxs of the downstream air-fuel ratio sensor 56 becomes larger while the output value Voxs is decreasing). Note that, the much richer (deeper) air-fuel ratio means a rich air-fuel ratio having a greater magnitude of a difference between the air-fuel ratio and the stoichiometric air-fuel ratio.

In addition, the first control apparatus determines that the state of the catalyst 43 is no longer the state in which the oxygen is excessive when the output value Voxs of the downstream air-fuel ratio sensor 56 is increasing. Further, the first control apparatus determines that the state of the catalyst 43 is the state in which the oxygen is short or a state close to the state in which the oxygen is short, when the magnitude |ΔVoxs| of the change rate of the output value Voxs of the downstream air-fuel ratio sensor 56 is larger than or equal to the second change rate threshold ΔV2th while the output value Voxs is increasing.

Further, the first control apparatus may be configured so as to determine that the state of the catalyst 43 is becoming much closer to the state in which the oxygen is short, as the magnitude |ΔVoxs| of the change rate of the output value Voxs of the downstream air-fuel ratio sensor 56 becomes larger while the output value Voxs is increasing.

Accordingly, the first control apparatus may be configured so as to set the air-fuel ratio of the catalyst inflow gas to (at) a "much leaner (deeper) air-fuel ratio", as the state of the catalyst 43 is becoming much closer to the state in which the oxygen is short (i.e, as the magnitude |ΔVoxs| of the change rate of the output value Voxs of the downstream air-fuel ratio sensor 56 becomes larger while the output value Voxs is increasing). Note that, the much leaner (deeper) air-fuel ratio means a lean air-fuel ratio having a greater magnitude of a difference between the air-fuel ratio and the stoichiometric air-fuel ratio.

(Actual Operation)

The actual operation of the first control apparatus will next be described. It should be noted that, hereinafter, "MapX(a1, a2, . . . )" represents a table to obtain the value X based on arguments (parameters) a1, a2, . . . , for convenience of description.

<Fuel Injection Control>

Figure 12:
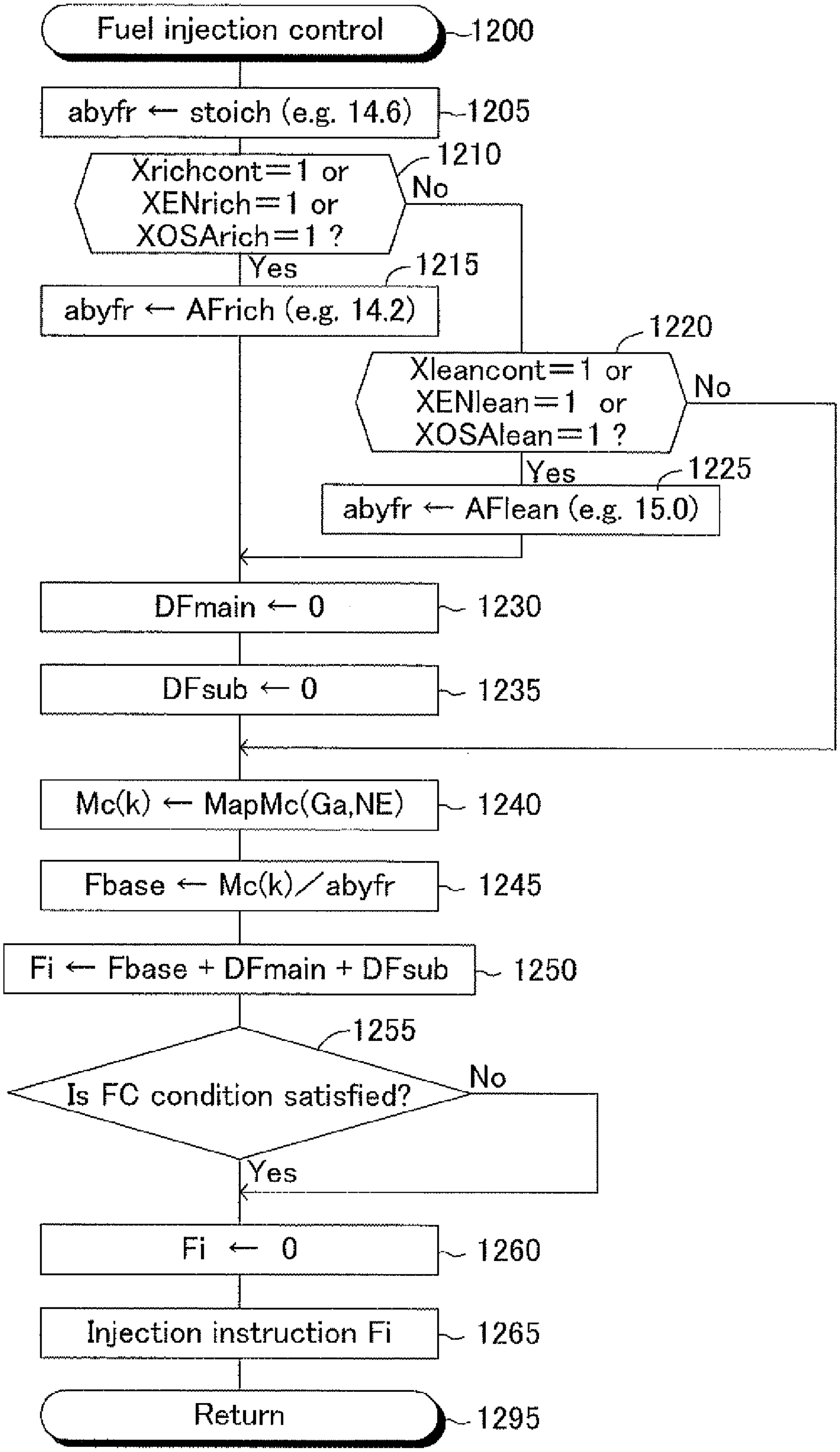
FIG. 12 is a flowchart showing a routine, executed by a CPU of the first control apparatus, for calculating a fuel injection amount and for instructing an injection.

The CPU repeatedly executes a routine shown by a flowchart in FIG. 12, to calculate a final fuel injection amount Fi and to instruct a injection, every time the crank angle of any one of the cylinders reaches a predetermined crank angle before its intake top dead center (e.g., BTDC 90° C.A). Accordingly, when the crank angle of any one of the cylinders reaches the predetermined crank angle, the CPU starts a process from step 1200 to proceed to step 1205 at which the CPU sets a target upstream-side air fuel ratio abyfr at (to) the stoichiometric air-fuel ratio stoich (e.g., 14.6).

Subsequently, the CPU proceeds to step 1210 to determine whether or not any one of values of a rich control flag Xrichcont, an enforced rich flag XENrich, and an oxygen storage amount adjusting rich flag XOSArich is equal to "1". It is assumed that all of the values of these flags are equal to "0". It should be noted that all of the values of these flags are set to(at) "0" in an unillustrated initialization routine executed when a position of an unillustrated ignition key switch of the vehicle on which the engine 10 is mounted is changed from the off-position to the on-position. Now the values of these flags are set to (at) "1" will be described later.

According to the assumption, the CPU makes a "No" determination at step 1210 to proceed to step 1220 at which the CPU determines whether or not any one of values of a lean control flag Xleancont, an enforced lean flag XENlean, and an oxygen storage amount adjusting lean flag XOSAlean is equal to "1". Further, here, it is assumed that all of the values of these flags are equal to "0". All of the values of these flags are also set to(at) "0" in the initialization routine described above. How the values of these flags are set to (at) "1" will be described later.

According to the assumption, the CPU makes a "No" determination at step 1220 to execute processes from step 1240 to step 1265 in order, and then proceed to step 1295.

Step 1240: The CPU obtains (estimate/determines) a cylinder intake air amount Mc(k) introduced into a "cylinder whose current intake stroke will come within a short time" based on the table MapMc(Ga, NE). The cylinder whose current intake stroke will come within a short time is also referred to as a "fuel injection cylinder". Ga is the intake air amount measured by the air flowmeter 51. NE is the engine rotational speed separately obtained. The cylinder intake air amount Mc(k) is stored in the RAM, while being related to the intake stroke of each of the cylinders. It should be noted that the cylinder intake air amount Mc(k) may be estimated based on a well-known air model.

Step 1245: The CPU obtains a base fuel injection amount Fbase for having the air-fuel ratio of the engine coincide with the target upstream-side air-fuel ratio abyfr by dividing the cylinder intake air amount Mc(k) by the target upstream-side air-fuel ratio abyfr, according to a formula (1) described below. In this case, the target upstream-side air-fuel ratio abyfr is set to (at) the "stoichiometric air-fuel ratio" at step 1205 described above. Accordingly, the base fuel injection amount is a feedforward amount to have the air-fuel ratio of the engine coincide with the stoichiometric air-fuel ratio.

$$F\text{base}=Mc(k)/abyfr \tag{1}$$

Step 1250: The CPU calculates a final fuel injection amount Fi according to a formula (2) described below. That is, the CPU calculates the final fuel injection amount Fi by correcting the base fuel injection amount Fbase with a main feedback amount DFmain as well as a sub feedback amount DFsub. Specifically, the CPU obtains the final fuel injection amount Fi by adding both the main feedback amount DFmain and the sub feedback amount DFsub to the base fuel injection amount Fbase. It should be noted that a sum (DFmain+DFsub) of the main feedback amount DFmain and the sub feedback amount DFsub is also referred to as an air-fuel ratio correction amount, since the sum is an amount to correct the base fuel injection amount Fbase.

$$Fi=F\text{base}+DF\text{main}+DF\text{sub} \tag{2}$$

Step 1255: The CPU determines whether or not a fuel cut condition (condition for terminating a fuel supply) is satisfied. The fuel cut condition (FC condition) is satisfied, for example, when the operation amount Accp is equal to "0" (or the throttle valve opening TA is equal to "0") and the engine rotational speed NE is equal to or higher than a fuel cut rotational speed NEFCth. Further, the fuel cut condition becomes unsatisfied, when the either the throttle valve opening TA or the operation amount Accp becomes a value other than "0" while the fuel cut operation is being performed (or while the fuel cut condition is being satisfied), or when the engine rotational speed NE becomes equal to or lower than a fuel cut completion (returning) rotational speed NEFK while the fuel cut operation is being performed (or while the fuel cut condition is being satisfied). The fuel cut completion (returning) rotational speed NEFK is smaller than the fuel cut rotational speed NEFCth.

[e]

When the fuel cut condition is satisfied, the CPU makes a "Yes" determination at step 1255 to proceed to step 1260 at which the CPU sets the final fuel injection amount Fi to (at) "0", and after that, proceeds to step 1265. In contrast, when the fuel cut condition is unsatisfied, the CPU makes a "No" determination at step 1255 to directly proceed to step 1265.

Step 1265: The CPU instructs the fuel injector 25 corresponding to the fuel injection cylinder to inject a fuel whose amount is the final fuel injection amount (instructed injection amount) Fi from the fuel injector 25. Since the final fuel injection amount Fi is set at (to) "0" when the fuel cut condition is satisfied, the fuel injection is not carried out.

<Obtaining a Change Rate of the Output Value of the Downstream Air-Fuel Ratio Sensor>

Figure 13:
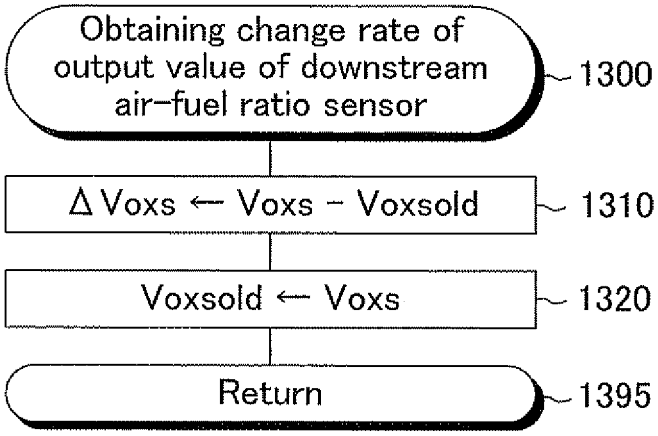
FIG. 13 is a flowchart showing a routine, executed by the CPU of the first control apparatus, for obtaining a change rate (changing speed) of the output value of the downstream air-fuel ratio sensor.

The CPU repeatedly executes a "routine for obtaining a change rate of the output value of the downstream air-fuel ratio sensor" shown by a flowchart in FIG. 13, every time a predetermined time period is elapses. Accordingly, at an appropriate predetermined timing, the CPU starts the process from step 1300 shown in FIG. 13 to proceed to step 1310 at which the CPU obtains, as a "change rate ΔVoxs of the output value Voxs of the downstream air-fuel ratio sensor 56", a value calculated by subtracting a "previous output value Voxsold of the downstream air-fuel ratio sensor 56, which was the output value Voxs at a point in time the predetermined time is ago" from the "output value Voxs of the downstream air-fuel ratio sensor 56 at the present time".

Subsequently, the CPU proceeds to step 1320 to store the output value Voxs of the downstream air-fuel ratio sensor 56 at the present time, as the previous output value Voxsold. Thereafter, the CPU proceeds to step 1395 to end the present routine tentatively.

<Calculation of the Main Feedback Amount>

Figure 14:
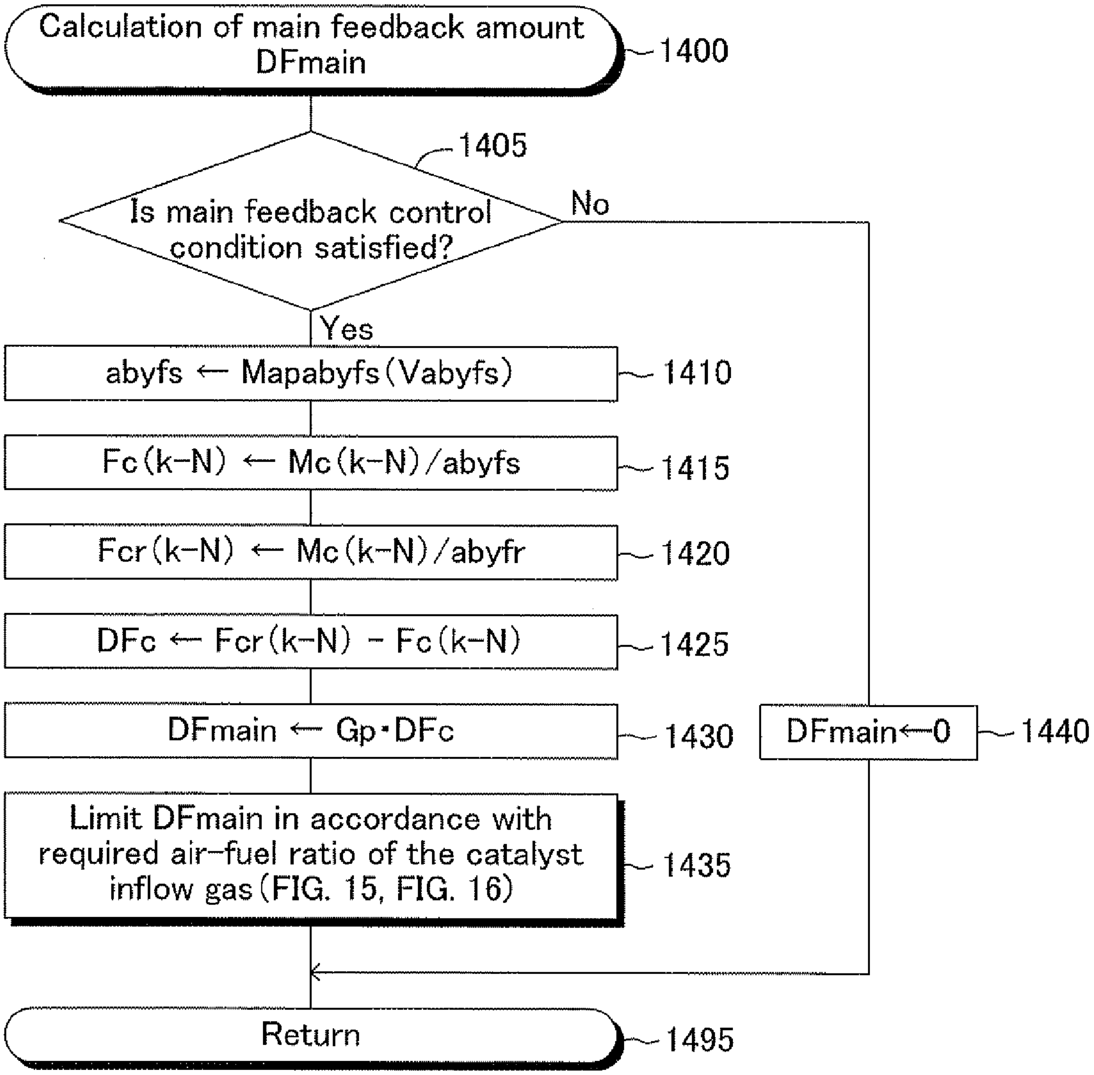
FIG. 14 is a flowchart showing a routine, executed by the CPU of the first control apparatus, for calculating a main feedback amount.

The CPU repeatedly executes a "routine for calculating the main feedback amount" shown by a flowchart in FIG. 14 every time a predetermined time period elapses. Accordingly, at an appropriate predetermined timing, the CPU starts the process from step 1400 shown in FIG. 14 to proceed to step 1405 at which the CPU determines whether or not a "main feedback control condition (upstream-side air-fuel ratio feedback control condition)" is satisfied.

The main feedback control condition is satisfied when all of the following conditions are satisfied.

(A-1) The upstream air-fuel ratio sensor 55 has been activated.

(A-2) The load (load rate) KL of the engine is smaller than or equal to a threshold KLth.

(A-3) An operating state of the engine 10 is not in the fuel cut operation.

It should be noted that the load rate KL is obtained according to the following formula (3). The accelerator pedal operation amount Accp may be used instead of the load rate KL. In the formula (3), Mc(k) is the cylinder intake air amount, ρ is an air density (unit is (g/l), L is a displacement of the engine 10 (unit is (l)), and "4" is the number of cylinders of the engine 10.

$$KL=(Mc(k)/(\rho\cdot L/4))\cdot 100\% \quad (3)$$

The description continues assuming that the main feedback control condition is satisfied. In this case, the CPU makes a "Yes" determination at step 1405 to execute processes from steps 1410 to 1435 described below in order, and then proceed to step 1495 to end the present routine tentatively.

Step 1410: The CPU obtains a detected upstream-side air-fuel ratio abyfs by applying the output value Vabyfs of the upstream air-fuel ratio sensor 55 to the table Mapabyfs shown in FIG. 2, according to a formula (4) described below.

$$abyfs=Mapabyfs(Vabyfs) \quad (4)$$

Step 1415: According to a formula (5) described below, the CPU obtains a "cylinder fuel supply amount Fc(k−N)" which is an "amount of the fuel actually supplied to the combustion chamber 21 for a cycle at a timing N cycles before the present time". That is, the CPU obtains the cylinder fuel supply amount Fc(k−N) through dividing the "cylinder intake air amount Mc(k−N) which is the cylinder intake air amount for the cycle the N cycles (i.e., N·720° crank angle) before the present time" by the "detected upstream-side air-fuel ratio abyfs".

$$Fc(k-N)=Mc(k-N)/abyfs \quad (5)$$

The reason why the cylinder intake air amount Mc(k−N) for the cycle N cycles before the present time is divided by the detected upstream-side air-fuel ratio abyfs in order to obtain the cylinder fuel supply amount Fc(k−N) in this manner is because the "exhaust gas generated by the combustion of the mixture in the combustion chamber 21" requires a "time corresponding to the N cycles" to reach the upstream air-fuel ratio sensor 55.

Step 1420: The CPU obtains a "target cylinder fuel supply amount Fcr(k−N)" which is a "fuel amount which was supposed to be supplied to the combustion chamber 21 for the cycle the N cycles before the present time", according to a formula (6) described below. That is, the CPU obtains the target cylinder fuel supply amount Fcr(k−N) through dividing the cylinder intake air amount Mc(k−N) for the cycle the N cycles before the present time by the target upstream-side air-fuel ratio abyfr.

$$Fcr=Mc(k-N)/abyfr \quad (6)$$

Step 1425: The CPU obtains an "error DFc of the cylinder fuel supply amount", according to a formula (7) described below. That is, the CPU obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycles before the present time.

$$DFc=Fcr(k-N)-Fc(k-N) \quad (7)$$

Step 1430: The CPU obtains the main feedback amount DFmain, according to a formula (8) described below. In the formula (8) below, Gp is a predetermined proportion gain. Through this step, the "main feedback amount DFmain" for having the detected upstream-side air-fuel ratio abyfs coincide with the target upstream-side air fuel ratio abyfr is calculated.

$$DF\text{main}=Gp\cdot DFc \quad (8)$$

Step 1435: The CPU corrects (or limit) the main feedback amount DFmain in accordance with the "required air-fuel ratio of the catalyst inflow gas" through executing routines shown in FIGS. 15 and 16. The routines shown in FIGS. 15 and 16 will be described later.

In this manner, the main feedback amount DFmain is obtained, and the main feedback amount DFmain is reflected in (onto) the final fuel injection amount Fi by the process of step 1250 shown in FIG. 12. It should be noted that the CPU may obtain the main feedback amount DFmain through adding an integral term obtained by multiplying an integrated value of the error DFc of the cylinder fuel supply amount by an integration gain Gi to the value Gp·DFc which is the proportional term described above.

In contrast, at the determination of step 1405 shown in FIG. 14, if the main feedback condition is not satisfied, the CPU makes a "No" determination at step 1405 to proceed to step 1440 at which the CPU sets the value of the main feedback amount DFmain at (to) "0". Subsequently, the CPU proceeds to step 1495 to end the present routine tentatively. In this manner, when the main feedback condition is unsatisfied, the main feedback amount DFmain is set to (at) "0". Accordingly, the correction for the base fuel injection amount Fbase with the main feedback amount DFmain is not performed.

<Determination of a Lean-Negation Determination and a Rich-Negation Determination>

Next will be described the correction of the main feedback amount DFmain performed in step 1435 described above. The CPU firstly executes a "routine for determining a rich-negation determination and a lean-negation determination" shown by a flowchart in FIG. 15.

According to this routine, when the state of the catalyst 43 is a state in which "the oxygen is not excessive", a "lean-negation determination" is made, a value of a lean-negation flag XNOTlean is set to (at) "1", and a value of a rich-negation flag XNOTrich is set to (at) "0". The state of the catalyst 43 being a state in which "the oxygen is excessive" means that "the oxygen storage amount OSA of the catalyst 43 is larger than or equal to the predetermined upper limit CHI, and is substantially equal to the maximum oxygen storage amount Cmaxof the catalyst 43".

Further, according to this routine, when the state of the catalyst 43 is a state in which "the oxygen is not short", a "rich-negation determination" is made, the value of the rich-negation flag XNOTrich is set to (at) "1", and the value of the lean-negation flag XNOTlean is set to (at) "0". The state of the catalyst 43 being a state in which "the oxygen is short" means that "the oxygen storage amount OSA of the catalyst 43 is smaller than or equal to the predetermined lower limit CLo, and is substantially equal to "0".

Figure 15:
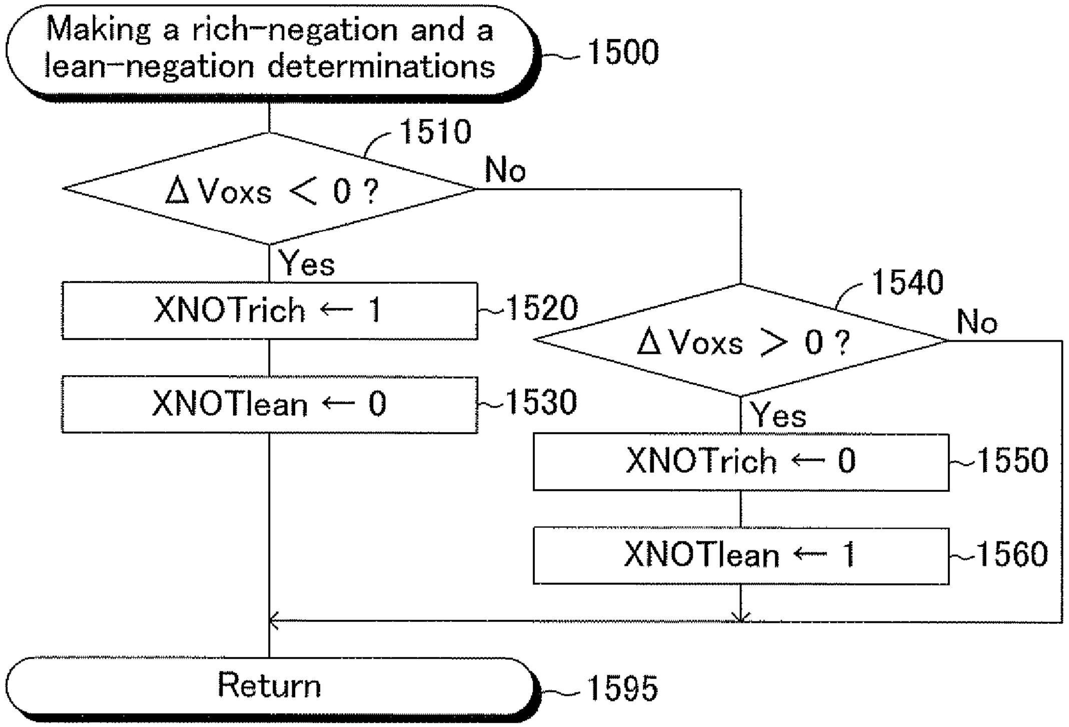
FIG. 15 is a flowchart showing a routine, executed by the CPU of the first control apparatus, for making a lean-negation determination and a rich-negation determination.

As described above, when the CPU proceeds to step 1435 shown in FIG. 14, the CPU executes the "routine for determining a rich-negation determination and a lean-negation determination" shown by the flowchart in FIG. 15. That is, when the CPU proceeds to step 1435 shown in FIG. 14, the CPU starts a process from step 1500 shown in FIG. 15 to proceed to step 1510 at which the CPU determines whether or not the change rate ΔVoxs of the output value Voxs of the downstream air-fuel ratio sensor 56 is negative (i.e., smaller than 0).

As described above, when the change rate ΔVoxs is negative (i.e., change rate ΔVoxs is smaller than "0", and thus, the output value Voxs is decreasing), the state of the catalyst 43 is no longer the state in which the oxygen is short. In view of the above, the CPU makes a "Yes" determination at step 1510 when the change rate ΔVoxs is negative, and sets the value of the rich-negation flag XNOTrich to (at) "1" at step 1520. Subsequently, the CPU sets the value of the lean-negation flag XNOTlean to (at) "0" at step 1530, and proceeds to step 1595 to end the present routine tentatively.

In contrast, when the change rate ΔVoxs is positive (i.e., change rate ΔVoxs is larger than "0", and thus, the output value Voxs is increasing), the state of the catalyst 43 is no longer the state in which the oxygen is excessive. In view of the above, the CPU makes a "No" determination at step 1510 when the change rate ΔVoxs is positive, and makes a "Yes" determination at step 1540 at which the CPU determines whether or not the change rate ΔVoxs is positive. Thereafter, the CPU sets the value of the rich-negation flag XNOTrich to (at) "0" at step 1550, and sets the value of the lean-negation flag XNOTlean to (at) "1" at step 1550. Subsequently, the CPU proceeds to step 1595 to end the present routine tentatively.

It should be noted that, when the change rate ΔVoxs is equal to "0", the CPU makes a "No" determination at both step 1510 and step 1540, and then proceeds to step 1595 to end the present routine tentatively.

<Limiting the Main Feedback Amount>

Figure 16:
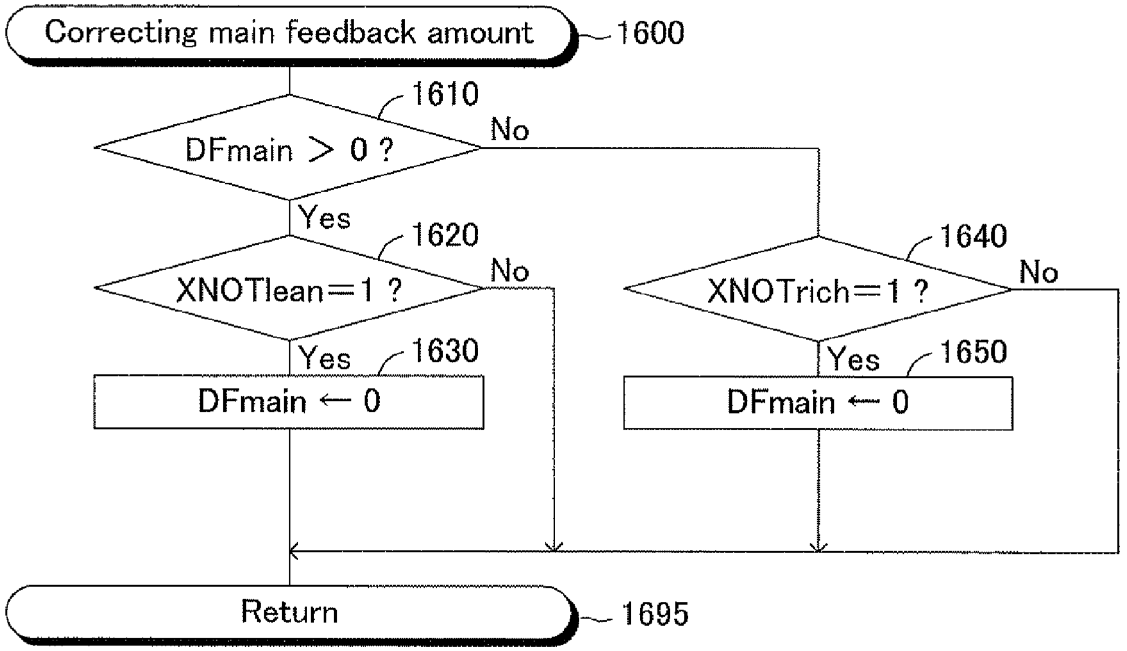
FIG. 16 is a flowchart showing a routine, executed by the CPU of the first control apparatus, for correcting the main feedback amount.

Further, as described above, when the CPU proceeds to step 1435 shown in FIG. 14, the CPU executes the "routine for correction (limiting) the main feedback amount" shown by the flowchart in FIG. 16, following the "routine for determining a rich-negation determination and a lean-negation determination" shown in FIG. 15.

Accordingly, at an appropriate predetermined timing, the CPU starts the process from step 1600 shown in FIG. 16 to proceed to step 1610 at which the CPU determines whether or not the main feedback amount DFmain is positive. That is, the CPU determines, at step 1610, whether or not the main feedback amount DFmain is a value which increases (make an increasing-correction on) the base fuel injection amount Fbase (i.e., the value which corrects the air-fuel ratio of the catalyst inflow gas equal to the air-fuel ratio of the engine toward a richer side with respect to the stoichiometric air-fuel ratio).

At this point in time, when the value of the main feedback amount DFmain is a positive value (that is, when the main feedback amount DFmain is the value which shifts the air-fuel ratio of the catalyst inflow gas to the rich air-fuel ratio), the CPU makes a "Yes" determination at step 1610 to proceed to step 1620 at which the CPU determines whether or not the value of the lean-negation flag XNOTlean is equal to "1". In other words, at step 1620, the CPU determines whether or not a determination has been made that the state of the catalyst 43 is the state in which the oxygen is not excessive.

When the value of the lean-negation flag XNOTlean is equal to "1" (that is, when the state of the catalyst 43 is not the state in which the oxygen is excessive), it is no longer necessary to provide a rich air-fuel gas to the catalyst 43. That is, the required air-fuel ratio of the catalyst inflow gas is the stoichiometric air-fuel ratio or the lean air-fuel ratio, but is not the rich air-fuel ratio. Therefore, in this case, the CPU makes a "Yes" determination at step 1620 to proceed to step 1630 at which the CPU sets the value of the main feedback amount DFmain to (at) "0". As a result, the main feedback amount DFmain is corrected (set, restricted, limited) in such a manner that the main feedback amount DFmain does not correct the air-fuel ratio of the catalyst inflow gas to be an air-fuel ratio (in this case, rich air-fuel ratio) different from the required air-fuel ratio of the catalyst inflow gas.

It should be noted that the CPU may adopt, at step 1630, as the final main feedback amount DFmain, a value obtained by multiplying the main feedback amount DFmain by a positive coefficient smaller than "1". That is, the CPU may decrease a magnitude of the main feedback amount DFmain at step 1630.

Further, at step 1630, the CPU may correct the main feedback amount DFmain in such a manner that, when the "air-fuel ratio correction amount (DFmain+DFsub)" which is a sum of the main feedback amount DFmain and the sub feedback amount DFsub described later" is a positive value (i.e., value which increases the base fuel injection amount Fbase), the air-fuel ratio correction amount (DFmain+DFsub) becomes equal to (at) "0" (i.e., a value which does not increase the base fuel injection amount Fbase).

In contrast, when the CPU proceeds to step 1620 and the value of the lean-negation flag XNOTlean is equal to "0", the CPU makes a "No" determination at step 1620 to directly proceed to step 1695 to end the present routine tentatively.

On the other hand, when the CPU proceeds to step 1610 and the value of the main feedback amount DFmain is a negative value (or "0") (that is, when the main feedback amount DFmain is the value which shifts the air-fuel ratio of the catalyst inflow gas to the lean air-fuel ratio), the CPU makes a "No" determination at step 1610 to proceed to step

1640 at which the CPU determines whether or not the value of the rich-negation flag XNOTrich is equal to "1". In other words, at step 1640, the CPU determines whether or not a determination has been made that the state of the catalyst 43 is the state in which the oxygen is not short.

When the value of the rich-negation flag XNOTrich is equal to "1" (that is, when the state of the catalyst 43 is not the state in which the oxygen is short), it is no longer necessary to provide a lean air-fuel gas to the catalyst 43. That is, the required air-fuel ratio of the catalyst inflow gas is the stoichiometric air-fuel ratio or the rich air-fuel ratio, but is not the lean air-fuel ratio. Therefore, in this case, the CPU makes a "Yes" determination at step 1640 to proceed to step 1650 at which the CPU sets the value of the main feedback amount DFmain to (at) "0". As a result, the main feedback amount DFmain is corrected (set, restricted, limited) in such a manner that the main feedback amount DFmain does not correct the air-fuel ratio of the catalyst inflow gas to be an air-fuel ratio (in this case, lean air-fuel ratio) different from the required air-fuel ratio of the catalyst inflow gas.

It should be noted that the CPU may adopt, at step 1650, as the final main feedback amount DFmain, a value obtained by multiplying the main feedback amount DFmain by a positive coefficient smaller than "1". That is, the CPU may decrease a magnitude of the main feedback amount DFmain at step 1650.

Further, at step 1650, the CPU may correct the main feedback amount DFmain in such a manner that, when the "air-fuel ratio correction amount (DFmain+DFsub)" which is the sum of the main feedback amount DFmain and the sub feedback amount DFsub" is a negative value (i.e., value which decreases the base fuel injection amount Fbase), the air-fuel ratio correction amount (DFmain+DFsub) becomes equal to "0" (i.e., the value which does not decrease the base fuel injection amount Fbase).

In contrast, when the CPU proceeds to step 1640 and the value of the rich-negation flag XNOTrich is equal to "0", the CPU makes a "No" determination at step 1640 to directly proceed to step 1695 to end the present routine tentatively. In this manner, the main feedback amount DFmain is obtained.

<Calculation of the Sub Feedback Amount>

Figure 17:
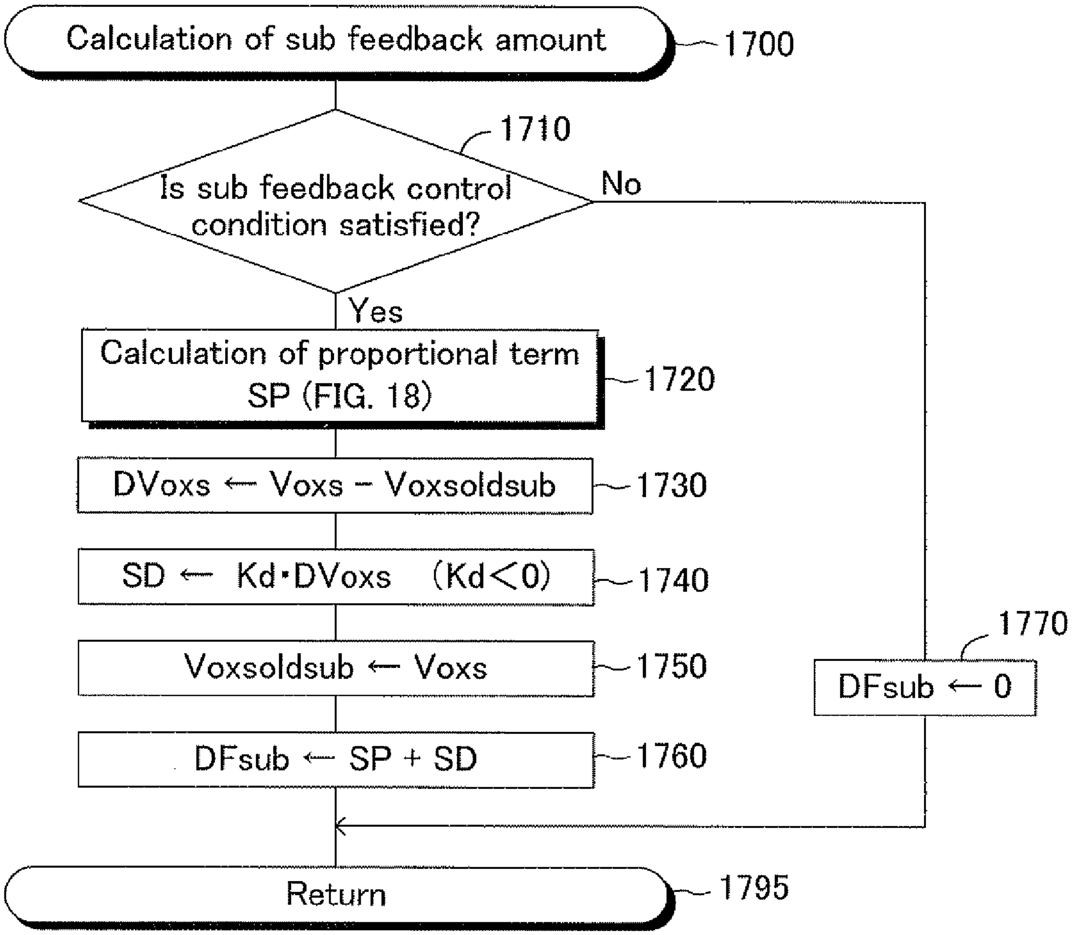
FIG. 17 is a flowchart showing a routine, executed by the CPU of the first control apparatus, for calculating a sub feedback amount (including a time-derivative term of the sub feedback amount)

The CPU executes a "routine for calculating the sub feedback amount" shown by a flowchart in FIG. 17 every time a predetermined time period elapses. Accordingly, at an appropriate predetermined timing, the CPU starts the process from step 1700 shown in FIG. 17 to proceed to step 1710 at which the CPU determines whether or not a "sub feedback control condition (downstream-side air-fuel ratio feedback control condition)" is satisfied.

The sub feedback control condition is satisfied when all of the following conditions are satisfied.

(B-1) The main feedback control condition is satisfied.

(B-2) The downstream air-fuel ratio sensor 56 has been activated.

(B-3) The target upstream-side air-fuel ratio is set at the stoichiometric air-fuel ratio.

The description continues assuming that the sub feedback control condition is satisfied. In this case, the CPU makes a "Yes" determination at step 1710 to execute processes from steps 1720 to 1760 described below in order, and thereafter proceeds to step 1795 to end the present routine tentatively.

Step 1720: The CPU calculates a proportional term SP of the sub feedback amount DFsub by executing a "routine for calculating the proportional term" shown in FIG. 18. The routine for calculating the proportional term will be described later.

Step 1730: The CPU obtains, as a differential value DVoxs of the output value Voxs of the downstream air-fuel ratio sensor 56, a value obtained by subtracting a "previous value Voxsoldsub which is the output value Voxs of the downstream air-fuel ratio sensor 56 at a point in time when the present routine was executed previously" from the "output value Voxs of the downstream air-fuel ratio sensor 56 at the present time". It should be noted that the differential value DVoxs may be replaced by the change rate ΔVoxs obtained in the routine shown in FIG. 13. The differential value DVoxs can be said to be a change rate of the output value Voxs of the downstream air-fuel ratio sensor 56, or a change amount of the output value Voxs of the downstream air-fuel ratio sensor 56 per unit time.

Step 1740: The CPU obtains, according to a formula (9) described below, a derivative term SD of the sub feedback amount by multiplying the differential value DVoxs by a derivative gain (derivative constant) Kd. The derivative gain Kd is a negative value. Therefore, when the output value Voxs is decreasing, the differential value DVoxs becomes a negative value, and the derivative term SD becomes a positive value. Accordingly, when the output value Voxs is decreasing, the derivative term SD becomes a value which corrects the air-fuel ratio of the catalyst inflow gas to be the rich air-fuel ratio. When the output value Voxs is increasing, the differential value DVoxs becomes a positive value, and the derivative term SD becomes a negative value. Accordingly, when the output value Voxs is increasing, the derivative term SD becomes a value which corrects the air-fuel ratio of the catalyst inflow gas to be the lean air-fuel ratio. In addition, as is clear from the formula (9), a magnitude |SD| of the derivative term SD becomes larger as the magnitude |ΔVoxs| of the change rate becomes larger.

$$SD = Kd \cdot DVoxs \tag{9}$$

Step 1750: The CPU stores the output value Voxs of the downstream air-fuel ratio sensor 56 at the present time, as the previous value Voxsoldsub.

Step 1760: The CPU calculates, according to a formula (10) described below, the sub feedback amount DFsub by adding the proportional term SP obtained at step 1720 to the derivative term SD obtained at step 1740. In this manner, the sub feedback amount DFsub is updated every time the predetermined time elapses.

$$DF\text{sub} = SP + SD \tag{10}$$

In contrast, when the sub feedback control condition is not satisfied, the CPU make a "No" determination at step 1710 shown in FIG. 17 to proceed to step 1770 at which the CPU sets the sub feedback amount DFsub to (at) "0". Thereafter, the CPU proceeds to step 1795 to end the present routine tentatively.

<Calculation of the Proportional Term of the Sub Feedback Amount>

Figure 18:
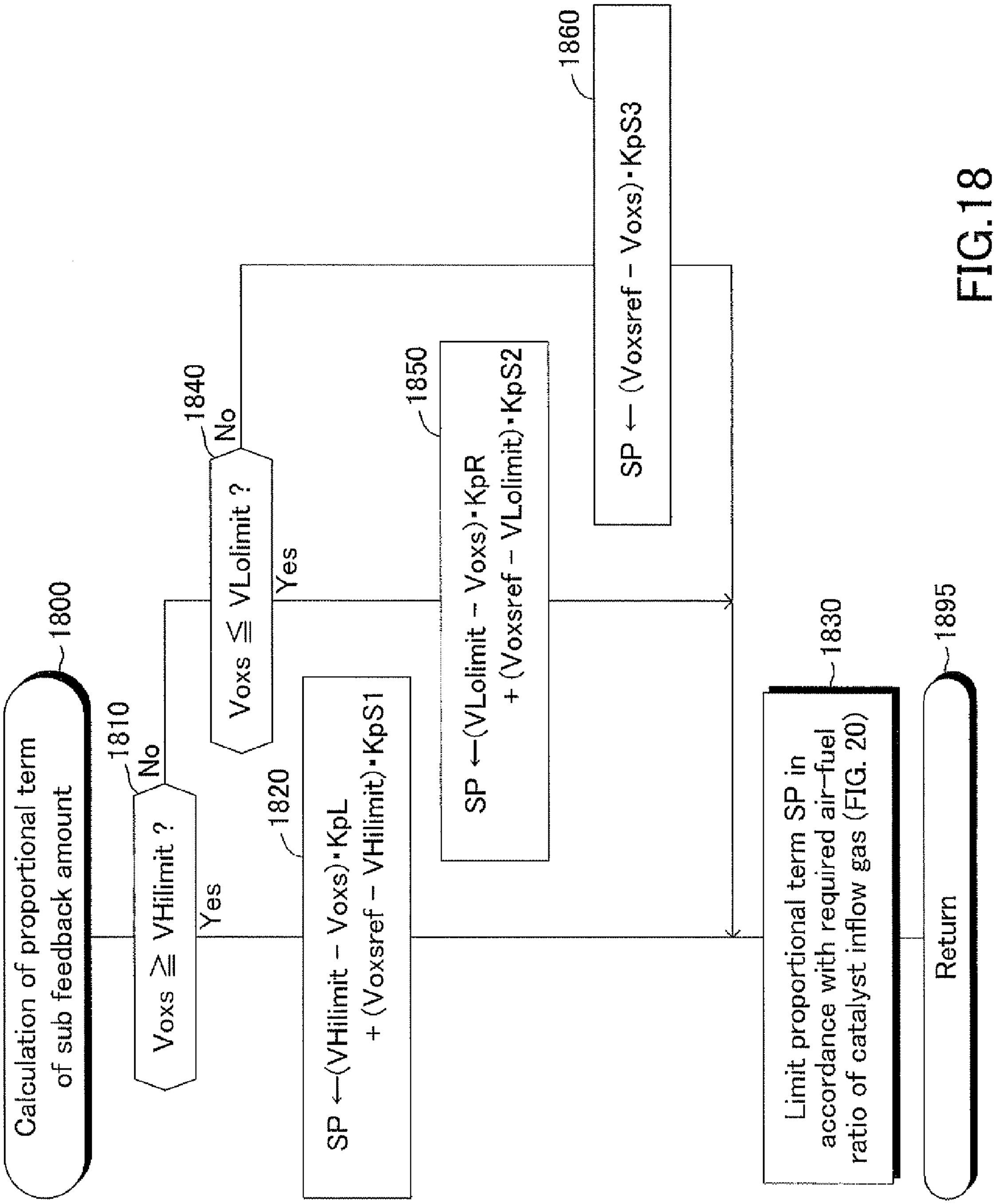
FIG. 18 is a flowchart showing a routine, executed by the CPU of the first control apparatus, for calculating a proportional term of the sub feedback amount.

As described above, when the CPU proceeds to step 1720 shown in FIG. 17, the CPU executes the "routine for calculating the proportional term of the sub feedback amount" shown by a flowchart in FIG. 18. Accordingly, when the CPU proceeds to step 1720 shown in FIG. 17, the CPU starts the process from step 1800 in FIG. 18 to proceed to step 1810 at which CPU determines whether or not the output value Voxs of the downstream air-fuel ratio sensor 56 is larger than or equal to a "stoichiometric-upper-limit-value VHilimit serving as the first threshold".

The first threshold is between the "middle value Vmid (=(Vmax+Vmin)/2) of the maximum output value Vmax and the minimum output value Vmin, of the output value Voxs of the downstream air-fuel ratio sensor 56" and the "maximum output value Vmax". That is, the first threshold is a predetermined value which is closer to the maximum output value Vmax than to the middle value Vmid.

Figure 8:
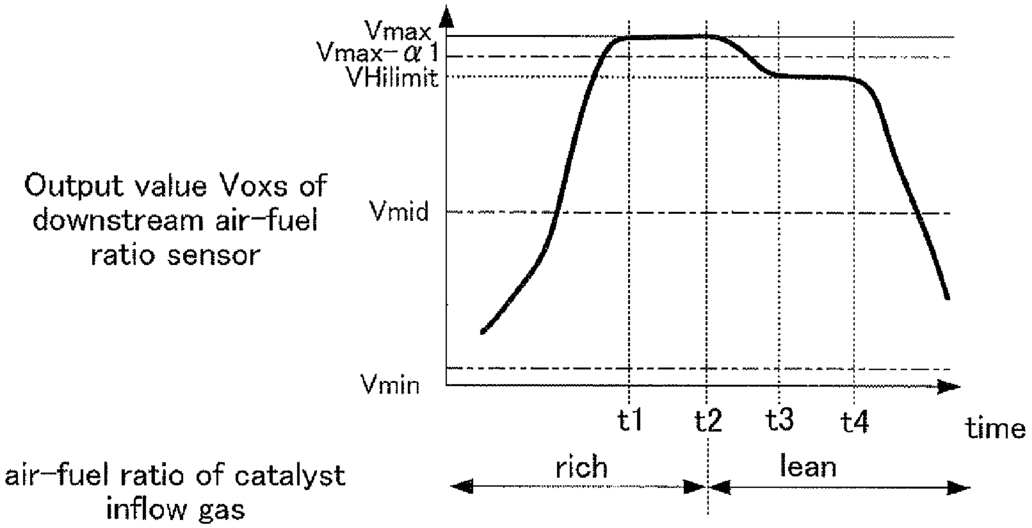
FIG. 8 is a timing chart showing a change in an output value of the downstream air-fuel ratio sensor, when a gas whose air-fuel ratio is the lean air-fuel ratio flows into the catalyst after a gas whose air-fuel ratio is the rich air-fuel ratio continues to flow into the catalyst for more than a certain time.

The stoichiometric-upper-limit-value VHilimit is the output value Voxs (refer to the output value Voxs in a period from the time t3 to the time t4 in FIG. 8) in a case in which the catalyst 43 is in the state in which the oxygen is short (that is, the oxygen storage amount OSA of the catalyst 43 is "0" or in the vicinity of "0"), and the lean air-fuel ratio gas is flowing into the catalyst 43, and when the catalyst is absorbing the oxygen flowing into the catalyst 43 so that neither the oxygen nor the unburnt substances substantially flows out from the catalyst 43.

It is assumed here that the output value Voxs is equal to or larger than the stoichiometric-upper-limit-value VHilimit. Under this assump,ion, the CPU makes a "Yes" determination at step 1810 to proceed to step 1820 at which the CPU calculates the proportional term SP of the sub feedback amount DFsub, according to a formula (11) described below.

$$SP=(VHilimit-Voxs)\cdot KpL+(Voxsref-VHilimit)\cdot KpS1 \qquad (11)$$

In the formula (11), KpL is a lean control gain, and is a positive value. KpS1 is a first gain, and is a positive value. Voxsref is a target value for the output value Voxs of the downstream air-fuel ratio sensor 56 (target downstream-side value Voxsref, target of the sub feedback). In the first control apparatus, the target downstream-side value Voxsref is constant, and is set at (to) the middle value Vmid. Consequently, when the output value Voxs is equal to or larger than the stoichiometric-upper-limit-value VHilimit, the proportional term SP is always negative. That is, the proportional term SP becomes a value which sets the air-fuel ratio of the catalyst inflow gas (=air-fuel ratio of the engine) to (at) the lean air-fuel ratio.

Figure 19:
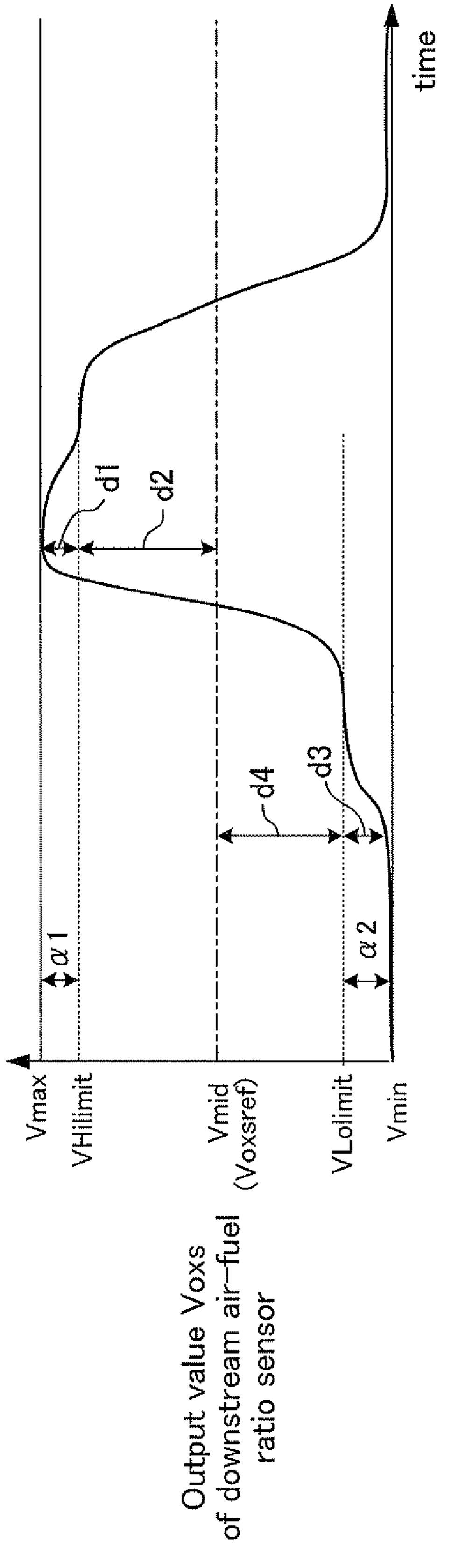
FIG. 19 is a timing chart of the output value of the downstream air-fuel ratio sensor, for describing an error (deviation) used to calculate the proportional term of the sub feedback amount.

In this manner, the first control apparatus divides an error (difference) between the output value Voxs and the target downstream-side value Voxsref into two errors, one being an error between the output value Voxs and the first threshold (here, stoichiometric-upper-limit-value VHilimit) (refer to an error d1 shown in FIG. 19), and the other being an error between the stoichiometric-upper-limit-value VHilimit and the target downstream-side value Voxsref (refer to an error d2 shown in FIG. 19), then the first control apparatus multiplies each of the errors by each of the proportional gains (KpL, KpS1) that are different from each other. The first control apparatus obtains a sum of these multiplied values as the proportional term SP.

That is, the step 1810 and the step 1820 are the steps for calculating, as the "proportional term SP of the sub feedback amount DFsub" which for "having the air-fuel ratio of the mixture supplied to the engine 10 become leaner than the stoichiometric air-fuel ratio", a sum of (1) a value ((VHilimit−Voxs)·KpL) obtained by multiplying the "error between the first threshold VHilimit and the output value Voxs of the downstream air-fuel ratio sensor" by the lean control gain KpL, and (2) a value ((Voxsref−VHilimit)·KpS1) obtained by multiplying the error between the "predetermined target value Voxsref (in the present example, middle value Vmid) which is set between the first threshold VHilimit and a second threshold VLolimit described later" and the first threshold VHilimit by the first gain KpS1, when the output value Voxs of the downstream air-fuel ratio sensor 56 is equal to or larger than the first threshold (in the present example, stoichiometric-upper-limit-value VHilimit).

Subsequently, the CPU proceeds to step 1830 to execute a "routine for limiting the proportional term of the sub feedback amount" shown by a flowchart in FIG. 20. More specifically, the CPU starts the process from step 2000 shown in FIG. 20 to proceed to step 2010 at which the CPU determines whether or not the proportional term SP is positive.

As described above, when the output value Voxs is equal to or larger than the stoichiometric-upper-limit-value VHilimit serving as the first threshold, the proportional term SP calculated at step 1820 becomes negative. Accordingly, the CPU makes a "No" determination at step 2010 to proceed to step 2050 at which the CPU determined whether or not the value of the rich-negation flag XNOTrich is equal to "1".

When it is assumed that the state of the catalyst 43 is the state in which the oxygen is short (the oxygen storage amount OSA is substantially equal to "0"), the output value Voxs does not decrease (that is, the change rate ΔVoxs is not negative), and the output value Voxs continues to be the value in the vicinity of the maximum output value Vmax. Accordingly, the value of the rich-negation flag XNOTrich is not set to (at) "1" at step 1520 shown in FIG. 15, but is usually maintained at "0". In this case, the CPU makes a "No" determination at step 2050 to directly proceed to step 2095 to end the present routine tentatively. Therefore, the proportional term SP is not limited (restricted) and continues to be negative.

In contrast, when the state of the catalyst 43 becomes no longer the state in which the oxygen is short, the output value Voxs decreases (the change rate ΔVoxs becomes negative). This causes the value of the rich-negation flag XNOTrich to be set to (at) "1" by the processes of step 1510 and step 1520 shown in FIG. 15. At this time, when the CPU proceeds to step 2050, the CPU makes a "Yes" determination at step 2050 to proceed to step 2060.

The CPU obtains a proportional term reflection ratio (proportional term correction coefficient, lean limit coefficient) Kb at step 2060. More specifically, the CPU obtains the proportional term reflection ratio Kb by applying an absolute value of the change rate ΔVoxs of the output value Voxs of the downstream air-fuel ratio sensor 56 to a reflection ratio table MapKb(|ΔVoxs|) shown in the block of step 2060. According to the reflection ratio table MapKb(|ΔVoxs|), when the absolute value |ΔVoxs| is between "0 and a value smaller than the first change rate threshold ΔV1th by a predetermined value", the proportional term reflection ratio Kb is set to (at) "1". Further, according to the reflection ratio table MapKb (|ΔVoxs|), when the absolute value |ΔVoxs| is between "the value smaller than the first change rate threshold ΔV1th by the predetermined value and the first change rate threshold ΔV1th", the proportional term reflection ratio Kb is set a value which decreases from "1" toward "0" as the absolute value |ΔVoxs| becomes larger. Furthermore, according to the reflection ratio table MapKb(|ΔVoxs|), when the absolute value |ΔVoxs| is equal to or larger than the "first change rate threshold ΔV1th", the proportional term reflection ratio Kb is set to (at) "0".

Subsequently, the CPU proceeds to step 2070 to obtain, as the final proportional term SP, a value calculated by multiplying the proportional term SP by the proportional term reflection ratio Kb. Consequently, as the magnitude |ΔVoxs| of the change rate of the output value Voxs of the downstream air-fuel ratio sensor 56 becomes larger, the magnitude of the proportional term SP of the sub feedback amount DFsub becomes smaller. Thereafter, the CPU proceeds to step 1895 shown in FIG. 18 through step 2095 to end the routine shown in FIG. 18 tentatively.

Figure 20:
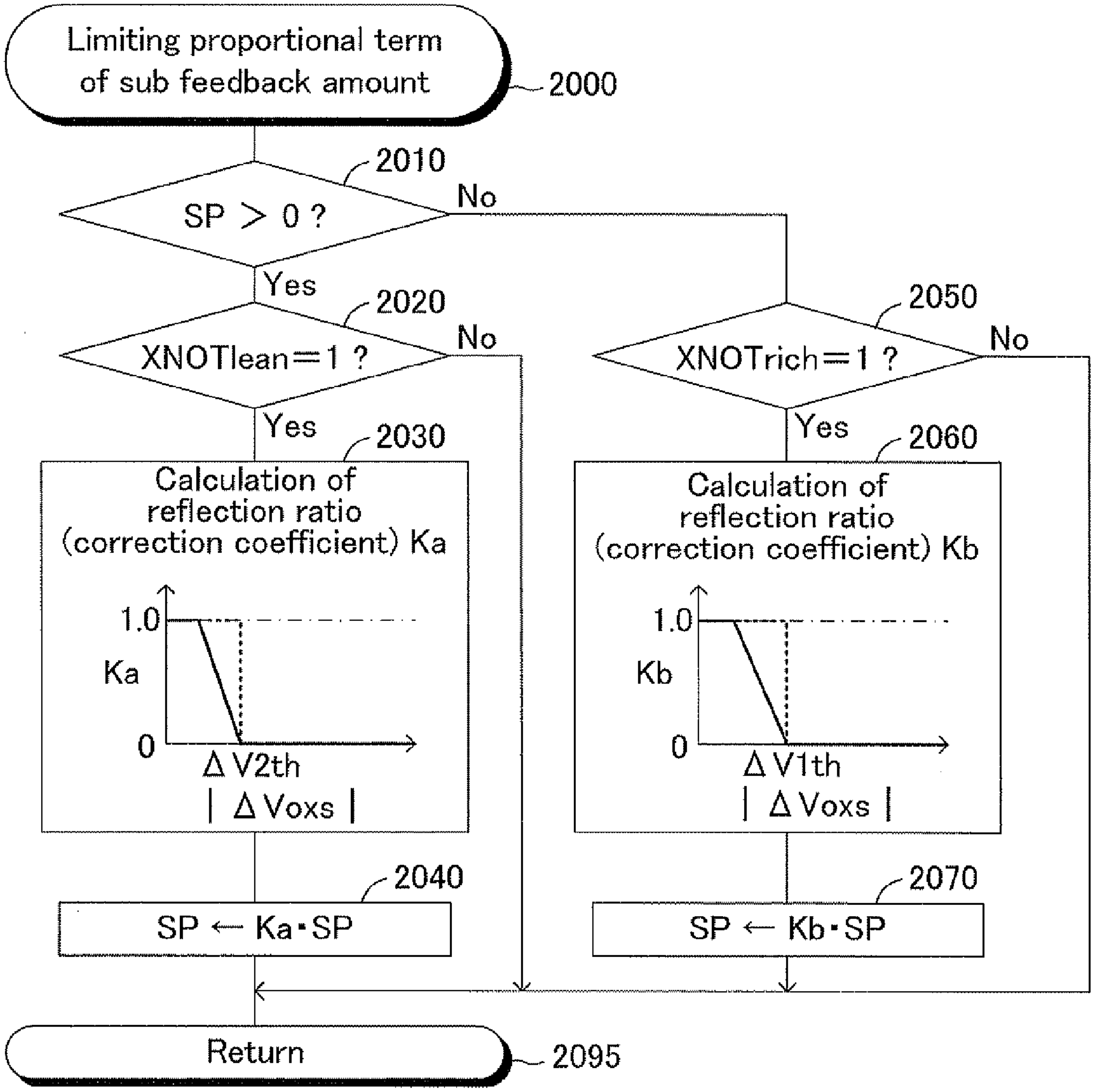
FIG. 20 is a flowchart showing a routine, executed by the CPU of the first control apparatus, for limiting (confining) the proportional term of the sub feedback amount.

It should be noted that, as shown by a broken line in the block of step 2060 in FIG. 20, the proportional term reflection ratio Kb may be set to (at) "1" when the absolute value |ΔVoxs| is smaller than the first change rate threshold ΔV1th, and set to (at) "0" when the absolute value |ΔVoxs is equal to or larger than the first change rate threshold ΔV1th.

Referring back to FIG. 18 again, if the output value Voxs of the downstream air-fuel ratio sensor 56 is smaller than the "stoichiometric-upper-limit-value VHilimit serving as the first threshold" when the CPU proceeds to step 1810, the CPU makes a "No" determination at step 1810 to proceed to step 1840 to determine whether or not the output value Voxs of the downstream air-fuel ratio sensor 56 is equal to or smaller than the "stoichiometric-lower-limit-value VLolimit serving as the second threshold".

The second threshold is between the middle value Vmid and the minimum output value Vmin. That is, the second threshold is a predetermined value which is closer to the minimum output value Vmin than to the middle value Vmid.

Figure 9:
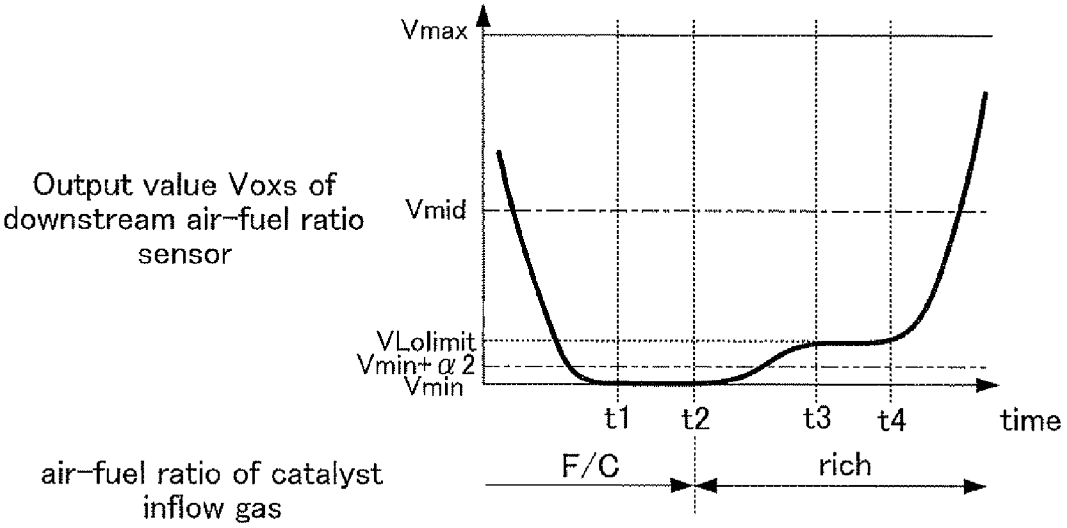
FIG. 9 is a timing chart showing a change in the output value of the downstream air-fuel ratio sensor, when a gas whose air-fuel ratio is the rich air-fuel ratio flows into the catalyst after a fuel cut operation is continued for more than a certain time.

The stoichiometric-lower-limit-value VLolimit is the output value Voxs (refer to the output value Voxs in a period from the time t3 to the time t4 in FIG. 9) in a case in which the catalyst 43 is in the state in which the oxygen is excessive (that is, the oxygen storage amount OSA of the catalyst 43 is equal to the maximum oxygen storage amount Cmaxor in the vicinity of the maximum oxygen storage amount Cmax), and the rich air-fuel ratio gas is flowing into the catalyst 43, and when the catalyst consumes the oxygen stored in the catalyst 43 to oxidize the unburnt substances so that neither the oxygen nor the unburnt substances substantially flows out from the catalyst 43.

It is assumed here that the output value Voxs is equal to or smaller than the stoichiometric-lower-limit-value VLolimit. Under this assumption, the CPU makes a "Yes" determination at step 1840 to proceed to step 1850 at which the CPU calculates the proportional term SP of the sub feedback amount DFsub, according to a formula (12) described below.

$$SP=(VLolimit-Voxs)\cdot KpR+(Voxsref-VLolimit)\cdot KpS2 \quad (12)$$

In the formula (12), KpR is a rich control gain, and is a positive value. The rich control gain KpR may be equal to the lean control gain KpL. KpS2 is a second gain, and is a positive value. The second gain KpS2 may be equal to the first gain KpS1. Consequently, when the output value Voxs is equal to or smaller than the stoichiometric-lower-limit-value VLolimit, the proportional term SP is always positive. That is, the proportional term SP becomes a value which sets the air-fuel ratio of the catalyst inflow gas (=air-fuel ratio of the engine) to (at) the rich air-fuel ratio.

In this manner, the first control apparatus divides the error (difference) between the output value Voxs and the target downstream-side value Voxsref into two errors, one being an error between the output value Voxs and the second threshold (here, stoichiometric-lower-limit-value VLolimit) (refer to an error d3 shown in FIG. 19), and the other being an error between the stoichiometric-lower-limit-value VLolimit and the target downstream-side value Voxsref (refer to an error d4 shown in FIG. 19), then the first control apparatus multiplies each of the errors by each of the proportional gains (KpR, KpS2) that are different from each other.

That is, the step 1840 and the step 1850 are the steps for calculating, as the "proportional term SP of the sub feedback amount DFsub" which for "having the air-fuel ratio of the mixture supplied to the engine 10 become richer than the stoichiometric air-fuel ratio", a sum of (1) a value ((VLolimit−Voxs)·KpR) obtained by multiplying the "error between the second threshold VLolimit and the output value Voxs of the downstream air-fuel ratio sensor" by the rich control gain KpR, and (2) a value ((Voxsref−VLolimit)·KpS2) obtained by multiplying the error between the "predetermined target value Voxsref (in the present example, middle value Vmid) which is set between the first threshold VHilimit and the second threshold VLolimit" and the second threshold by the second gain KpS2, when the output value Voxs of the downstream air-fuel ratio sensor 56 is equal to or smaller than the second threshold (in the present example, stoichiometric-lower-limit-value VLolimit).

Subsequently, the CPU proceeds to step 1830 to proceed to step 2000 and step 2010 shown in FIG. 20. In this case, the proportional term SP is positive. Accordingly, the CPU makes a "Yes" determination at step 2010 to proceed to step 2020 at which the CPU determined whether or not the value of the lean-negation flag XNOTlean is equal to "1".

When it is assumed that the state of the catalyst 43 is the state in which the oxygen is excessive (the oxygen storage amount OSA is substantially equal to the maximum oxygen storage amount Cmax), the output value Voxs does not increase (that is, the change rate ΔVoxs is not positive), and the output value Voxs continues to be the value in the vicinity of the minimum output value Vmin. Accordingly, the value of the lean-negation flag XNOTlean is not set to (at) "1" at step 1560 shown in FIG. 15, but is usually maintained at "0". In this case, the CPU makes a "No" determination at step 2020 to directly proceed to step 2095 to end the present routine tentatively. Therefore, the proportional term SP is not limited (restricted) and continues to be positive.

In contrast, when the state of the catalyst 43 becomes no longer the state in which the oxygen is excessive, the output value Voxs increases (the change rate ΔVoxs becomes positive). This causes the value of the lean-negation flag XNOTlean to be set to (at) "1" by the processes of step 1540 and step 1560 shown in FIG. 15. At this time, when the CPU proceeds to step 2020, the CPU makes a "Yes" determination at step 2020 to proceed to step 2030.

The CPU obtains a proportional term reflection ratio (proportional term correction coefficient, rich limit coefficient) Ka at step 2030. More specifically, the CPU obtains the proportional term reflection ratio Ka by applying the absolute value of the change rate ΔVoxs of the output value Voxs of the downstream air-fuel ratio sensor 56 to a reflection ratio table MapKa(|ΔVoxs|) shown in the block of step 2030. According to the reflection ratio table MapKa(|ΔVoxs|), when the absolute value |ΔVoxs| is between "0 and a value smaller than the second change rate threshold ΔV2th by a predetermined value", the proportional term reflection ratio Ka is set to (at) "1". Further, according to the reflection ratio table MapKa (|ΔVoxs|), when the absolute value |ΔVoxs| is between "the value smaller than the second change rate threshold ΔV2th by the predetermined value and the second change rate threshold ΔV2th", the proportional term reflection ratio Ka is set a value which decreases from "1" toward "0" as the absolute value |ΔVoxs| becomes larger. Furthermore, according to the reflection ratio table MapKa(|ΔVoxs|), when the absolute value |ΔVoxs| is equal to or larger than the "second change rate threshold ΔV2th", the proportional term reflection ratio Ka is set to (at) "0".

Subsequently, the CPU proceeds to step 2040 to obtain, as the final proportional term SP, a value calculated by multiplying the proportional term SP by the proportional term reflection ratio Ka. Consequently, as the magnitude |ΔVoxs| of the change rate of the output value Voxs of the downstream air-fuel ratio sensor 56 becomes larger, the magnitude of the proportional term SP of the sub feedback amount DFsub becomes smaller. Thereafter, the CPU proceeds to step 1895 shown in FIG. 18 through step 2095 to end the routine shown in FIG. 18 tentatively.

It should be noted that, as shown by a broken line in the block of step 2030 shown in FIG. 20, the proportional term reflection ratio Ka may be set to (at) "1" when the absolute value ΔVoxs| is smaller than the second change rate threshold ΔV2th, and set to (at) "0" when the absolute value ΔVoxs is equal to or larger than the second change rate threshold ΔV2th.

Referring back to FIG. 18 again, if the output value Voxs of the downstream air-fuel ratio sensor 56 is smaller than the "stoichiometric-upper-limit-value VHilimit serving as the first threshold" when the CPU proceeds to step 1810, the CPU proceeds to step 1840 from step 1810. Further, if the output value Voxs of the downstream air-fuel ratio sensor 56 is larger than the "stoichiometric-lower-limit-value VLolimit serving as the second threshold" when the CPU proceeds to step 1840, the CPU makes a "No" determination at step 1840 to proceed to step 1860. That is, when the output value Voxs is between the first threshold and the second threshold, the CPU proceeds to step 1860.

At step 1860, the CPU calculates the proportional term SP of the sub feedback amount DFsub, according to a formula (13) described below.

$$SP(Voxs\mathrm{ref}-Voxs)\cdot KpS3 \qquad (13)$$

In the formula (13), KpS3 is a third gain, and is a positive value. The third gain KpS3 may be equal to the first gain KpS1 and the second gain KpS2. Consequently, when the output value Voxs is larger than the target downstream-side value Voxsref and is smaller than the first threshold VHilimit, the proportional term SP is negative and becomes a value which sets the air-fuel ratio of the catalyst inflow gas to (at) the lean air-fuel ratio. In contrast, when the output value Voxs is smaller than the target downstream-side value Voxsref and is larger than the second threshold VLolimit, the proportional term SP is positive and becomes a value which sets the air-fuel ratio of the catalyst inflow gas to (at) the rich air-fuel ratio.

It should be noted that the third gain KpS3 may preferably be (set) selected to be an extremely small value including "0" (e.g., a value which does not make the sub feedback amount DFsub (=SD+SP) be negative when the time-derivative term SD is positive, and a value which does not make the sub feedback amount DFsub (=SD+SP) be positive when the time-derivative term SD is negative). Alternatively, the proportional term SP may preferably be determined to be set to (at) "0" when the output value Voxs of the downstream air-fuel ratio sensor 56 is smaller than a "value (Vmax−α1) in a predetermined range including the first threshold" and is larger than a "value (Vmin+α2) in a predetermined range including the second threshold".

Thereafter, the CPU executes the process of step 1830 (routine shown in FIG. 20). In this case, the output value Voxs is between "the first threshold VHilimit and the second threshold VLolimit", and thus, the state of the catalyst 43 is neither the state in which the oxygen is short nor the state in which the oxygen is excessive. Accordingly, the magnitude |ΔVoxs| of the change rate ΔVoxs of the output value Voxs of the downstream air-fuel ratio sensor 56 is not equal to "0", and thus, either the value of the lean-negation flag XNOTlean or the value of the rich-negation flag XNOTrich is set at (to) "1", through the routine shown in FIG. 15. Further, when the state of the catalyst 43 is neither the state in which the oxygen is short nor the state in which the oxygen is excessive, the magnitude |ΔVoxs| of the change rate ΔVoxs of the output value Voxs of the downstream air-fuel ratio sensor 56 is likely to be larger than the first change rate threshold ΔV1th or the second change rate threshold ΔV2th, or is likely to be a value in the vicinity of these thresholds. Accordingly, the reflection ratio Ka obtained at step 2030 shown in FIG. 20 is smaller than "1" or the reflection ratio Kb obtained at step 2060 shown in FIG. 20 is smaller than "1", and especially, both the reflection ratio Ka and the reflection ratio Kb becomes "0" when the magnitude |ΔVoxs| of the change rate ΔVoxs is large.

Consequently, in these cases, the proportional term SP of the sub feedback amount DFsub is substantially equal to "0", and therefore, the sub feedback amount DFsub varies in accordance with the time-derivative term SD only. Thereafter, the CPU proceeds to step 1895 to end the present routine tentatively.

In this manner, when the output value Voxs of the downstream air-fuel ratio sensor 56 is between "the first threshold VHilimit and the second threshold VLolimit", the sub feedback amount DFsub substantially include the time-derivative term SD only. Accordingly, the sub feedback amount becomes a value which sets the air-fuel ratio of the catalyst inflow gas (=air-fuel ratio of the engine) at (to) the rich air-fuel ratio when the output value Voxs is decreasing, and becomes a value which sets the air-fuel ratio of the catalyst inflow gas at (to) the lean air-fuel ratio when the output value Voxs is increasing.

<Obtaining the Stoichiometric-Upper-Limit-Value VHilimit and the Stoichiometric-Lower-Limit-Value VLolimit>

Next will be described a way to obtain the stoichiometric-upper-limit-value VHilimit and the stoichiometric-lower-limit-value VLolimit. In a case in which the CPU has never obtained "the stoichiometric-upper-limit-value VHilimit and the stoichiometric-lower-limit-value VLolimit" since a start of an operation of the engine, the CPU performs a control for obtaining "the stoichiometric-upper-limit-value VHilimit and the stoichiometric-lower-limit-value VLolimit" when and after the fuel cut operation is carried out for more than a predetermined time.

The CPU performs the fuel cut operation when the fuel cut condition described above is satisfied. This allows a great amount of oxygen to flow into the catalyst 43. Accordingly, when the fuel cut operation continues for more than the predetermined time, the oxygen storage amount OSA of the catalyst 43 reaches the maximum oxygen storage amount Cmax. Consequently, as shown a period before the time t1 shown in FIG. 21, the output value Voxs of the downstream air-fuel ratio sensor 56 reaches the minimum output value Vmin. Thereafter, when the fuel cut condition becomes unsatisfied, the fuel cut operation ends.

Figure 21:
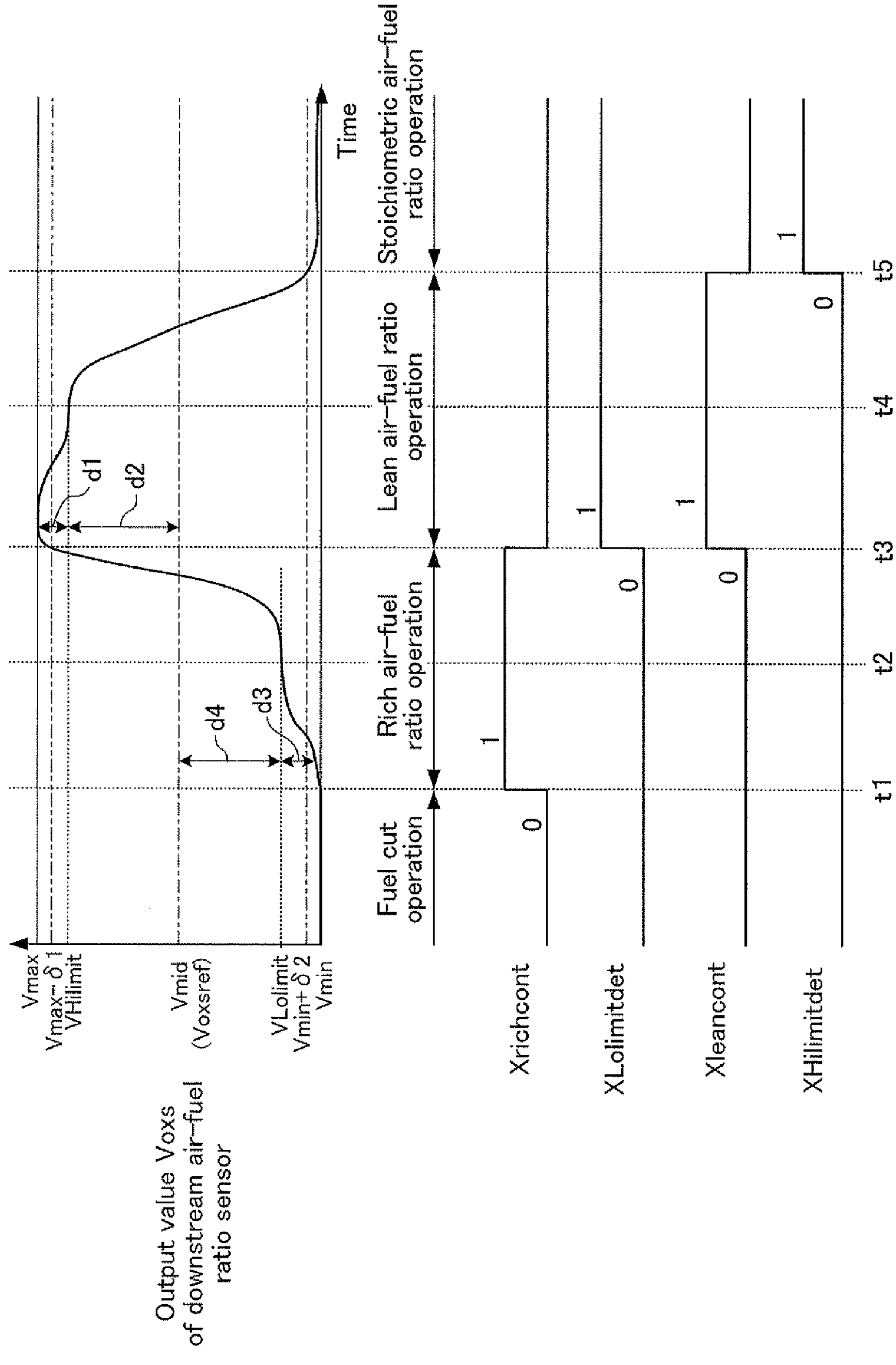
FIG. 21 is a timing chart for describing an operation of the CPU of the first control apparatus when the CPU obtains "a stoichiometric-upper-limit-value and a stoichiometric-lower-limit-value"

At this time, if "the stoichiometric-upper-limit-value VHilimit and the stoichiometric-lower-limit-value VLolimit" have not been obtained since the start of the current operation of the engine 10, the CPU firstly sets the air-fuel ratio of the engine to (at) the rich air-fuel ratio in order to obtain these values (refer to a period after the time t1 shown in FIG. 21).

As a result, the unburnt substances included in the catalyst inflow gas become oxidized by combining with the "oxygen stored in the catalyst and the oxygen included in the catalyst inflow gas". That is, in this case, it can be said that the air-fuel ratio of the catalyst outflow gas is substantially equal to the stoichiometric air-fuel ratio. However, the oxygen provided during the fuel cut operation remains in the vicinity of the downstream air-fuel ratio sensor 56 and in the diffusion resistance layer of the downstream air-fuel ratio sensor 56. Accordingly, the output value Voxs of the downstream air-fuel ratio sensor 56 slightly increases as shown in a period after the time t1 in FIG. 21, but continues to be a value in the vicinity of the minimum output value Vmin between the middle value Vmid and the minimum output value Vmin for a while. The output value Voxs at this moment is the stoichiometric-lower-limit-value VLolimit.

In view of the above, the CPU obtains, as the stoichiometric-lower-limit-value VLolimit, the output value Voxs when the CPU detects a timing (refer to the time t2) at which the magnitude of the change rate ΔVoxs of the output value Voxs becomes smallest in a period from the "time t1" to a "time (time t3) at which the output value Voxs substantially reaches the maximum output value Vmax"

Thereafter, when the output value Voxs reaches the maximum output value Vmax at the time t3, the CPU sets the air-fuel ratio of the engine to (at) the lean air-fuel ratio (refer to a period after the time t3 shown in FIG. 21). In this state, the oxygen storage amount OSA of the catalyst 43 is equal to "0".

Accordingly, the catalyst 43 starts to store the oxygen, and therefore, the oxygen does not flow out to the position downstream of the catalyst 43. Further, the unburnt substances included in the catalyst inflow gas are oxidized in the catalyst. At this time, the catalyst outflow gas includes neither the unburnt substances nor the oxygen. That is, the air-fuel ratio of the catalyst outflow gas is equal to the stoichiometric air-fuel ratio. However, the oxygen which remained in the vicinity of the downstream air-fuel ratio sensor 56 and in the vicinity of the diffusion resistance layer of the downstream air-fuel ratio sensor 56 has been completely consumed. Accordingly, the output value Voxs of the downstream air-fuel ratio sensor slightly decreases as shown in the period after the time t3 in FIG. 21, but continues to be a value in the vicinity of the maximum output value Vmax between the middle value Vmid and the maximum output value Vmax for a while. The output value Voxs at this moment is the stoichiometric-upper-limit-value VHilimit.

In view of the above, the CPU obtains, as the stoichiometric-upper-limit-value VHilimit, the output value Voxs when the CPU detects a timing (refer to the time t4) at which the magnitude of the change rate Voxs of the output value Voxs becomes smallest in a period from the time t3" to a "time (time t5) at which the output value Voxs substantially reaches the minimum output value Vmin". These describes the way to obtain the stoichiometric-lower-limit-value VLolimit and the stoichiometric-upper-limit-value VHilimit.

Next will be described an actual operation of the CPU. The CPU executes a "routine of stoichiometric-lower-limit-value detecting rich control" shown by a flowchart in FIG. 22, every time a predetermined time period elapses. Accordingly, at an appropriate predetermined timing, the CPU starts the process from step 2200 to proceed to step 2210 at which CPU determines whether or not the present time is immediately after the end of the fuel cut operation (that is, immediately after the fuel cut condition becomes unsatisfied). When the present time is not immediately after the end of the fuel cut operation, the CPU directly proceeds to step 2295 from step 2210 to end the present routine tentatively.

In contrast, when the CPU proceeds to step 2210, and that timing is immediately after the end of the fuel cut operation, the CPU makes a "Yes" determination at step 2210 to proceed to step 2220 at which the CPU determines whether or not a value of a stoichiometric-lower-limit-value obtainment completion flag XLolimitdet is equal to "0".

Meanwhile, at the start of the current operation of the engine 10, the CPU sets the value of the stoichiometric-lower-limit-value obtainment completion flag XLolimitdet to (at) "0", and sets a value of a stoichiometric-upper-limit-value obtainment completion flag XHilimitdet to (at) "0". That is, the CPU sets the values of these flags to (at) "0" in the initialization routine described above. Further, as described later, the CPU sets the value of the stoichiometric-lower-limit-value obtainment completion flag XLolimitdet to (at) "1" when the stoichiometric-lower-limit-value VLolimit is obtained after the start of the current operation of the engine, and sets the value of a stoichiometric-upper-limit-value obtainment completion flag XHilimitdet to (at) "1" when the stoichiometric-upper-limit-value VHilimit is obtained after the start of the current operation of the engine.

Accordingly, if the stoichiometric-lower-limit-value VLolimit has not been obtained after the start of the current operation of the engine, the value of the stoichiometric-lower-limit-value obtainment completion flag XLolimitdet is equal to "0". In this case, the CPU makes a "Yes" determination at step 2220 to proceed to step 2230 at which the CPU determines whether or not the fuel cut operation which has just ended immediately before the present time continued for more than the predetermined time. In other words, the CPU determines whether or not the oxygen storage amount OSA of the catalyst 43 has reached the maximum oxygen storage amount Cmax. Thus, this step 2230 can be replaced by a step at which the CPU determines/confirms whether or not the output value Voxs of the downstream air-fuel ratio sensor 56 is equal to the minimum output value Vmin.

It is assumed here that the fuel cut operation which has just ended immediately before the present time continued for more than the predetermined time. In this case, the CPU makes a "Yes" determination at step 2230 to proceed to step 2240 at which the CPU sets the value of the rich control flag Xrichcont to (at) "1". Thereafter, the CPU proceeds to step 2250 to set a value of a minimum change rate ΔVoxsmin to (at) a predetermined change rate initial value ΔVoxsminInitial. Subsequently, the CPU proceeds to step 2295 to end the present routine tentatively. It should be noted that, the CPU directly proceeds to step 2295 to end the present routine tentatively, when it makes a "No" determination at step 2220, or when it makes a "No" determination at step 2230.

When the value of the rich control flag Xrichcont is set to (at) "1" at step 2240 described above, the CPU makes a "Yes" determination at step 1210 shown in FIG. 12 to proceed to step 1215 at which the CPU sets the target upstream-side air-fuel ratio abyfr to (at) an air-fuel ratio AFrich (e.g., 14.2) richer than the stoichiometric air-fuel ratio. Further, the CPU sets the value of the main feedback amount DFmain to (at) "0" at step 1230 shown in FIG. 12, and sets the value of the sub feedback control amount DFsub to (at) "0" at step 1235. Consequently, when the CPU executes the processes after step 1240, the air-fuel ratio of the engine (thus, the air-fuel ratio of the catalyst inflow gas) is controlled so as to be the rich air-fuel ratio AFrich.

Figure 23:
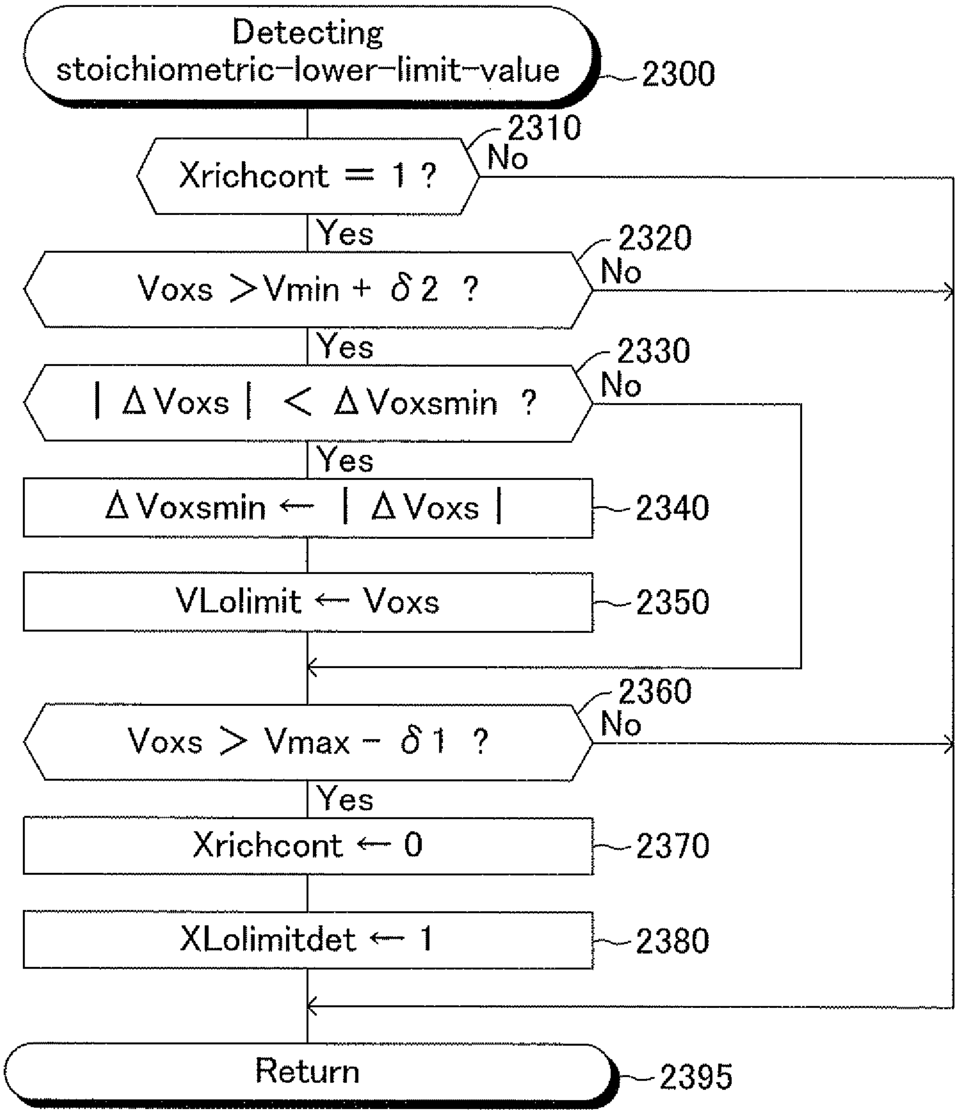
FIG. 23 is a flowchart showing a routine for detecting the stoichiometric-lower-limit-value.

Further, the CPU executes a "routine for detecting the stoichiometric-lower-limit-value" shown by a flowchart in FIG. 23, every time a predetermined time period elapses. Accordingly, at an appropriate predetermined timing, the CPU starts the process from step 2300 shown in FIG. 23 to proceed to step 2310 at which the CPU determines whether or not the value of the rich control flag Xrichcont is equal to "1". When the value of the rich control flag Xrichcont is equal to "0", the CPU makes a "No" determination at step 2310 to directly proceed to step 2395 to end the present routine tentatively.

Figure 22:
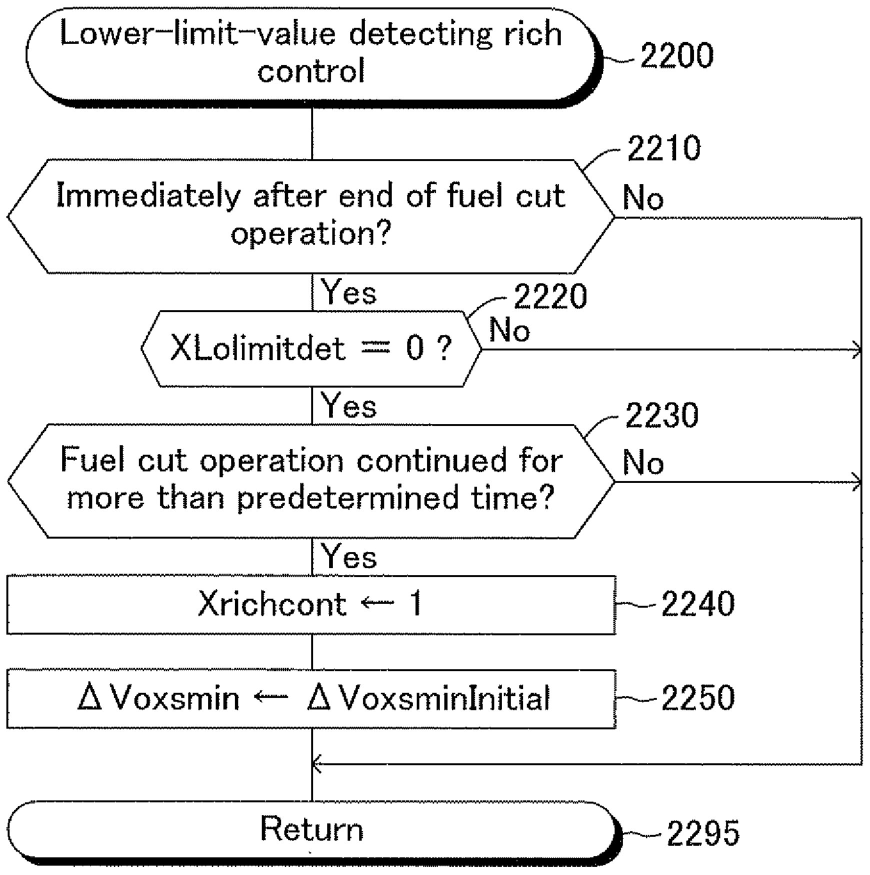
FIG. 22 is a flowchart showing a routine for performing a control to detect the stoichiometric-lower-limit-value.

In contrast, when and after the value of the rich control flag Xrichcont is set to (at) "1" by the process of the step 2240 shown in FIG. 22, the CPU makes a "Yes" determination at step 2310 to proceed to step 2320. Then, the CPU determines whether or not the output value Voxs is larger than a value (Vmin+δ2) obtained by adding a minute positive value δ2 to the minimum output value Vmin.

Assuming that the present time is immediately after the timing at which the fuel cut operation ends, and therefore, the value of the rich control flag Xrichcont is changed to "1", and the output value Voxs is smaller than or equal to the value (Vmin+δ2) obtained by adding the minute positive value δ2 to the minimum output value Vmin (refer to the time immediately after the time t1 shown in FIG. 21), the CPU makes a "No" determination at step 2320 to directly proceed to step 2395 to end the present routine tentatively.

When this state continues, the output value Voxs gradually increases, and becomes larger than the value (Vmin+δ2) obtained by adding the minute positive value δ 2 to the minimum output value Vmin. At this time, when the CPU executes the process of step 2320, the CPU makes a "Yes" determination at step 2320 to proceed to step 2330 at which the CPU determines whether or not the magnitude |ΔVoxs| of the change rate of the output value Voxs (absolute value of the change rate ΔVoxs) is smaller than a minimum change rate |ΔVoxsmin|. It should be noted that the minimum change rate ΔVoxsmin is initially set to (at) a minimum change rate initial value ΔVoxsmininitial at step 2250 shown in FIG. 22.

When the magnitude |Voxs| of the change rate ΔVox is larger than or equal to the minimum change rate ΔVoxsmin, the CPU makes a "No" determination at step 2330 to directly proceed to step 2360. In contrast, when the magnitude |ΔVoxs| of the change rate ΔVox is smaller than the minimum change rate ΔVoxsmin, the CPU obtains the magnitude |ΔVoxs| of the change rate ΔVoxs as the minimum change rate ΔVoxsmin at step 2340, and the CPU obtains the output value Voxs as the stoichiometric-lower-limit-value VLolimit at step 2350.

By repeatedly executing the processes of steps from step 2330 to step 2350, the output value Voxs when the magnitude |ΔVoxs| of the change rate ΔVoxs becomes smallest is obtained as the stoichiometric-lower-limit-value VLolimit.

Subsequently, the CPU proceeds to step 2360 at which the CPU determines whether or not the output value Voxs is larger than a "value (Vmax−δ1) obtained by subtracting a minute positive value δ1 from the maximum output value Vmax". In other words, the CPU determines whether or not the output value Voxs substantially has reached the maximum output value Vmax at step 2360.

As shown in a period from the time t1 to the time t3 in FIG. 21, the output value Voxs continues to be smaller than the value (Vmax−δ1) for a while after the value of the rich control flag Xrichcont is set to (at) "1". Therefore, the CPU makes a "No" determination at step 2360 to directly proceed to step 2395 to end the present routine tentatively.

When this state continues, the output value Voxs becomes larger than the value (Vmax−δ1). At this time, when the CPU proceeds to step 2360, the CPU makes a "Yes" determination at step 2360 to proceed to step 2370 at which the CPU sets the value of the rich control flag Xrichcont to (at) "0". Further, the CPU sets the stoichiometric-lower-limit-value obtainment completion flag XLolimitdet to (at) "1" at step 2380, and proceeds to step 2395 to end the present routine tentatively.

As a result, the output value Voxs is obtained when the magnitude |ΔVoxs| of the change rate ΔVoxs becomes smallest (minimum) in a period from the timing at which the value of the rich control flag Xrichcont is set to (at) "0" to the timing at which the output value Voxs reaches the value (Vmax−δ1) which is in the vicinity of the maximum output value Vmax, as the stoichiometric-lower-limit-value VLolimit.

Figure 24:
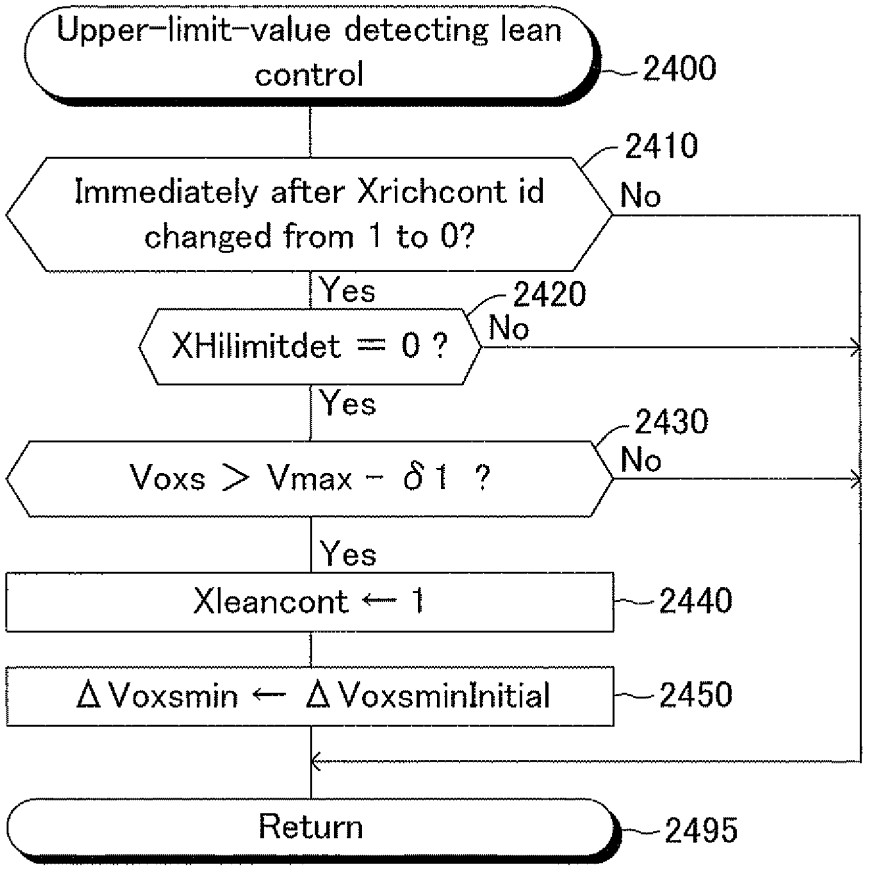
FIG. 24 is a flowchart showing a routine for performing a control to detect the stoichiometric-upper-limit-value.

Further, the CPU executes a "routine of stoichiometric-upper-limit-value detecting lean control" shown by a flowchart in FIG. 24, every time a predetermined time period elapses. Accordingly, at an appropriate predetermined timing, the CPU starts the process from step 2400 shown in FIG. 24 to proceed to step 2410 at which CPU determines whether or not the present time is immediately after the value of the rich control flag Xrichcont was changed from "1" to "0".

When the present time is not immediately after the value of the rich control flag Xrichcont was changed from "1" to "0", the CPU makes a "No" determination at step 2410 to directly proceed to step 2495 to end the present routine tentatively.

In contrast, when the present time is immediately after the value of the rich control flag Xrichcont was changed from "1" to "0", the CPU makes a "Yes" determination at step 2410 to proceed to step 2420 at which the CPU determines whether or not the stoichiometric-upper-limit-value obtainment completion flag XHilimitdet is equal to "0".

Meanwhile, as described above, the CPU sets the value of the stoichiometric-upper-limit-value obtainment completion flag XHilimitdet to (at) "0" at the start of the present operation of the engine 10, and sets the stoichiometric-upper-limit-value obtainment completion flag XHilimitdet to (at) "1" when the stoichiometric-upper-limit-value VHilimit is obtained.

Accordingly, if the stoichiometric-upper-limit-value VHilimit has not been obtained after the start of the present operation of the engine 10, the value of the stoichiometric-upper-limit-value obtainment completion flag XHilimitdet is equal to "0". In this case, the CPU makes a "Yes" determination at step 2420 to proceed to step 2430 at which the CPU determines whether or not the output value Voxs of the downstream air-fuel ratio sensor 56 is larger than the "value (Vmax−δ1) obtained by subtracting the minute positive value δ1 from the maximum output value Vmax". That is, the CPU determines whether or not the oxygen storage amount OSA of the catalyst 43 is substantially equal to "0" at step 2430, in other words, the CPU determines whether or not the output value Voxs of the downstream air-fuel ratio sensor 56 is substantially equal to the maximum output value Vmax.

When the output value Voxs of the downstream air-fuel ratio sensor 56 is larger than the "value (Vmax−δ1) obtained by subtracting the minute positive value δ1 from the maximum output value Vmax", the CPU makes a "Yes" determination at step 2430 to proceed to step 2440, at which the CPU sets the value of the lean control flag Xleancont to (at) "1". Subsequently the CPU proceeds to step 2450 to set the value of the minimum change rate ΔVoxsmin to (at) the predetermined change rate initial value ΔVoxsmininitial. Subsequently, the CPU proceeds to step 2495 to end the present routine tentatively. It should be noted that, the CPU directly proceeds to step 2495 to end the present routine tentatively, when it makes a No determination at step 2420, or when it makes a "No" determination at step 2430.

When the value of the lean control flag Xleancont is set to (at) "1" at step 2440 described above, the CPU makes a "Yes" determination at step 1220 shown in FIG. 12 to proceed to step 1225 at which the CPU sets the target upstream-side air-fuel ratio abyfr to (at) an air-fuel ratio AFlean (e.g., 15.0) leaner than the stoichiometric air-fuel ratio. Further, the CPU sets the value of the main feedback amount DFmain to (at) "0" at step 1230 shown in FIG. 12, and sets the value of the sub feedback control amount DFsub to (at) "0" at step 1235. Consequently, when the CPU executes the processes after step 1240, the air-fuel ratio of the engine (thus, the air-fuel ratio of the catalyst inflow gas) is controlled so as to be the lean air-fuel ratio AFlean.

Figure 25:
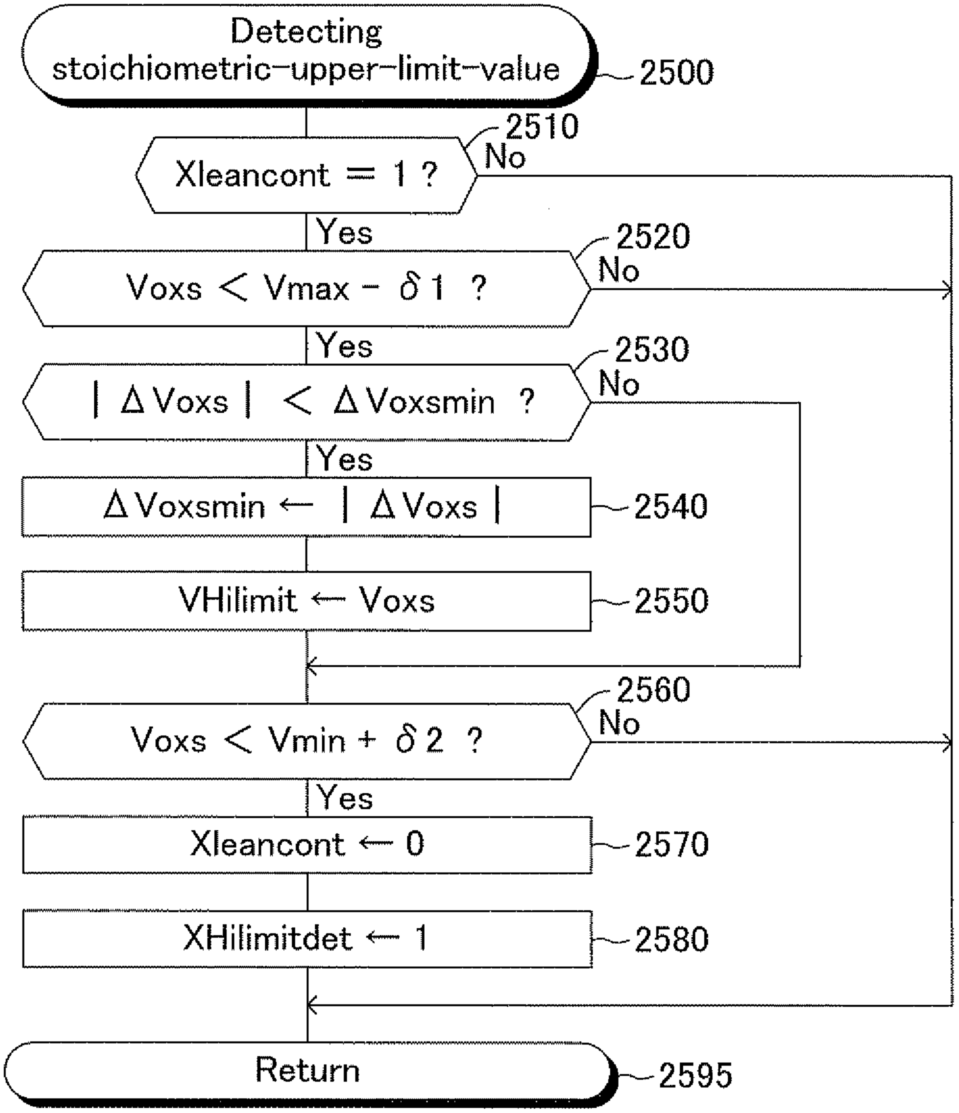
FIG. 25 is a flowchart showing a routine for detecting the stoichiometric-upper-limit-value.

Further, the CPU executes a "routine for detecting the stoichiometric-upper-limit-value" shown by a flowchart in FIG. 25, every time a predetermined time period elapses. Accordingly, at an appropriate predetermined timing, the CPU starts the process from step 2500 shown in FIG. 25 to proceed to step 2510 at which the CPU determines whether or not the value of the lean control flag Xleancont is equal to "1". When the value of the lean control flag Xleancont is equal to "0", the CPU makes a "No" determination at step 2510 to directly proceed to step 2595 to end the present routine tentatively.

In contrast, when and after the value of the lean control flag Xleancont is set to (at) "1" by the process of the step 2440 shown in FIG. 24, the CPU makes a "Yes" determination at step 2510 to proceed to step 2520. Then, the CPU determines whether or not the output value Voxs is smaller than the "value (Vmax−δ1) obtained by subtracting the minute positive value δ1 from the maximum output value Vmax".

Assuming that the present time is immediately after the timing at which the value of the lean control flag Xleancont was changed to "1" at step 2440 shown in FIG. 24, the output value Voxs is larger than or equal to the "value (Vmax−δ1) obtained by subtracting the minute positive value δ1 from the maximum output value Vmax" (refer to step 2430 shown in FIG. 24, and the period immediately after the time t3 shown in FIG. 21), the CPU makes a "No" determination at step 2520 to directly proceed to step 2595 to end the present routine tentatively.

When this state continues, the output value Voxs gradually decreases, and becomes smaller than the "value (Vmax−δ1) obtained by subtracting the minute positive value δ1 from the maximum output value Vmax". At this time, when the CPU executes the process of step 2520, the CPU makes a "Yes" determination at step 2520 to proceed to step 2530 at which the CPU determines whether or not the magnitude |ΔVoxs| of the change rate ΔVoxs of the output value Voxs (absolute value of the change rate ΔVoxs) is smaller than the minimum change rate ΔVoxsmin. It should be noted that the minimum change rate ΔVoxsmin is set to (at) the minimum change rate initial value ΔVoxsmininitial at step 2450 shown in FIG. 24.

When the magnitude |ΔVoxs| of the change rate ΔVox is larger than or equal to the minimum change rate ΔVoxsmin, the CPU makes a "No" determination at step 2530 to directly proceed to step 2560. In contrast, when the magnitude |ΔVoxs| of the change rate ΔVox is smaller than the minimum change rate ΔVoxsmin, the CPU obtains the magnitude |ΔVoxs| of the change rate ΔVoxs as the minimum change rate ΔVoxsmin at step 2540, and the CPU obtains the output value Voxs as the stoichiometric-upper-limit-value VHilimit at step 2550.

By repeatedly executing the processes of steps from step 2530 to step 2550, the output value Voxs when the magnitude |ΔVoxs| of the change rate ΔVoxs becomes smallest is obtained as the stoichiometric-upper-limit-value VHilimit.

Subsequently, the CPU proceeds to step 2560 at which the CPU determines whether or not the output value Voxs is smaller than the "value (Vmin+δ2) obtained by adding the minute positive value δ 2 to the minimum output value Vmin". In other words, the CPU determines whether or not the output value Voxs substantially has reached the minimum output value Vmin at step 2560. As shown in a period from the time t3 to the time t5 in FIG. 21, the output value Voxs continues to be larger than the value (Vmin+δ2) for a while after the value of the lean control flag Xleancont was set to (at) "1". Therefore, the CPU makes a "No" determination at step 2560 to directly proceed to step 2595 to end the present routine tentatively.

When this state continues, the output value Voxs becomes smaller than the value (Vmin+δ2). At this time, when the CPU proceeds to step 2560, the CPU makes a "Yes" determination at step 2560 to proceed to step 2570 at which the CPU sets the value of the lean control flag Xleancont to (at) "0". Further, the CPU sets the stoichiometric-upper-limit-value obtainment completion flag XHilimitdet to (at) "1" at step 2580, and proceeds to step 2595 to end the present routine tentatively.

As a result, the output value Voxs is obtained when the magnitude |ΔVoxs| of the change rate Voxs becomes smallest (minimum) in a period from the timing at which the value of the lean control flag Xleancont is set to (at) "0" to the timing at which the output value Voxs reaches the value (Vmin+δ2) which is in the vicinity of the minimum output value Vmin, as the stoichiometric-upper-limit-value VHilimit.

In addition, since the value of the rich control flag Xrichcont is set to (at) "0" at step 2370 shown in FIG. 23, and the value of the lean control flag Xleancont is set to (at) "0" at step 2570 shown in FIG. 25, the CPU makes "No" determinations at both step 1210 and step 1220 shown in FIG. 12 from this point in time, the processes of step 1215 and step 1225 are not executed. Accordingly, the target upstream-side air-fuel ratio abyfr is set to (at) the stoichiometric air-fuel ratio (e.g., 14.6) set at step 1205.

Further, the stoichiometric-lower-limit-value obtainment completion flag XLolimitdet is set to (at) "1" at step 2380 shown in FIG. 23, and the stoichiometric-upper-limit-value obtainment completion flag XHimitdet is set to (at) "1" at step 2580 shown in FIG. 25. Accordingly, until a time at which the engine 10 is started next time (i.e., until a time at which the initialization routine described above is executed), the CPU makes a "No" determination at step 2220 shown in FIG. 22, and makes a "No" determination at step 2420 shown in FIG. 24. Therefore, obtaining the stoichiometric-lower-limit-value VLolimit by setting the target upstream-side air-fuel ratio to (at) the rich air-fuel ratio AFrich is not carried out, and obtaining the stoichiometric-upper-limit-value VHilimit by setting the target upstream-side air-fuel ratio to (at) the lean air-fuel ratio AFlean is not carried out. It should be noted that the first control apparatus may repeatedly obtain the stoichiometric-lower-limit-value VLolimit and the stoichiometric-upper-limit-value VHilimit, when the fuel cut operation over the predetermined time is carried out during the engine is operated.

As described above, the first control apparatus comprises a downstream air-fuel ratio sensor 56 which is the oxygen concentration cell type sensor; and air-fuel ratio control means (refer to the routine shown in FIG. 11) for controlling the "air-fuel ratio of the mixture supplied to the engine 10" so as to change the air-fuel ratio of the "catalyst inflow gas" which is the gas flowing into the catalyst 43, based on the output value Voxs of the downstream air-fuel ratio sensor 56.

Further, the air-fuel ratio control means is configured so as to control the air-fuel ratio of the mixture supplied to the engine (i.e., performs the normal air-fuel ratio feedback control) in such a manner that the air-fuel ratio of the catalyst inflow gas becomes the air-fuel ratio richer than the stoichiometric air-fuel ratio when the output value Voxs of the downstream air-fuel ratio sensor 56 decreases (refer to step 1110 and step 1130 shown in FIG. 11) and that the air-fuel ratio of the catalyst inflow gas becomes the air-fuel ratio leaner than the stoichiometric air-fuel ratio when the output value Voxs of the downstream air-fuel ratio sensor 56 increases (refer to step 1110 and step 1150 shown in FIG. 11).

More specifically, the air-fuel ratio control means is configured so as to control the air-fuel ratio of the mixture supplied to the engine 10 in such a manner that the air-fuel ratio of the catalyst inflow gas becomes the air-fuel ratio richer than the stoichiometric air-fuel ratio when the magnitude |ΔVoxs| of the change rate of the output value Voxs of the downstream air-fuel ratio sensor 56 is larger than or equal to the first change rate threshold ΔV1th while the output value Voxs is decreasing (refer to step 1120 and step 1130 shown in FIG. 11), and in such a manner that the air-fuel ratio of the catalyst inflow gas becomes the air-fuel ratio leaner than the stoichiometric air-fuel ratio when the magnitude |ΔVoxs| of the change rate of the output value Voxs of the downstream air-fuel ratio sensor 56 is larger than or equal to the second change rate threshold ΔV2th while the output value Voxs is increasing (refer to step 1140 and step 1150 shown in FIG. 11).

More specifically, when the magnitude |ΔVoxs| of the change rate of the output value Voxs of the downstream air-fuel ratio sensor 56 is larger than or equal to the first change rate threshold ΔV1th (including "0") while the output value Voxs is decreasing, the reflection ratio Kb is set to (at) "0" at step 2060 shown in FIG. 20, and thus, the proportional term SP of the sub feedback amount DFsub is set to (at) "0" at step 2070, and the time-derivative term SD of the sub feedback amount DFsub becomes a positive value (step 1730 and step 1740 shown in FIG. 17). Accordingly, the base fuel injection amount Fbase is corrected so as to be increased by the sub feedback amount DFsub (in this case, the sub feedback amount DFsub includes the time-derivative term SD only), and consequently, the air-fuel ratio of the engine (thus, the air-fuel ratio of the catalyst inflow gas) is controlled so at to be the rich air-fuel ratio.

When the output value Voxs of the downstream air-fuel ratio sensor 56 is decreasing, and the magnitude |ΔVoxs| of the change rate of the output value Voxs is larger than or equal to the first change rate threshold ΔV1th, the excessive oxygen is flowing out from the catalyst 43. Accordingly, even when the output value Voxs of the downstream air-fuel ratio sensor 56 is larger than the middle value Vmid (i.e., when the conventional art determines that the air-fuel ratio is rich), the oxygen storage amount OSA of the catalyst 43 is not in the vicinity of "0", but rather has increased to a value in the vicinity of the maximum oxygen storage amount Cmax. Therefore, in such a case, the required air-fuel ratio of the catalyst inflow gas is the air-fuel ratio (rich air-fuel ratio) richer than the stoichiometric air-fuel ratio. In view of the above and as described above, the first control apparatus controls the air-fuel ratio of the catalyst inflow gas such that the air-fuel ratio of the catalyst inflow gas becomes the rich air-fuel ratio.

Accordingly, the first control apparatus can set the air-fuel ratio of the catalyst inflow gas to (at) the rich air-fuel ratio at a point in time before the oxygen storage amount OSA reaches the maximum oxygen storage amount Cmax, so that the oxygen storage amount OSA can be started to be decreased. Consequently, unlike the conventional apparatus, the first control apparatus does not make the unnecessary decreasing-correction on the fuel injection amount, and therefore, can prevent a large amount of NOx from being discharged/emitted.

Furthermore, when the magnitude |ΔVoxs| of the change rate of the output value Voxs of the downstream air-fuel ratio sensor 56 is larger than or equal to the second change rate threshold ΔV2th (including "0") while the output value Voxs is increasing, the reflection ratio Ka is set to (at) "0" at step 2030 shown in FIG. 20, and the time-derivative term SD becomes a negative value (step 1730 and step 1740 shown in FIG. 17). Accordingly, the base fuel injection amount Fbase is corrected so as to be decreased by the sub feedback amount DFsub (by the time-derivative term SD), and consequently, the air-fuel ratio of the engine (thus, the air-fuel ratio of the catalyst inflow gas) is controlled so at to be the lean air-fuel ratio.

When the output value Voxs of the downstream air-fuel ratio sensor 56 is increasing, and the magnitude |ΔVoxs| of the change rate of the output value Voxs is larger than or equal to the second change rate threshold ΔV2th, the excessive unburnt substances are flowing out from the catalyst 43. Accordingly, even when the output value Voxs of the downstream air-fuel ratio sensor 56 is smaller than the middle value Vmid (i.e., when the conventional art determines that the air-fuel ratio is lean), the oxygen storage amount OSA of the catalyst 43 is not in the vicinity of the maximum oxygen storage amount Cmax, but rather has decreased to a value in the vicinity of "0". Therefore, in such a case, the required air-fuel ratio of the catalyst inflow gas is the air-fuel ratio (lean air-fuel ratio) leaner than the stoichiometric air-fuel ratio. In view of the above and as described above, the first control apparatus controls the air-fuel ratio of the catalyst inflow gas such that the air-fuel ratio of the catalyst inflow gas becomes the lean air-fuel ratio.

Accordingly, the first control apparatus can set the air-fuel ratio of the catalyst inflow gas to (at) the lean air-fuel ratio at a point in time before the oxygen storage amount OSA reaches "0", so that the oxygen storage amount OSA can be started to be increased. Consequently, unlike the conventional apparatus, the first control apparatus does not make the unnecessary increasing-correction on the fuel injection amount, and therefore, can prevent a large amount of the unburnt substances from being discharged/emitted.

Further, the air-fuel ratio control means included in the first control apparatus is configured so as to perform the "normal air-fuel ratio feedback control" substantially based on the "time-derivative term SD of the sub feedback amount DFsub" without substantially based on the "proportional term SP of the sub feedback amount DFsub", when the output value of the downstream air-fuel ratio sensor is smaller than the "predetermined first threshold" and larger than the "predetermined second threshold which is smaller than the first threshold".

More specifically, the first threshold is set at (to) the stoichiometric-upper-limit-value VHilimit. The stoichiometric-upper-limit-value VHilimit is set to (at) a value equal to the "output value Voxs of the downstream air-fuel ratio sensor 56" obtained when the "air-fuel ratio of the catalyst inflow gas" is the "lean air-fuel ratio", the oxygen storage amount OSA of the catalyst 43 is increasing, and the "air-fuel ratio of the catalyst outflow gas" is equal to the "stoichiometric air-fuel ratio".

When the output value Voxs of the downstream air-fuel ratio sensor 56 is larger than the first threshold, and when it is considered that the catalyst 43 is in the state in which the oxygen is short, it is not favorable that the "air-fuel ratio of the catalyst inflow gas" be set to (at) the rich air-fuel ratio, even when the output value Voxs of the downstream air-fuel ratio sensor 56 decreases. Accordingly, the first control apparatus is configured in such a manner that the first control apparatus does not perform the normal air-fuel ratio feedback control when the output value Voxs of the downstream air-fuel ratio sensor 56 is larger than the first threshold.

The second threshold is set at (to) the stoichiometric-lower-limit-value VLolimit. The stoichiometric-lower-limit-value VLolimit is set to (at) a value equal to the "output value Voxs of the downstream air-fuel ratio sensor 56" obtained when the "air-fuel ratio of the catalyst inflow gas" is the "rich air-fuel ratio", the oxygen storage amount OSA of the catalyst 43 is decreasing, and the “air-fuel ratio of the catalyst outflow gas” is equal to the “stoichiometric air-fuel ratio”.

When the output value Voxs of the downstream air-fuel ratio sensor 56 is smaller than the second threshold, and when it is considered that the catalyst 43 is in the state in which the oxygen is excessive, it is not favorable that the “air-fuel ratio of the catalyst inflow gas” be set to (at) the lean air-fuel ratio, even when the output value Voxs of the downstream air-fuel ratio sensor 56 increases. Accordingly, the first control apparatus is configured in such a manner that the first control apparatus does not perform the normal air-fuel ratio feedback control when the output value Voxs of the downstream air-fuel ratio sensor 56 is smaller than the second threshold.

The air-fuel ratio control means included in the first control apparatus is configured so as to control the “air-fuel ratio of the mixture supplied to the engine” in such a manner that the “air-fuel ratio of the catalyst inflow gas” becomes (is set to) the lean air-fuel ratio, when the output value Voxs of the downstream air-fuel ratio sensor 56 is larger than or equal to a value (e.g., the Vmax−$\alpha$1, preferably the stoichiometric-upper-limit-value VHilimit) within a predetermined range including the first threshold (refer to the “Yes” determination at step 1810 shown in FIG. 18).

This control is realized by the following reasons.

When the output value Voxs is larger than or equal to the value (e.g., the Vmax−$\alpha$1, preferably the stoichiometric-upper-limit-value VHilimit) within the predetermined range including the first threshold, the proportional term SP of the sub feedback amount DFsub calculated at step 1820 shown in FIG. 18 becomes a “negative value”, and its magnitude |SP| becomes a “considerably large value”, the output value Voxs is not likely to decrease, and the proportional term SP is not decreased since the rich-negation flag XNOTrich is not set to (at) “1” at step 1520 shown in FIG. 15 when the output value Voxs does not decrease (refer to a direct flow from step 2050 to step 2095 in FIG. 20), and the sub feedback amount DFsub (=SP+SD) becomes a negative value (value which decreases the base fuel injection amount Fbase) since the time-derivative term SD does not become a positive value, and even when the output value Voxs decreases, the proportional term SP is not decreased since the magnitude |ΔVoxs| of the change rate of the output value Voxs is considerably smaller than the first change rate threshold ΔV1th (refer to step 2060 and step 2070 in FIG. 20), and a magnitude |SD| of the time-derivative term is relatively small since the magnitude |ΔVoxs| of the change rate is not considerably large whereas the time-derivative term SD becomes a positive value, and accordingly, the sub feedback amount DFsub (=SP+SD) becomes a negative value.

As described above, when the output value Voxs of the downstream air-fuel ratio sensor is larger than or equal to the value (Vmax−$\alpha$1, preferably the stoichiometric-upper-limit-value VHilimit) within the predetermined range including the first threshold, the storage amount OSA of the catalyst 43 is extremely small, and therefore, the required air-fuel ratio of the catalyst inflow gas is the air-fuel ratio leaner than the stoichiometric air-fuel ratio. In view of the above, the first control apparatus controls the “air-fuel ratio of the mixture supplied to the engine” in such a manner that the air-fuel ratio of the catalyst inflow gas become the air-fuel ratio leaner than the stoichiometric air-fuel ratio, regardless of the change rate of the output value Voxs of the downstream air-fuel ratio sensor, when the output value Voxs of the downstream air-fuel ratio sensor is larger than or equal to the value which is within the range including the first threshold. Consequently, the first control apparatus can increase the oxygen storage amount OSA rapidly, so that it can rapidly increase the efficiency of purifying emissions of the catalyst 43.

Further, the air-fuel ratio control means included in the first control apparatus is configured so as to control the “air-fuel ratio of the mixture supplied to the engine” in such a manner that the “air-fuel ratio of the catalyst inflow gas” becomes (is set to) the rich air-fuel ratio, when the output value Voxs of the downstream air-fuel ratio sensor 56 is smaller than or equal to a value (e.g., the Vmin+$\alpha$2, preferably the stoichiometric-lower-limit-value VLolimit) within a predetermined range including the second threshold (refer to the “Yes” determination at step 1840 shown in FIG. 18).

This control is realized by the following reasons.

When the output value Voxs is larger than or equal to the value (e.g., the Vmin+$\alpha$2, preferably the stoichiometric-lower-limit-value VLolimit) within the predetermined range including the second threshold, the proportional term SP of the sub feedback amount DFsub calculated at step 1850 shown in FIG. 18 becomes a “positive value”, and its magnitude |SP| becomes a “considerably large value”, the output value Voxs is not likely to increase, and the proportional term SP is not decreased since the lean-negation flag XNOTlean is not set to (at) “1” at step 1560 shown in FIG. 15 when the output value Voxs does not increase (refer to a direct flow from step 2020 to step 2095 in FIG. 20), and the sub feedback amount DFsub (=SP+SD) becomes a positive value (value which increases the base fuel injection amount Fbase) since the time-derivative term SD does not become a negative value, and even when the output value Voxs increases, the proportional term SP is not decreased since the magnitude |ΔVoxs| of the change rate of the output value Voxs is considerably smaller than the second change rate threshold ΔV2th (refer to step 2030 and step 2040 in FIG. 20), and a magnitude |SD| of the time-derivative term is relatively small since the magnitude |ΔVoxs| of the change rate is not considerably large whereas the time-derivative term SD becomes a negative value, and accordingly, the sub feedback amount DFsub (=SP+SD) becomes a positive value.

As described above, when the output value Voxs of the downstream air-fuel ratio sensor is smaller than or equal to the value (Vmin+$\alpha$2, preferably the stoichiometric-lower-limit-value VLolimit) within the predetermined range including the second threshold, the storage amount OSA of the catalyst 43 is in the vicinity of the maximum oxygen storage amount Cmax, and therefore, the required air-fuel ratio of the catalyst inflow gas is the air-fuel ratio richer than the stoichiometric air-fuel ratio. In view of the above, the first control apparatus controls the “air-fuel ratio of the mixture supplied to the engine” in such a manner that the air-fuel ratio of the catalyst inflow gas become the air-fuel ratio richer than the stoichiometric air-fuel ratio, regardless of the change rate of the output value Voxs of the downstream air-fuel ratio sensor, when the output value Voxs of the downstream air-fuel ratio sensor is smaller than or equal to the value which is within the range including the second threshold. Consequently, the first control apparatus can decrease the oxygen storage amount OSA rapidly, so that it can rapidly increase the efficiency of purifying emissions of the catalyst 43.

Further, the air-fuel ratio control means included in the first control apparatus comprises:

base fuel injection amount calculating means for obtaining the intake air amount introduced into the engine 10, and calculating, based on the obtained intake air amount, the base fuel injection amount for having the “air-fuel ratio of the mixture supplied to the engine" coincide with the stoichiometric air-fuel ratio (refer to step 1205, step 1240, and step 1245, shown in FIG. 12);

sub feedback amount calculating means for calculating, based on the output value Voxs of the downstream air-fuel ratio sensor 56, the "sub feedback amount DFsub" which is a feedback amount to correct the base fuel injection amount (refer to the routines shown in FIGS. 17 and 18); and fuel injection means for injecting and supplying to the engine 10 a fuel whose amount (the final fuel injection amount Fi) is obtained by correcting the base fuel injection amount Fbase with the sub feedback amount DFsub (refer to step 1265 shown in FIG. 12, the fuel injectors 25, and so on).

Further, in order to perform the "normal air-fuel ratio feedback control" described above, the sub feedback amount calculating means calculates the sub feedback amount DFsub (refer to steps from step 1730 to step 1750, and step 1760, shown in FIG. 17) in such a manner that:

(1) the sub feedback amount DFsub becomes a "value, which more greatly increases the base fuel injection amount Fbase as the magnitude of the change rate |DVoxs| of the output value Voxs becomes larger", when the output value Voxs of the downstream air-fuel ratio sensor 56 is decreasing (DVoxs<0); and (2) the sub feedback amount DFsub becomes a "value, which more greatly decreases the base fuel injection amount Fbase as the magnitude |DVoxs| of the change rate of the output value Voxs becomes larger", when the output value Voxs of the downstream air-fuel ratio sensor 56 is increasing (DVoxs>0).

When the output value Voxs of the downstream air-fuel ratio sensor is rapidly decreasing toward the minimum output value Vmin, it can be considered that the excessive oxygen is flowing out from the catalyst 43, since the oxygen storage amount OSA is approaching the maximum oxygen storage amount Cmax. Accordingly, when the output value Voxs of the downstream air-fuel ratio sensor is decreasing, it is preferable that the "air-fuel ratio of the catalyst inflow gas be set air-fuel ratio much richer than the stoichiometric air-fuel ratio" as the magnitude |DVoxs| of the change rate of the output value Voxs (magnitude of the decreasing rate) becomes larger.

In view of the above, the first control apparatus, when the output value Voxs of the downstream air-fuel ratio sensor 56 is decreasing, calculates the sub feedback amount DFsub (in actuality, the time-derivative term SD) in such a manner that the sub feedback amount DFsub becomes a "value, which more greatly increases the base fuel injection amount Fbase as the magnitude |DVoxs| of the change rate becomes larger". Consequently, the oxygen storage amount OSA can be started to be decreased at a point in time before the oxygen storage amount OSA reaches the maximum oxygen storage amount Cmax, and thus, the efficiency of purifying emissions of the catalyst 43 can be maintained at a high value.

In contrast, when the output value Voxs of the downstream air-fuel ratio sensor 56 is rapidly increasing toward the maximum output value Vmax, it can be considered that the oxygen storage amount OSA is approaching "0", and therefore, the excessive unburnt substances are flowing out from the catalyst 43. Accordingly, when the output value Voxs of the downstream air-fuel ratio sensor 56 is increasing, it is preferable that the "air-fuel ratio of the catalyst inflow gas be set to (at) a much leaner air-fuel ratio than the stoichiometric air-fuel ratio" as the magnitude |DVoxs| of the change rate of the output value Voxs (magnitude of the increasing rate) becomes larger.

In view of the above, the first control apparatus, when the output value Voxs of the downstream air-fuel ratio sensor 56 is increasing, calculates the sub feedback amount DFsub (in actuality, the time-derivative term SD) in such a manner that the sub feedback amount DFsub becomes a value, which more greatly decreases the base fuel injection amount Fbase as the magnitude |DVoxs| of the change rate becomes larger. Consequently, the oxygen storage amount OSA can be started to be increased at a point in time before the oxygen storage amount OSA reaches "0", and thus, the efficiency of purifying emissions of the catalyst 43 can be maintained at a high value.

More specifically, "sub feedback amount calculating means of the first control apparatus" described above, in order to perform the normal air-fuel ratio feedback control, includes time-derivative term calculating means (refer to steps from step 1730 to step 1750, and step 1760, shown in FIG. 17), for calculating, as the "time-derivative term SD of the sub feedback amount DFsub", the value (Kd·DVoxs) obtained by multiplying the change rate DVoxs of the output value Voxs of the downstream air-fuel ratio sensor 56 by the certain (predetermined) time-derivative gain Kd, such that the base fuel injection amount Fbase is more greatly increased as the magnitude |DVoxs| of the change rate of the output value Voxs" becomes larger when the output value Voxs of the downstream air-fuel ratio sensor 56 is decreasing, and the base fuel injection amount Fbase is more greatly decreased as the magnitude |DVoxs| of the change rate of the output value Voxs" becomes larger when the output value Voxs of the downstream air-fuel ratio sensor 56 is increasing.

In this manner, according to the first control apparatus, the value (Kd·DVoxs) is calculated as the "time-derivative term SD of the sub feedback amount", the value (Kd·DVoxs) being obtained by multiplying the change rate DVoxs (which corresponds to a change amount of the output value of the downstream air-fuel ratio sensor 56 per unit time) of the output value Voxs of the downstream air-fuel ratio sensor 56 by the certain (predetermined) time-derivative gain Kd. The time-derivative gain Kd is determined in such a manner that the time-derivative term SD becomes a positive value (that is, a value which increases the base fuel injection amount Fbase) when the output value Voxs of the downstream air-fuel ratio sensor 56 is decreasing with time, and that the time-derivative term SD becomes a negative value (that is, a value which decreases the base fuel injection amount Fbase) when the output value Voxs of the downstream air-fuel ratio sensor 56 is increasing with time. Using this time-derivative term SD allows a gas whose air-fuel ratio corresponds to the required air-fuel ratio of the catalyst inflow gas to be flowed into the catalyst. Consequently, the oxygen storage amount OSA reaches neither the maximum oxygen storage amount Cmax nor "0", and therefore, the efficiency of purifying emissions of the catalyst 43 can be maintained at a high value.

Further, the sub feedback amount calculating means included in the first control apparatus includes a proportional term calculating means which is configured as follows.

That is, the proportional term calculating means, (B1) when the output value Voxs of the downstream air-fuel ratio sensor 56 is larger than or equal to the first threshold (e.g., the stoichiometric-upper-limit-value VHilimit), calculates the sum of, the value (VHilimit−Voxs)·KpL obtained by multiplying the difference between the first threshold and the output value Voxs by the lean control gain KpL, and the value (Voxsref−VHilimit)·KpS1 obtained by multiplying the difference between the predetermined target value Voxsref and the first threshold (e.g., the stoichiometric-upper-limit-value VHilimit) by the first gain KpS1, wherein the target value Voxsref being the value (e.g., the stoichiometric-lower-limit-value VLolimit) which is set between the first threshold and the second threshold, as the "proportional term SP of the sub feedback control amount DFsub for controlling the air-fuel ratio of the mixture supplied to the engine in such a manner that the air-fuel ratio of the mixture supplied to the engine becomes an air-fuel ratio leaner than the stoichiometric air-fuel ratio (refer to step 1820 shown in FIG. 18)".

Further, the proportional term calculating means, (B2) when the output value Voxs of the downstream air-fuel ratio sensor 56 is smaller than or equal to the second threshold (e.g, the stoichiometric-lower-limit-value VLolimit), calculates the sum of, tha value (VLolimit−Voxs)·KpR obtained by multiplying the difference between the second threshold and the output value Voxs by the rich control gain KpR, and the value (Voxsref−VLolimit)·KpS2 obtained by multiplying the difference between the target value Voxsref and the second threshold by the second gain KpS2, as the "proportional term SP of the sub feedback control amount DFsub for controlling the air-fuel ratio of the mixture supplied to the engine in such a manner that the air-fuel ratio of the mixture supplied to the engine becomes an air-fuel ratio richer than the stoichiometric air-fuel ratio(refer to step 1850 shown in FIG. 18)".

Further, the proportional term calculating means, (B3) when the output value Voxs of the downstream air-fuel ratio sensor 56 is between the first threshold and the second threshold, calculates the value (Voxsref−Voxs)·KpS3 obtained by multiplying the difference between the target value and the output value Voxs by the third gain KpS3, as the "proportional term SP of the sub feedback control amount DFsub" (refer to step 1860 shown in FIG. 18).

When the output value Voxs of the downstream air-fuel ratio sensor is between the "value ((Vmax−α1) in FIG. 8, preferably the stoichiometric-upper-limit-value VHilimit) in the region including the first threshold" and the "value ((Vmin+α2) in FIG. 9, preferably the stoichiometric-lower-limit-value VLolimit) in the region including the second threshold", it can be considered that the oxygen storage amount OSA is close to its appropriate amount. That is, in this case, it is clear that the oxygen storage amount OSA is neither in the vicinity of the maximum oxygen storage amount Cmax nor in the vicinity of "0". Accordingly, when the output value Voxs of the downstream air-fuel ratio sensor is between the first threshold and the second threshold, it is not necessary to increase the proportional term SP of the sub feedback amount which is for having the output value Voxs come closer to the "target value (e.g., the middle value Vmid) which is set between the first threshold and the second threshold".

In contrast, when the output value Voxs of the downstream air-fuel ratio sensor is larger than or equal to the value within the predetermined range including the first threshold, the oxygen storage amount OSA is in the vicinity of "0", and therefore, the required air-fuel ratio of the catalyst inflow gas is an air-fuel ratio leaner than the stoichiometric air-fuel ratio. In this case, the conventional apparatus calculates the "proportional term SP of the sub feedback amount" by multiplying the "difference (Voxsref−Voxs) between the output value Voxs of the downstream air-fuel ratio sensor and the target value Voxsref which is set at the middle value Vmid" by a "predetermined gain". However, it is enough for the proportional term SP to function to decrease the output value Voxs down to the first threshold, and therefore, if the proportional term SP is obtained according to the conventional apparatus, the proportional term SP may become excessively large when the output value Voxs of the downstream air-fuel ratio sensor is larger than or equal to the first threshold.

In view of the above, as described in (B1) above, the first control apparatus calculates the sum of the value (VHilimit−Voxs)·Kpl and the value (Voxsref−VHilimit)·KpS1, as the "proportional term SP of the sub feedback control amount DFsub", when the output value Voxs of the downstream air-fuel ratio sensor 56 is larger than or equal to the first threshold. According to this configuration, the lean control gain KpL can be set to (at) a value different from the first gain KpS1 (e.g., KpL>KpS1). Thus, it is possible to avoid a "state in which the oxygen storage amount OSA rapidly increases up to a value in the vicinity of the maximum oxygen storage amount Cmaxat once due to the excessively large proportional term SP which is for having the air-fuel ratio of the catalyst inflow gas set to (at) the air-fuel ratio leaner than the stoichiometric air-fuel ratio".

Similarly, when the output value Voxs of the downstream air-fuel ratio sensor is smaller than or equal to the value within the predetermined range including the second threshold, the oxygen storage amount OSA is in the vicinity of the maximum oxygen storage amount Cmax, and therefore, the required air-fuel ratio of the catalyst inflow gas is an air-fuel ratio richer than the stoichiometric air-fuel ratio. In this case as well, the conventional apparatus calculates the "proportional term SP of the sub feedback amount" by multiplying the "difference between the output value Voxs of the downstream air-fuel ratio sensor and the target value Voxsref which is set at the middle value Vmid" by the "predetermined gain". However, it is enough for the proportional term SP to function to increase the output value Voxs up to the second threshold, and therefore, if the proportional term SP is obtained according to the conventional apparatus, the proportional term SP may become excessively large when the output value Voxs of the downstream air-fuel ratio sensor is smaller than or equal to the second threshold.

In view of the above, as described in (B2) above, the first control apparatus calculates the sum of the value (VLolimit−Voxs)·KpR and the value (Voxsref−VLolimit)·KpS2, as the "proportional term SP of the sub feedback control amount DFsub", when the output value Voxs of the downstream air-fuel ratio sensor 56 is smaller than or equal to the second threshold. According to this configuration, the rich control gain KpR can be set to (at) a value different from the second gain KpS2 (e.g., KpR>KpS2). Thus, it is possible to avoid a "state in which the oxygen storage amount OSA rapidly decreases down to a value in the vicinity of "0" at once due to the excessively large proportional term SP which is for having the air-fuel ratio of the catalyst inflow gas set to (at) the air-fuel ratio richer than the stoichiometric air-fuel ratio".

Further, as described in (B3) above, the first control apparatus calculates the value (Voxsref−Voxs)·KpS3 obtained by multiplying the difference between the target value and the output value by the appropriate third gain KpS3, as the "proportional term SP of the sub feedback control amount DFsub", when the output value Voxs of the downstream air-fuel ratio sensor 56 is between the first threshold and the second threshold. In this manner, the proportional term SP for maintaining the oxygen storage amount SA within an appropriate range is calculated.

It should be noted that an absolute value of the lean control gain KpL and an absolute value of the rich control gain KpR may be different from each other, or may be the same as each other (as a gain for an error outside of threshold). Also, the first gain KpS1, the second gain KpS2, and the third gain KpS3 may be different from each other, or may the same as each other (as a gain for an error inside of threshold). Further, as described above, the third gain KpS3 may be smaller than each of the first gain KpS1 and the second gain KpS2, or may be "0".

In addition, the proportional term calculating means included in the first control apparatus is configured so as to decrease the magnitude of the proportional term SP of the sub feedback amount as the magnitude |ΔVoxs| (or |DVoxs|) of the change rate of the output value Voxs of the downstream air-fuel ratio sensor 56 is larger (refer to step 2030, step 2040, step 2060, and step 2070 in FIG. 20).

As described above, it can be considered that the oxygen storage amount OSA becomes much closer to the maximum oxygen storage amount Cmax, as the magnitude of the change rate of the output value Voxs of the downstream air-fuel ratio sensor becomes larger when the output value Voxs is decreasing. Accordingly, when the output value Voxs of the downstream air-fuel ratio sensor is decreasing, it is preferable that the sub feedback amount DFsub be a value to more greatly increase the base fuel injection amount Fbase as the magnitude of the change rate of the output value Voxs becomes larger. However, if the output value Voxs of the downstream air-fuel ratio sensor is larger than the target value Voxsref, the proportional term SP of the sub feedback amount DFsub becomes a value to decrease the base fuel injection amount Fbase. Accordingly, as the first control apparatus, by decreasing the proportional term SP of the sub feedback amount DFsub (including setting the proportional term SP to (at) "0") as the magnitude of the change rate of the output value Voxs of the downstream air-fuel ratio sensor 56 becomes larger, the time-derivative term SD can work efficiently, and therefore, the state can be avoided in which the "oxygen storage amount OSA reaches the value in the vicinity of the maximum oxygen storage amount Cmax".

Similarly, it can be considered that the oxygen storage amount OSA becomes much closer to "0", as the magnitude of the change rate of the output value Voxs of the downstream air-fuel ratio sensor becomes larger when the output value Voxs is increasing. Accordingly, when the output value Voxs of the downstream air-fuel ratio sensor is increasing, it is preferable that the sub feedback amount DFsub be a value to more greatly decrease the base fuel injection amount Fbase as the magnitude of the change rate of the output value Voxs becomes larger. However, if the output value Voxs of the downstream air-fuel ratio sensor is smaller than the target value Voxsref, the proportional term SP becomes a value to increase the base fuel injection amount Fbase. Accordingly, as the first control apparatus, by decreasing the proportional term SP of the sub feedback amount DFsub (including setting the proportional term SP to (at) "0") as the magnitude of the change rate of the output value Voxs of the downstream air-fuel ratio sensor 56 becomes larger, the time-derivative term SD can work efficiently, and therefore, the state can be avoided in which the "oxygen storage amount OSA reaches the value in the vicinity of "0"".

Further, the air-fuel ratio control means of the first control apparatus comprises:

base fuel injection amount calculating means for obtaining the intake air amount introduced into the engine, and calculating, based on the obtained intake air amount, the base fuel injection amount Fbase for having the air-fuel ratio of the mixture supplied to the engine coincide with the stoichiometric air-fuel ratio (refer to step 1205, step 1240, and step 1245, in FIG. 12);

the upstream air-fuel ratio sensor 55 disposed in the exhaust passage of the engine 10 at the position upstream of the catalyst 43, the upstream air-fuel ratio sensor outputting the output value Vabyfs in accordance with the air-fuel ratio of the gas flowing through the position at which the upstream air-fuel ratio sensor 55 is disposed;

main feedback amount calculating means for calculating the "main feedback amount DFmain which corrects the base fuel injection amount Fbase" in such a manner that the upstream-side air-fuel ratio abyfs represented by the output value abyfs of the upstream air-fuel ratio sensor coincides with the stoichiometric air-fuel ratio (refer to the routine shown in FIG. 14);

sub feedback amount calculating means for calculating the sub feedback amount DFsub which corrects the base fuel injection amount Fbase (refer to the routines shown in FIGS. 17 and 18); and fuel injection means for injecting and supplying to the engine 10 a fuel having the amount Fi which is obtained by correcting the base fuel injection amount Fbase with the "air-fuel ratio correction amount (DFmain+DFsub)" which is formed (composed) of the main feedback amount DFmain and the sub feedback amount DFsub" (refer to step 1250, step 1265, the fuel injectors 25, and so on).

Further, the main feedback amount calculating means is configured so as to (E1) decrease a magnitude of the main feedback amount DFmain or set the magnitude of the main feedback amount DFmain at (to) 0, if the main feedback amount DFmain is a "value (i.e., negative value) which decreases the base fuel injection amount Fbase" while the output value Voxs of the downstream air-fuel ratio sensor 56 is decreasing (refer to, step 1510 and step 1520 in FIG. 15, as well as step 1610, step 1640, and step 1650 in FIG. 16).

Further, the main feedback amount calculating means is configured so as to (E2) decrease the magnitude of the main feedback amount DFmain or set the magnitude of the main feedback amount DFmain at (to) 0, if the main feedback amount DFmain is a "value (i.e., positive value) which increases the base fuel injection amount Fbase" while the output value Voxs of the downstream air-fuel ratio sensor 56 is increasing (refer to, step 1510, step 1540, and step 1560 in FIG. 15, as well as step 1610, step 1620, and step 1630 in FIG. 16).

In this manner, the first control apparatus performs the main feedback control using the main feedback amount DFmain calculated based on the output value Vabyfs of the upstream air-fuel ratio sensor in order to promptly compensate for a transient (temporary) disturbance in the air-fuel ratio of the mixture supplied to the engine 10, as well as the sub feedback control using the sub feedback amount DFsub calculated based on the output value Voxs of the downstream air-fuel ratio sensor.

When the output value Voxs of the downstream air-fuel ratio sensor 56 is decreasing, the oxygen storage amount OSA is no longer in the vicinity of "0", but rather is changing to the value in the vicinity of the maximum oxygen storage amount Cmax. Accordingly, the required air-fuel ratio of the catalyst inflow gas is the "air-fuel ratio richer than the stoichiometric air-fuel ratio". Thus, in this case, it is not preferable to decrease (make the decreasing correction on) the base fuel injection amount Fbase, for the catalyst 43. However, for example, when the main feedback amount DFmain becomes a "value which corrects the base fuel injection amount Fbase such that the base fuel injection amount Fbase is decreased" due to the transient fluctuation of the air-fuel ratio, there may be a case in which the air-fuel ratio correction amount (DFmain+DFsub) becomes a value which decreases the base fuel injection amount Fbase.

In view of the above, as described in (E1) above, the first control apparatus decreases the main feedback amount DFmain (i.e., decreases the magnitude of the main feedback amount DFmain) or sets the main feedback amount DFmain to (at) 0, if the main feedback amount DFmain is the "value which decreases the base fuel injection amount Fbase", when the output value Voxs of the downstream air-fuel ratio sensor 56 is decreasing (that is, when the required air-fuel ratio of the catalyst inflow gas is the "air-fuel ratio richer than the stoichiometric air-fuel ratio").

According to the above configuration, the state can be avoided in which "the main feedback amount DFmain decreases the base fuel injection amount Fbase too excessively, and thus, a gas whose air-fuel ratio is different from the required air-fuel ratio of the catalyst inflow gas (in this case, the lean air-fuel ratio gas) is flowed into the catalyst".

Similarly, when the output value Voxs of the downstream air-fuel ratio sensor 56 is increasing, the oxygen storage amount OSA is no longer in the vicinity of the maximum oxygen storage amount Cmax, but rather is approaching "0". Accordingly, the required air-fuel ratio of the catalyst inflow gas is the "air-fuel ratio leaner than the stoichiometric air-fuel ratio". Thus, in this case, it is not preferable to increase (make the increasing correction on) the base fuel injection amount Fbase, for the catalyst 43. However, for example, when the main feedback amount DFmain becomes a "value which corrects the base fuel injection amount Fbase such that the base fuel injection amount Fbase is greatly increased" due to the "transient fluctuation of the air-fuel ratio supplied to the engine", there may be a case in which the air-fuel ratio correction amount (DFmain+DFsub) becomes a "value which increases the base fuel injection amount Fbase".

In view of the above, as described in (E2) above, the first control apparatus decreases the main feedback amount DFmain (i.e., decreases the magnitude of the main feedback amount DFmain) or sets the main feedback amount DFmain to (at) 0, if the main feedback amount DFmain is the "value which increases the base fuel injection amount Fbase", when the output value Voxs of the downstream air-fuel ratio sensor 56 is increasing (that is, when the required air-fuel ratio of the catalyst inflow gas is the "air-fuel ratio leaner than the stoichiometric air-fuel ratio").

According to the above configuration, the state can be avoide in which "the main feedback amount DFmain increases the base fuel injection amount Fbase too excessively, and thus, a gas whose air-fuel ratio is different from the required air-fuel ratio of the catalyst inflow gas (in this case, the rich air-fuel ratio gas richer than the stoichiometric air-fuel ratio) is flowed into the catalyst".

Further, the air-fuel ratio control means of the first control apparatus includes "stoichiometric upper limit value obtaining means", for controlling the "air-fuel ratio of the catalyst inflow gas" in such a manner that the "air-fuel ratio of the catalyst inflow gas" is set to(at) a "predetermined lean air-fuel ratio leaner than the stoichiometric air-fuel ratio" when the output value Voxs of the downstream air-fuel ratio sensor 56 is equal to the maximum output value Vmax (refer to, step 2430 and step 2440 in FIG. 24, and step 1220, step 1225, and step 1250 in FIG. 12), and for obtaining thereafter, as the "first threshold (stoichiometric-upper-limit-value VHilimit)", the "output value Voxs of the downstream air-fuel ratio sensor 56" at the "point in time when the magnitude |ΔVoxs| of the change rate of the output value Voxs of the downstream air-fuel ratio sensor 56 becomes smallest" in the period from the point in time at which the air-fuel ratio of the catalyst inflow gas is set to (at) the predetermined lean air-fuel ratio to the point in time when the output value Voxs of the downstream air-fuel ratio sensor 56 reaches the "minimum output value Vmin" or the "value obtained by adding the predetermined value δ2 to the minimum output value Vmin" (refer to the routine shown in FIG. 25, especially, steps from step 2530 to step 2550).

According to this configuration, the output value Voxs of the downstream air-fuel ratio sensor 56 when the catalyst 43 is in a "state in which the catalyst 43 is rapidly storing/absorbing the oxygen included in the catalyst inflow gas" can be obtained as the "first threshold (VHilimit)".

It should be noted that the first control apparatus may detect a temperature of the downstream air-fuel ratio sensor 56 or estimate, based on a temperature of the exhaust gas, the temperature of the downstream air-fuel ratio sensor 56, and may estimate the first threshold (VHilimit) based on the temperature of the downstream air-fuel ratio sensor 56 and a "relationship between the temperature of the downstream air-fuel ratio sensor 56 and the first threshold (VHilimit)" which was obtained in advance.

Further, the air-fuel ratio control means of the first control apparatus includes "stoichiometric lower limit value obtaining means", for controlling the "air-fuel ratio of the catalyst inflow gas" in such a manner that the "air-fuel ratio of the catalyst inflow gas" is set to(at) a "predetermined rich air-fuel ratio richer than the stoichiometric air-fuel ratio" when the output value Voxs of the downstream air-fuel ratio sensor 56 is equal to the minimum output value Vmin (refer to, step 2230 and step 2240 in FIG. 22, and step 1210, step 1215, and step 1230 in FIG. 12), and for obtaining thereafter, as the "second threshold (stoichiometric-lower-limit-value VLolimit)", the "output value Voxs of the downstream air-fuel ratio sensor 56" at the "point in time when the magnitude |ΔVoxs| of the change rate of the output value Voxs of the downstream air-fuel ratio sensor 56 becomes smallest" in the period from the point in time at which the air-fuel ratio of the catalyst inflow gas is set to (at) the predetermined rich air-fuel ratio to the point in time when the output value Voxs of the downstream air-fuel ratio sensor 56 reaches the "maximum output value Vmax" or the "value obtained by subtracting the predetermined value δ1 from the maximum output value Vmax" (refer to the routine shown in FIG. 23, especially, steps from step 2330 to step 2350).

According to this configuration, the output value Voxs of the downstream air-fuel ratio sensor 56 when the catalyst 43 is in a "state in which the catalyst 43 is rapidly releasing the oxygen" can be obtained as the "second threshold (VLolimit) ".

It should be noted that the first control apparatus may detect the temperature of the downstream air-fuel ratio sensor 56 or estimate, based on a temperature of the exhaust gas, the temperature of the downstream air-fuel ratio sensor 56, and may estimate the second threshold (VLolimit) based on the temperature of the downstream air-fuel ratio sensor 56 and a "relationship between the temperature of the downstream air-fuel ratio sensor 56 and the second threshold (VLolimit)" which was obtained in advanve.

2. Second Embodiment

Next will be described an air-fuel ratio control apparatus according to a second embodiment of the present invention (hereinafter, referred to as a "second control apparatus"). The second control apparatus is different from the first control apparatus only in that the second control apparatus changes (varies) the target downstream-side value Voxsref in accordance with any one of the states of the catalyst, including the "state in which the oxygen is short (catalyst rich state)", the "state in which the oxygen is excessive (catalyst lean state)", and the "state in which the oxygen is neither short nor excessive". Accordingly, hereinafter, the difference will be mainly described.

<Determination of the State of the Catalyst>

Figure 26:
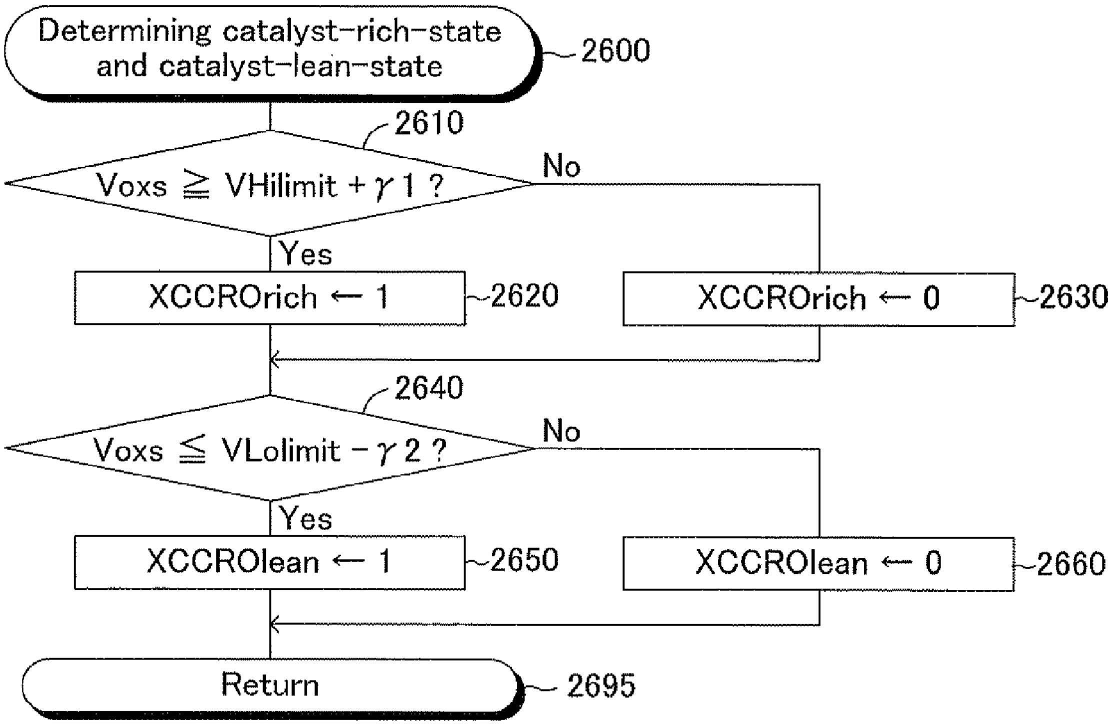
FIG. 26 is a flowchart showing a routine, executed by a CPU of an air-fuel ratio control apparatus for the internal combustion engine (second control apparatus) according to a second embodiment of the present invention, for determining/detecting a catalyst-rich-state and a catalyst-lean-state.
Figure 27:
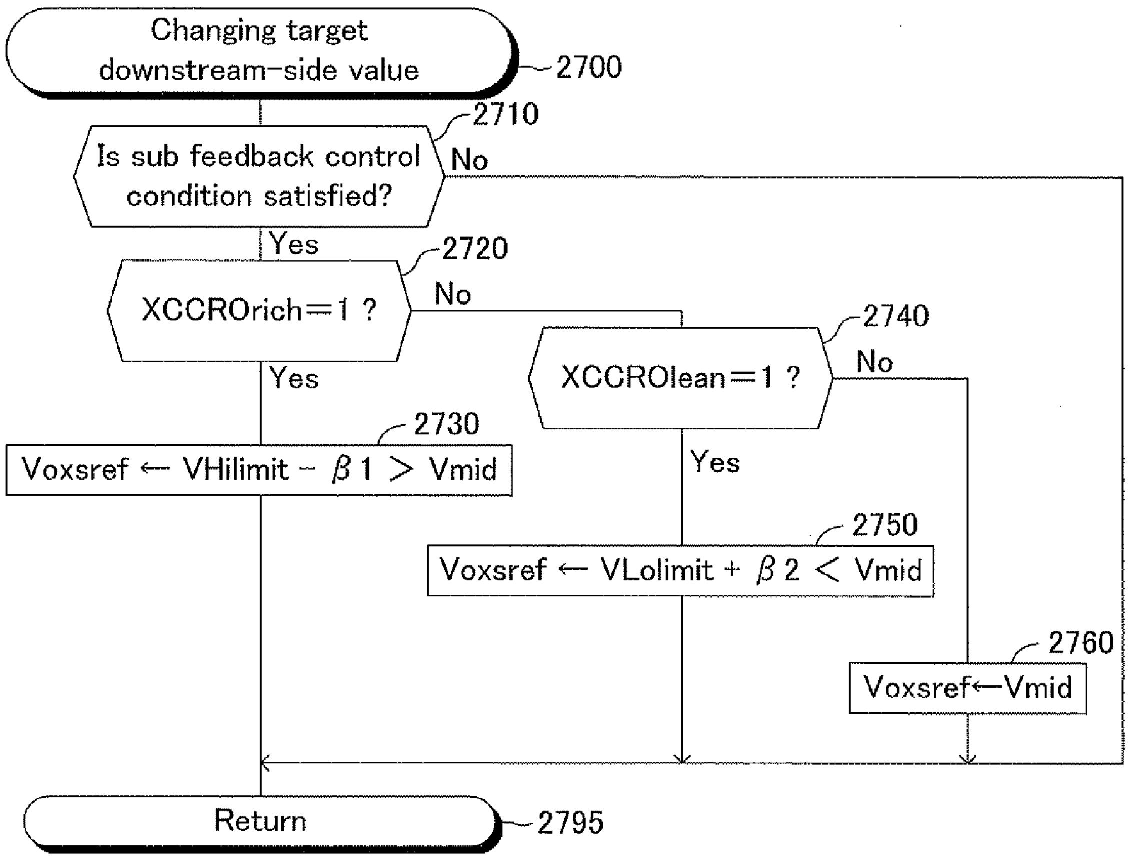
FIG. 27 is a flowchart showing a routine, executed by the CPU of the second control apparatus, for changing a target value (target downstream-side value) of the proportional term of the sub feedback amount.

A CPU of the second control apparatus further executes a "routine for determining a catalyst-rich-state and a catalyst-lean-state" shown by a flowchart in FIG. 26, and a "routine for changing the target downstream-side value" shown by a flowchart in FIG. 27, every time a predetermined time period elapses, in addition to the routines that the CPU of the first control apparatus executes.

Accordingly, at an appropriate predetermined timing, the CPU starts the process from step 2600 shown in FIG. 26 to proceed to step 2610 at which the CPU determines whether or not the output value Voxs of the downstream air-fuel ratio sensor 56 is larger than or equal to a "value (VHilimit+γ/1) obtained by adding a "minute value γ1 larger than or equal to 0" to the stoichiometric-upper-limit-value VHilimit". The value (VHilimit+γ1) is smaller than equal to the maximum output value Vmax, and is larger than or equal to the stoichiometric-upper-limit-value VHilimit. Therefore, the value (VHilimit+γ1) may be equal to the maximum output value Vmax or the stoichiometric-upper-limit-value VHilimit. It should be noted the value (VHilimit+γ1) is set at (to) the value (Vmax−α1) within the predetermined range including the first threshold, in the present example.

When the oxygen storage amount OSA of the catalyst 43 is substantially equal to "0" (that is, the catalyst 43 is in the state in which the oxygen is short), the oxygen is no longer included in the catalyst outflow gas, and therefore, the output value Voxs becomes larger than or equal to the value (VHilimit+γ1). Accordingly, when the output value Voxs is larger than or equal to the value (VHilimit+γ1), the CPU makes a "Yes" determination at step 2610 to proceed to step 2620 at which the CPU sets a value of a catalyst-rich-state flag (oxygen-short-state flag) XCCROrich to (at) "1". Thereafter, the CPU proceeds to step 2640. In contrast, when the output value Voxs is smaller than the value (VHilimit+γ1), the CPU makes a "No" determination at step 2610 to proceed to step 2630 at which the CPU sets the value of a catalyst-rich-state flag XCCROrich to (at) "0". Thereafter, the CPU proceeds to step 2640.

When the CPU proceeds to step 2640, the CPU determines whether or not the output value Voxs of the downstream air-fuel ratio sensor 56 is smaller than or equal to a "value (VLolimit−γ2) obtained by subtracting a "minute value γ2 larger than or equal to 0" from the stoichiometric-lower-limit-value VLolimit". The value (VLolimit−γ2) is larger than equal to the minimum output value Vmin, and is smaller than or equal to the stoichiometric-lower-limit-value VLolimit. Therefore, the value (VLolimit−γ2) may be equal to the minimum output value Vmin or the stoichiometric-lower-limit-value VLolimit. It should be noted the value (VLolimit−γ2) is set at (to) the value (Vmin+α2) within the predetermined range including the second threshold, in the present example.

When the oxygen storage amount OSA of the catalyst 43 is substantially equal to the maximum oxygen storage amount Cmax(that is, the catalyst 43 is in the state in which the oxygen is excessive), the unburnt substances are no longer included in the catalyst outflow gas, and therefore, the output value Voxs becomes smaller than or equal to the value (VLolimit−γ2). Accordingly, when the output value Voxs is smaller than or equal to the value (VLolimit−γ2), the CPU makes a "Yes" determination at step 2640 to proceed to step 2650 at which the CPU sets a value of a catalyst-lean-state flag (oxygen-excessive-state flag) XCCROlean to (at) "1". Thereafter, the CPU proceeds to step 2695 to end the present routine tentatively. In contrast, when the output value Voxs is larger than the value (VLolimit−γ2), the CPU makes a "No" determination at step 2640 to proceed to step 2660 at which the CPU sets the value of a catalyst-lean-state flag XCCROlean to (at) "0". Thereafter, the CPU proceeds to 2695 to end the present routine tentatively.

As described above, the CPU determines the state of the catalyst 43 based on the output value Voxs of the downstream air-fuel ratio sensor 56 (not the magnitude |ΔVoxs| of the change rate, but the magnitude of the output value Voxs itself), and changes the value of the catalyst-rich-state flag XCCROrich and the value of the catalyst-lean-state flag XCCROlean.

<Changing the Target Downstream-Side Value (Target Value for the Proportional Term of the Sub Feedback Amount)>

As described above, the CPU executes the routine shown in FIG. 27, every time a predetermined time period elapses. Accordingly, at an appropriate predetermined timing, the CPU starts the process from step 2700 to proceed to step 2710 at which the CPU determines whether or not the sub feedback control condition described above is satisfied (refer to step 1710 in FIG. 17). When the sub feedback control condition is not satisfied, the CPU makes a "No" determination at step 2710 to directly proceed to step 2795 to end the present routine tentatively.

In contrast, when the sub feedback control condition is satisfied, the CPU makes a "Yes" determination at step 2710 to proceed to step 2720, at which the CPU determines whether or not the value of the catalyst-rich-state flag XCCROrich is equal to "1".

When the value of the catalyst-rich-state flag XCCROrich is equal to "1", the CPU makes a "Yes" determination at step 2720 to proceed to step 2730, at which the CPU sets the target downstream-side value Voxsref to (at) a "value (VHilimit−δ1) obtained by subtracting a predetermined positive value δ1 from the stoichiometric-upper-limit-value VHilimit". It should be noted that the predetermined value β1 is set at a minute value such that the value (VHilimit−β1) is always larger than the middle value Vmid. Thereafter, the CPU proceeds to step 2795 to end the present routine tentatively.

Figure 28:
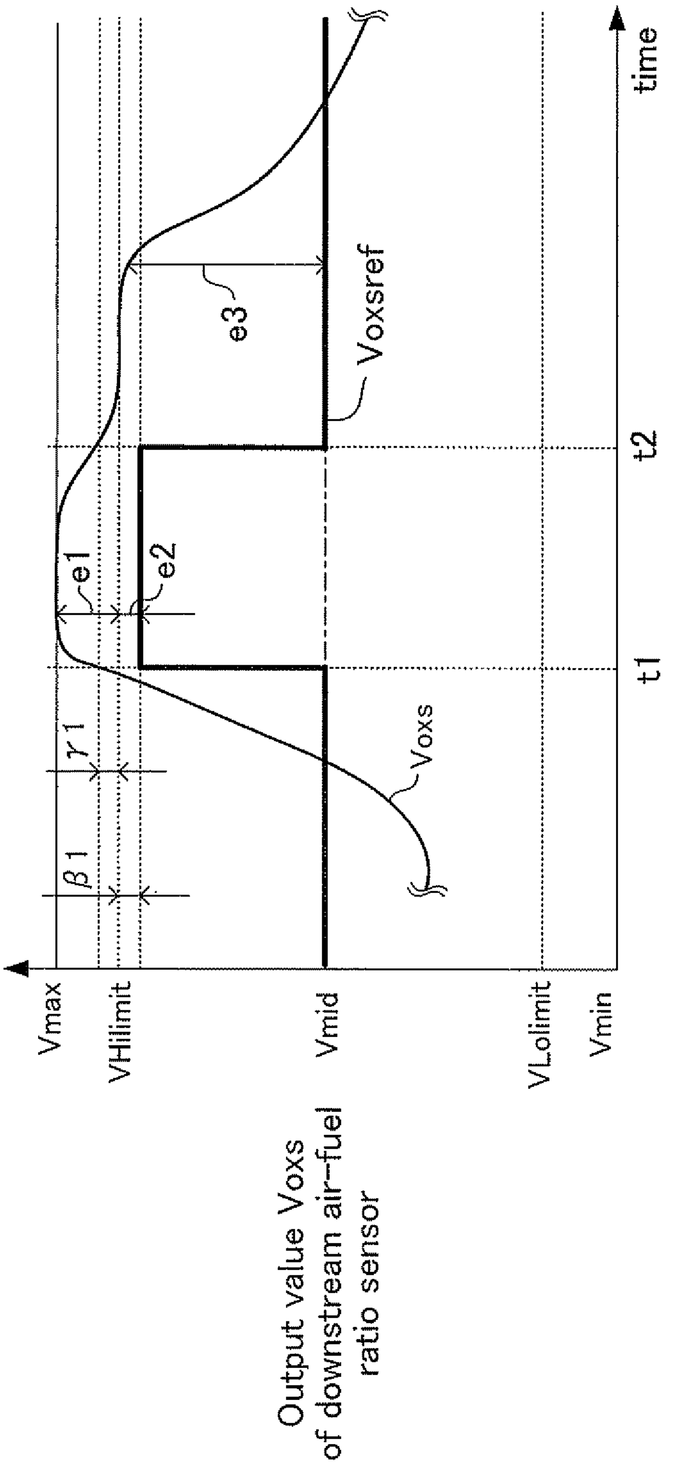
FIG. 28 is a timing chart showing a change in a target downstream-side value in the second control apparatus.

In this manner, when the value of the catalyst-rich-state flag XCCROrich is equal to "1", that is, when the oxygen storage amount OSA of the catalyst 43 is substantially equal to "0" and the state of the catalyst 43 is the state in which the oxygen is short, the target downstream-side value Voxsref is set to (at) the value (VHilimit−β1) which is slightly smaller than the stoichiometric-upper-limit-value VHilimit and larger than the middle value Vmid (refer to a period from the time t1 to the time t2 shown in FIG. 28). The value (VHilimit−β1) is also referred to as a first target value.

In contrast, when the CPU proceeds to step 2720, and if the value of the catalyst-rich-state flag XCCROrich is equal to "0", the CPU makes a "No" determination at step 2720 to proceed to step 2740, at which the CPU determines whether or not the value of the catalyst-lean-state flag XCCROlean is equal to "1".

When the value of the catalyst-lean-state flag XCCROlean is equal to "1", the CPU makes a "Yes" determination at step 2740 to proceed to step 2750, at which the CPU sets the target downstream-side value Voxsref to (at) a "value (VLolimit+β2) obtained by adding a predetermined positive value β2 to the stoichiometric-lower-limit-value VLolimit". It should be noted that the predetermined value β2 is set at a minute value such that the value (VLolimit+β2) is always smaller than the middle value Vmid. Thereafter, the CPU proceeds to step 2795 to end the present routine tentatively. The value (VLolimit+$\beta$2) is also referred to as a second target value.

Figure 29:
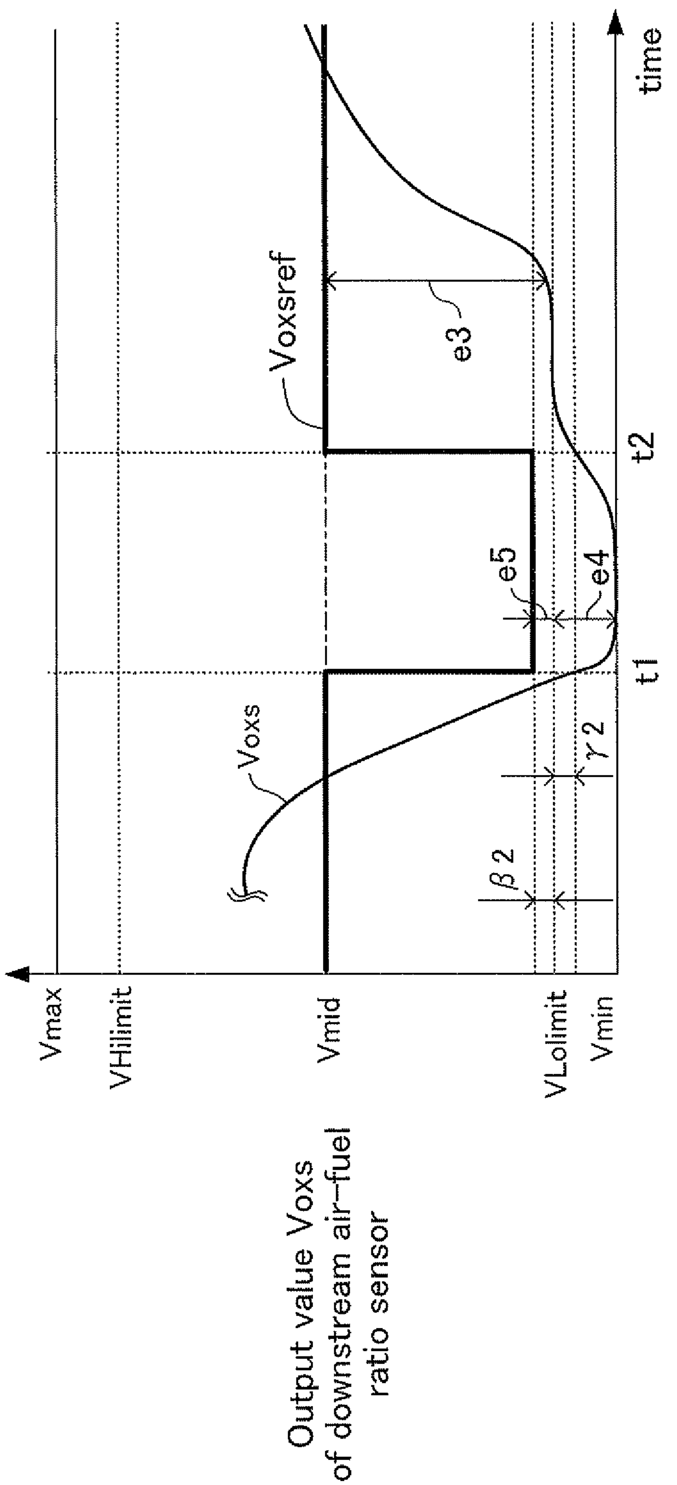
FIG. 29 is a timing chart showing a change in a target downstream-side value in the second control apparatus.

In this manner, when the value of the catalyst-lean-state flag XCCROlean is equal to "1", that is, when the oxygen storage amount OSA of the catalyst 43 is substantially equal to the maximum oxygen storage amount Cmaxand the state of the catalyst 43 is the state in which the oxygen is excessive, the target downstream-side value Voxsref is set to (at) the value (VLolimit+$\beta$2) which is slightly larger than the stoichiometric-lower-limit-value VLolimit and smaller than the middle value Vmid (refer to a period from the time t1 to the time t2 shown in FIG. 29).

In contrast, when the CPU proceeds to step 2740, and if the value of the catalyst-lean-state flag XCCROlean is equal to "0", the CPU makes a "No" determination at step 2740 to proceed to step 2760, at which the CPU sets the target downstream-side value Voxsref to (at) a "third target value (in the present example, the middle value Vmid) which is between the first target value and the second target value". Thereafter, the CPU proceeds to step 2795 to end the present routine tentatively.

In this manner, when both of the value of the catalyst-rich-state flag XCCROrich and the value of the catalyst-lean-state flag XCCROlean are equal to "0", the target downstream-side value Voxsref is set to (at) the middle value Vmid (refer to a period before the time t1 or a period after the time t2 in FIG. 28, and a period before the time t1 or a period after the time t2 in FIG. 29).

As described above, the second control apparatus comprises proportional term calculating means for calculating the proportional term SP of the sub feedback amount DFsub (refer to the routines shown in FIGS. 18, 26, and 27).

The proportional term calculating means (C1) sets the target value Voxsref to (at) the "value (=first target value, i.e., (VHilimit−$\beta$1)) which is between the first threshold and the middle value Vmid", when the output value Voxs of the downstream air-fuel ratio sensor 56 is larger than the value (i.e., VHilimit+$\gamma$1, and referred to as a third threshold) within the predetermined range including the first threshold (refer to, step 2610 and step 2620 in FIG. 26, and step 2720 and step 2730 in FIG. 27).

According to this configuration described above, when the output value Voxs of the downstream air-fuel ratio sensor 56 is larger than the value (VHilimit+$\gamma$1) within the predetermined range including the first threshold, the target value Voxsref is set to (at) the "value (i.e., the first target value (VHilimit−$\beta$1)) between the first threshold and the middle value". Therefore, a "magnitude of a difference between the first threshold and the target value (first target value) (that is, the magnitude of the error (Voxsref−VHilimit) which is to be multiplied by the first gain KpS1)" does not become excessively large. Accordingly, the proportional term SP can be set to (at) a "value which is necessary to have the output value Voxs of the downstream air-fuel ratio sensor 56 shift to a value smaller than or equal to the first threshold (in actuality, the stoichiometric-upper-limit-value VHilimit), but is not excessively large".

Further, the proportional term calculating means (C2) sets the target value Voxsref to (at) the "value which is a second target value (VLolimit+$\beta$2) which is between the second threshold and the middle value Vmid", when the output value Voxs of the downstream air-fuel ratio sensor 56 is smaller than the value (i.e., VLolimit−$\gamma$2, and referred to as a fourth threshold) within the predetermined range including the second threshold (refer to, step 2640 and step 2650 in FIG. 26, and step 2740 and step 2750 in FIG. 27).

According to this configuration described above, when the output value Voxs of the downstream air-fuel ratio sensor 56 is smaller than the value (VLolimit−$\gamma$2) within the predetermined range including the second threshold, the target value Voxsref is set to (at) the "value (i.e., the second target value (VLolimit+$\beta$2)) between the second threshold and the middle value". Therefore, a "magnitude of a difference between the second threshold and the target value (second target value) (that is, the magnitude of the error (Voxsref−VLolimit) which is to be multiplied by the second gain KpS2)" does not become excessively large. Accordingly, the proportional term SP can be set to (at) a "value which is necessary to have the output value Voxs of the downstream air-fuel ratio sensor 56 shift to a value larger than or equal to the second threshold (in actuality, the stoichiometric-lower-limit-value VLolimit), but is not excessively large".

Furthermore, the proportional term calculating means (C3) sets the target value Voxsref to (at) the "third target value (in the present example, the middle value)" which is the "value between the first target value and the second target value", when the output value Voxs of the downstream air-fuel ratio sensor 56 is between the value (VHilimit+$\gamma$1) within the predetermined range including the first threshold and the value (VLolimit−$\gamma$2) within the predetermined range including the second threshold (refer to step 2720, step 2740, and step 2760).

According to this configuration described above, when the output value Voxs of the downstream air-fuel ratio sensor 56 is between the value within the predetermined range including the first threshold and the value within the predetermined range including the second threshold, the target value Voxsref is set to (at) the middle value Vmid. Therefore, the proportional term SP can be set to (at) a "value which is appropriate to maintain the output value Voxs of the downstream air-fuel ratio sensor 56 between the first threshold and the second threshold".

3. Third Embodiment

Next will be described an air-fuel ratio control apparatus according to a third embodiment of the present invention (hereinafter, referred to as a "third control apparatus"). The third control apparatus is different from the first control apparatus and the second control apparatus only in that the second control apparatus sets the main feedback amount DFmain to (at) 0 when the main feedback amount DFmain is a value which increases the bases fuel injection amount Fbase in a case in which the state of the catalyst 43 is "the state in which the oxygen is short", and the second control apparatus sets the main feedback amount DFmain to (at) 0 when the main feedback amount DFmain is a value which decreases the bases fuel injection amount Fbase in a case in which the state of the catalyst 43 is "the state in which the oxygen is excessive". Accordingly, hereinafter, these differences will be mainly described.

<Determination of the State of the Catalyst>

A CPU of the third control apparatus, similarly to the CPU of the second control apparatus, further executes the "routine for determining a catalyst-rich-state and a catalyst-lean-state" shown by the flowchart in FIG. 26, every time a predetermined time period elapses, in addition to the routines that the CPU of the first control apparatus executes. Accordingly, when the output value Voxs of the downstream air-fuel ratio sensor 56 is larger than the first threshold (VHilimit+$\gamma$1), the CPU of the third control apparatus determines that the state of the catalyst 43 is "the state in which the oxygen is short", and thus, sets the value of the catalyst-rich-state flag XCCROrich to (at) “1”. Further, when the output value Voxs of the downstream air-fuel ratio sensor 56 is smaller than the second threshold (VLolimit−γ2), the CPU of the third control apparatus determines that the state of the catalyst 43 is the state in which the oxygen is excessive, and thus, sets the value of the catalyst-lean-state flag XCCROlean to (at) “1”.

<Correcting (Limiting) the Main Feedback Amount DFmain>

Figure 30:
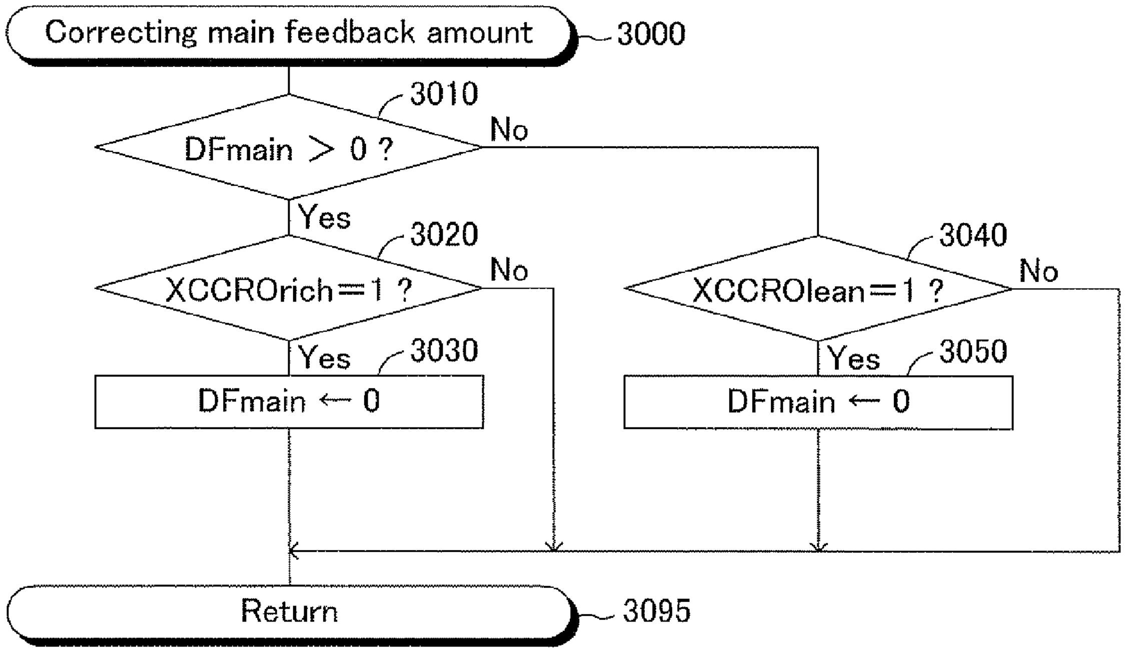
FIG. 30 is a flowchart showing a routine, executed by a CPU of an air-fuel ratio control apparatus for the internal combustion engine (third control apparatus) according to a third embodiment of the present invention, for correcting the main feedback amount.

In addition, the CPU of the third control apparatus executes a “routine for correcting the main feedback amount” shown by a flowchart in FIG. 30, every time a predetermined time period elapses.

Accordingly, at an appropriate predetermined timing, the CPU starts the process from step 3000 shown in FIG. 30 to proceed to step 3010 at which the CPU determines whether or not the main feedback amount DFmain is larger than “0”. In other words, the CPU determines whether or not the main feedback amount DFmain is a “value which shifts the air-fuel ratio of the catalyst inflow gas (=air-fuel ratio of the engine) toward the rich air-fuel ratio” at step 3010.

When the main feedback amount DFmain is larger than “0”, the CPU makes a “Yes” determination at step 3010 to proceed to step 3020, at which the CPU determines whether or not the value of the catalyst-rich-state flag XCCROrich is equal to “1”.

When the value of the catalyst-rich-state flag XCCROrich is equal to “1”, the CPU makes a “Yes” determination at step 3020 to proceed to step 3030, at which the CPU sets the main feedback amount DFmain to (at) “0”. Accordingly, the main feedback amount DFmain becomes a value which makes neither the increasing correction on the base fuel injection amount Fbase nor the decreasing correction on the base fuel injection amount Fbase. Thereafter, the CPU proceeds to step 3095 to end the present routine tentatively.

In contrast, when the CPU proceeds to step 3020, and when the value of the catalyst-rich-state flag XCCROrich is equal to “0”, the CPU makes a “No” determination at step 3020 to directly proceed to step 3095 to end the present routine tentatively.

On the other hand, when the CPU proceeds to step 3010, and when the main feedback amount DFmain is smaller than or equal to “0”, the CPU makes a “No” determination at step 3010 to proceed to step 3040, at which the CPU determines whether or not the value of the catalyst-lean-state flag XCCROlean is equal to “1”.

When the value of the catalyst-lean-state flag XCCROlean is equal to “1”, the CPU makes a “Yes” determination at step 3040 to proceed to step 3050, at which the CPU sets the main feedback amount DFmain to (at) “0”. Accordingly, the main feedback amount DFmain becomes the value which makes neither the increasing correction on the base fuel injection amount Fbase nor the decreasing correction on the base fuel injection amount Fbase. Thereafter, the CPU proceeds to step 3095 to end the present routine tentatively.

In contrast, when the CPU proceeds to step 3040, and when the value of the catalyst-lean-state flag XCCROlean is equal to “0”, the CPU makes a “No” determination at step 3040 to directly proceed to step 3095 to end the present routine tentatively.

As described above, the main feedback amount calculating means of the third control apparatus is configured so as to:

set the main feedback amount DFmain at (to) 0, if the main feedback amount DFmain is the value which increases the base fuel injection amount Fbase when the output value Voxs of the downstream air-fuel ratio sensor 56 is larger than the value (VHilimit+γ1) within the predetermined range including the first threshold (refer to steps from step 3010 to step 3030, in FIG. 30), and set the main feedback amount DFmain at (to) 0, if the main feedback amount DFmain is the value which decreases the base fuel injection amount Fbase when the output value Voxs of the downstream air-fuel ratio sensor 56 is smaller than the value (VLolimit−γ2) within the predetermined range including the second threshold (refer to step 3010, step 3040, and step 3050, in FIG. 30).

As described above, when the output value Voxs of the downstream air-fuel ratio sensor 56 is larger than the value (VHilimit+γ1) within the predetermined range including the first threshold, the oxygen storage amount OSA is equal to “0” or is substantially equal to “0”. Accordingly, the required air-fuel ratio of the catalyst inflow gas is in a lean side with respect to the stoichiometric air-fuel ratio, and thus, it is not preferable for the main feedback amount DFmain to increase (or make the increasing correction on) the base fuel injection amount Fbase, for the catalyst 43. In view of the above, the third control apparatus sets the main feedback amount DFmain to (at) 0 in such a case. Consequently, a state can be avoided in which the main feedback amount DFmain operates to supply a gas whose air-fuel ratio is unfavorable to the catalyst 43".

Similarly, when the output value Voxs of the downstream air-fuel ratio sensor 56 is smaller than the value (VLolimit−γ2) within the predetermined range including the second threshold, the oxygen storage amount OSA of the catalyst is equal to the maximum oxygen storage amount Cmaxor is substantially equal to the maximum oxygen storage amount Cmax. Accordingly, the required air-fuel ratio of the catalyst inflow gas is in a rich side with respect to the stoichiometric air-fuel ratio, and thus, it is not preferable for the main feedback amount DFmain to decrease (or make the decreasing correction on) the base fuel injection amount Fbase, for the catalyst 43. In view of the above, the third control apparatus sets the main feedback amount DFmain to (at) 0 in such a case. Consequently, a state can be avoided in which the main feedback amount DFmain operates to supply a gas whose air-fuel ratio is unfavorable to the catalyst 43".

4. Fourth Embodiment

Next will be described an air-fuel ratio control apparatus according to a fourth embodiment of the present invention (hereinafter, referred to as a “fourth control apparatus”). The fourth control apparatus is different from any one of the first, second, and third control apparatuses in that the fourth control apparatus performs a catalyst poisoning countermeasure control. Accordingly, hereinafter, the difference will be mainly described.

When a catalyst-rich-poisoning (catalyst-rich-poisoning or catalyst-lean-poisoning) occurs, the maximum oxygen storage amount Cmaxdecreases, and thus, the efficiency of purifying emissions of the catalyst lowers.

The catalyst-rich-poisoning of the catalyst 43 occurs in a case in which HC adheres (attaches) to circumferences of the precious metals supported by the catalyst 43, when a state continues for a relatively long time in which the “air-fuel ratio of the catalyst inflow gas” is richer than the stoichiometric air-fuel ratio. This catalyst-rich-poisoning decreases the efficiency of purifying emissions of the catalyst 43. The catalyst-rich-poisoning can be eliminated by supplying a gas “whose air-fuel ratio greatly deviates toward leaner side from the stoichiometric air-fuel ratio” to the catalyst 43 for (over) a predetermined time period.

The catalyst-lean-poisoning of the catalyst 43 occurs in a case in which the precious metals supported by the catalyst 43 become oxidized so that a superficial area of each of the precious metals substantially decreases, when a state continues for a relatively long time in which the "air-fuel ratio of the catalyst inflow gas" is leaner than the stoichiometric air-fuel ratio. This catalyst-lean-poisoning also decreases the efficiency of purifying emissions of the catalyst 43. The catalyst-lean-poisoning can be eliminated by supplying a gas "whose air-fuel ratio greatly deviates toward richer side from the stoichiometric air-fuel ratio" to the catalyst 43 for (over) a predetermined time period.

<Catalyst Poisoning Countermeasure Control (Catalyst Capability Restoring Control)>

Figure 31:
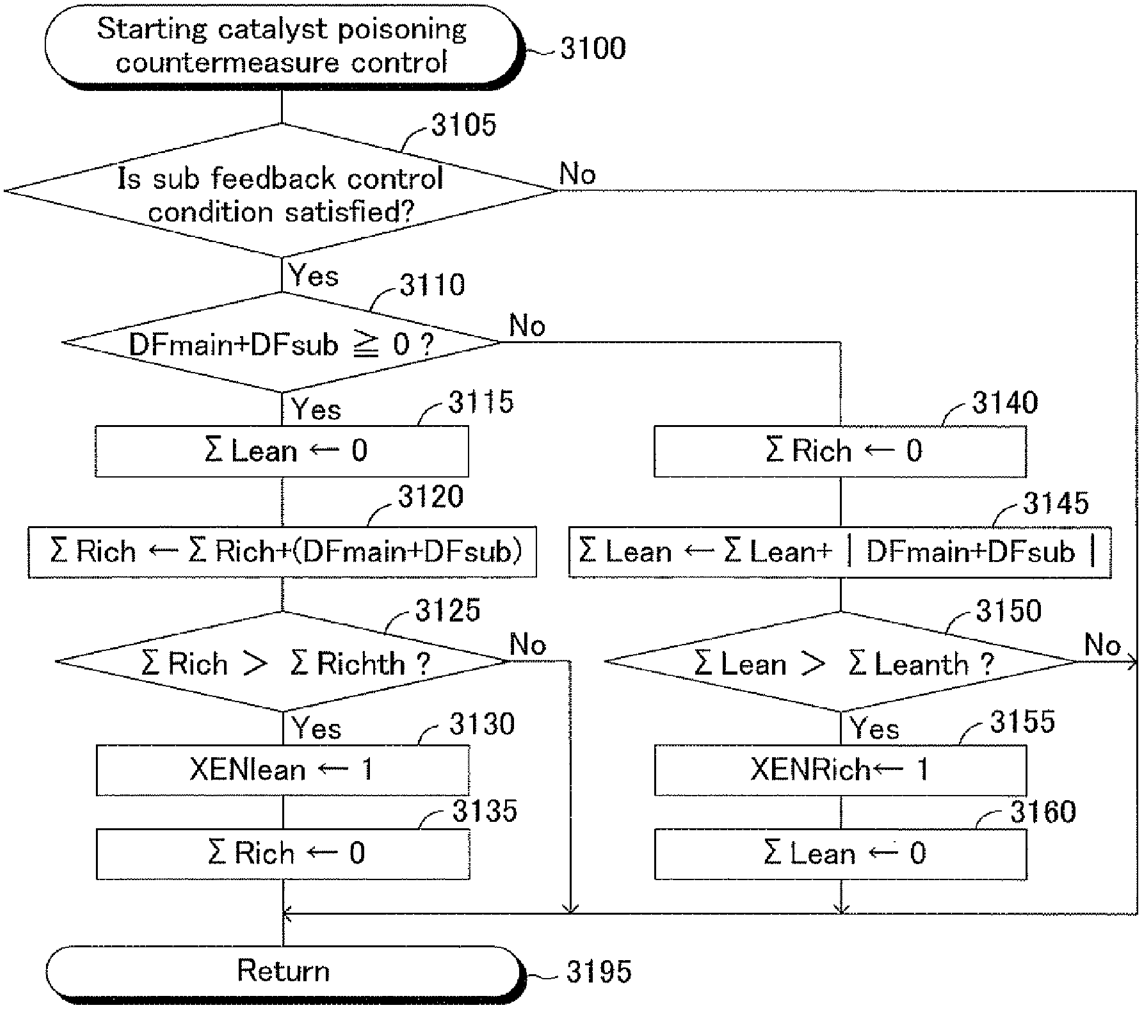
FIG. 31 is a flowchart showing a routine, executed by a CPU of an air-fuel ratio control apparatus for the internal combustion engine (fourth control apparatus) according to a fourth embodiment of the present invention, for starting/performing a catalyst poisoning countermeasure control.
Figure 32:
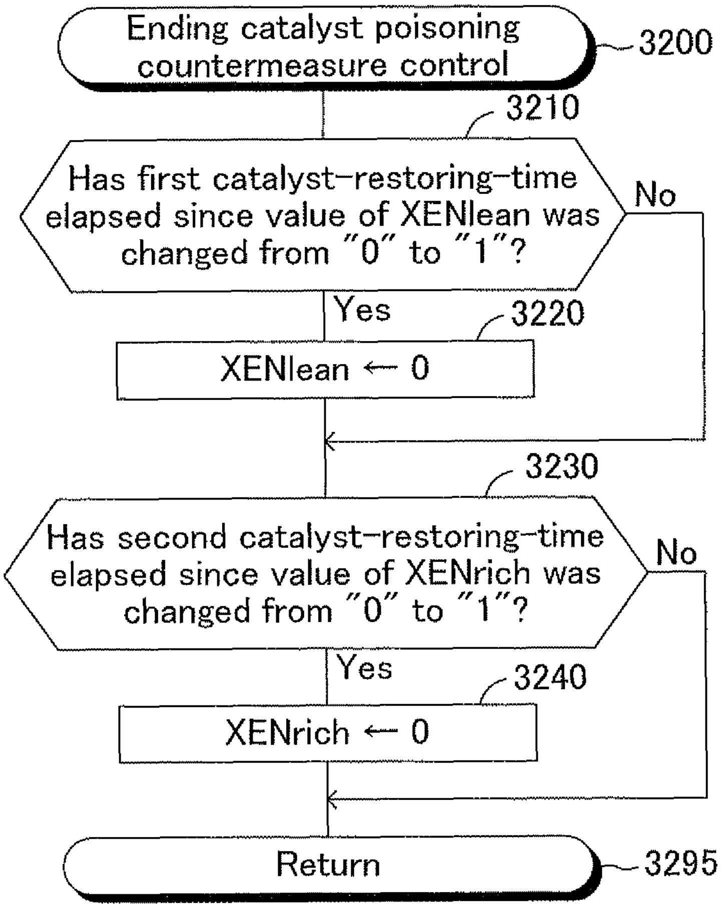
FIG. 32 is a flowchart showing a routine, executed by the CPU of the fourth control apparatus, for ending (terminating) the catalyst poisoning countermeasure control.

In actuality, a CPU of the fourth control apparatus executes a "routine for starting the catalyst poisoning countermeasure control" shown by a flowchart in FIG. 31 every time a predetermined time period elapses, and executes a "routine for ending (terminating, completing) the catalyst poisoning countermeasure control" shown by a flowchart in FIG. 32 every time a predetermined time period elapses.

Accordingly, at an appropriate predetermined timing, the CPU starts the process from step 3100 shown in FIG. 31 to proceed to step 3105 at which the CPU determines whether or not the sub feedback control condition described above is satisfied. It should be noted that the sub feedback control condition whose satisfaction is determined at step 3105 further includes conditions that "both a value of an enforced lean flag XENlean described later and a value of an enforced rich flag XENrich described later are not equal to "1"", in addition to the conditions (conditions described in (B1) to (B3) above) in step 1710 shown in FIG. 17. Both the enforced lean flag XENlean and the enforced rich flag XENrich are set to (at) "0" in the initialization routine described above.

It is assumed here that the sub feedback control condition is not satisfied. In this case, the CPU makes a "No" determination at step 3105 to directly proceed to step 3195 to end the present routine tentatively.

In contrast, when the sub feedback control condition becomes satisfied, the CPU makes a "Yes" determination at step 3105 to proceed to step 3110, at which the CPU determines whether or not the air-fuel correction amount (DFmain+DFsub) which is a sum of the main feedback amount DFmain and the sub feedback amount DFsub is larger than or equal to "0". In other words, the CPU determines whether or not the air-fuel correction amount (DFmain+DFsub) is a value which increases the base fuel injection amount Fbase (that is, value which shifts the air-fuel ratio of the catalyst inflow gas (=air-fuel ratio of the engine) to the rich air-fuel ratio) at step 3110.

When the air-fuel correction amount (DFmain+DFsub) is smaller than "0", the CPU makes a "No" determination at step 3110 to proceed to step 3140, at which the CPU sets an increasing correction integrated value 1, Rich to (at) "0". Thereafter, the CPU executes processes from step 3145, which will be described later.

The description continues assuming that the air-fuel correction amount (DFmain+DFsub) is larger than or equal to "0". In this case, the CPU makes a "Yes" determination at step 3110 to proceed to step 3115, at which the CPU sets a decreasing correction integrated value ΣLean to (at) "0".

Subsequently, the CPU proceeds to step 3120 to obtain, as the "increasing correction integrated value ΣRich", an integrated value of the air-fuel correction amount (DFmain+DFsub). That is, the CPU updates the increasing correction integrated value ΣRich by adding the "air-fuel correction amount (DFmain+DFsub) at the present time" to the "increasing correction integrated value ΣRich at the present time", according to a formula (14) described below. It should be noted that the ΣRich(n+1) is an updated increasing correction integrated value ΣRich, and ΣRich(n) is an increasing correction integrated value ΣRich before updated, in formula (14).

$$\Sigma\mathrm{Rich}(n+1)=\Sigma\mathrm{Rich}(n)+(DF\mathrm{main}+DF\mathrm{sub}) \quad (14)$$

As described above, when the air-fuel correction amount (DFmain+DFsub) is smaller than "0", the increasing correction integrated value ΣRich is set to (at) "0" at step 3140. Accordingly, the increasing correction integrated value ΣRich becomes an integrated value of the air-fuel correction amount (DFmain+DFsub) in a period in which the air-fuel correction amount (DFmain+DFsub) continues to be larger than or equal to "0". Further, the air-fuel correction amount (DFmain+DFsub) is a value which is added to the base fuel injection amount Fbase, and therefore, the increasing correction integrated value ΣRich becomes an integrated value of an "amount (increasing amount) by which the base fuel injection amount Fbase is increased by the air-fuel correction amount (DFmain+DFsub)".

Subsequently, the CPU proceeds to step 3125 to determine whether or not the increasing correction integrated value ΣRich updated at step 3120 is larger than a "predetermined increasing-amount-threshold ΣRichth". When the increasing correction integrated value ΣRich is smaller or equal to than the "predetermined increasing-amount-threshold ΣRichth", the CPU makes a "No" determination at step 3125 to directly proceed to step 3195 to end the present routine tentatively.

To the contrary, it is assumed that the increasing correction integrated value ΣRich becomes larger than the "predetermined increasing-amount-threshold ΣRichth". In this case, the CPU makes a "Yes" determination at step 3125 to proceed to step 3130, at which the CPU sets the value of the enforced lean flag XENlean to (at) "1". Thereafter, the CPU sets the increasing correction integrated value ΣRich to (at) "0" at step 3135, and proceeds to step 3195 to end the present routine tentatively.

In this manner, when the value of the enforced lean flag XENlean is set to (at) "1" and when the CPU proceeds to step 1210 shown in FIG. 12, the CPU makes a "No" determination at step 1210 to proceed to step 1220, at which the CPU makes a "Yes" determination to proceed to step 1225. Then, the CPU sets the target upstream-side air-fuel ratio abyfr to (at) the air-fuel ratio AFlean (e.g., 15.0) which is leaner than the stoichiometric air-fuel ratio at step 1225. Further, the CPU sets the value of the main feedback amount DFmain to (at) "0" at step 1230 shown in FIG. 12, and sets the sub feedback amount DFsub to (at) "0" at step 1235. Consequently, when the CPU executes steps from 1240, the air-fuel ratio of the engine (thus, the air-fuel ratio of the catalyst inflow gas) is controlled so as to be the lean air-fuel ratio AFlean.

Meanwhile, at an appropriate predetermined timing, the CPU starts the process from step 3200 shown in FIG. 32 to proceed to step 3210, at which the CPU determines whether or not the present time is a "point in time immediately after a first catalyst-restoring-time has elapsed since the point in time at which the value of the enforced lean flag XENlean was changed from "0" to "1".

According to the above assumption, the present time is "immediately after the enforced lean flag XENlean was changed from "0" to "1"". That is, the present time is not the "point in time immediately after the first catalyst-restoring-time has elapsed". Therefore, the CPU makes a "No" determination at step 3210 to directly proceed to step 3230. The processes from step 3230 will be described later.

Thereafter, if this state continues, the first catalyst-restoring-time has elapsed since the time at which the value of the enforced lean flag XENlean was changed from "0" to "1". At this time, when the CPU proceeds to step 3210 shown in FIG. 32, the CPU makes a "Yes" determination at step 3210 to proceed to step 3220, at which the CPU sets the value of the enforced lean flag XENlean to (at) "0". Thereafter, the CPU proceeds to step 3230.

According the processes described above, the value of the enforced lean flag XENlean is maintained at "1" for the first catalyst-restoring-time. Therefore, the air-fuel ratio of the engine (thus, the air-fuel ratio of the catalyst inflow gas) is controlled so as to be the lean air-fuel ratio AFlean, during a period from the point in time at which the increasing correction integrated value ΣRich becomes larger than the "predetermined increasing-amount-threshold ΣRichth" to the point in time at which the first catalyst-restoring-time elapses.

In this manner, in a case in which the "correction amount for the base fuel injection amount Fbase, the correction amount formed of the main feedback amount DFmain and the sub feedback amount DFsub, that is, the air-fuel ratio correction amount (DFmain+DFsub) which is a total value of the feedback amount" continues to be the value which increases the base fuel injection amount Fbase (i.e., case in which the "Yes" determination is made at step 3110), and when the increasing correction integrated value ΣRich reaches the "predetermined increasing-amount-threshold ΣRichth", the CPU determines that the catalyst-rich-poisoning is likely to occur, and controls the "air-fuel ratio of the mixture supplied to the engine" in such a manner that the "air-fuel ratio of the mixture supplied to the engine" becomes the "air-fuel ratio leaner than the stoichiometric air-fuel ratio" for the predetermined time period (first catalyst-restoring-time) (step 3125 and step 3130 shown in FIG. 31, and step 3210 and step 3220 shown in FIG. 32). Consequently, the catalyst-rich-poisoning is eliminated (resolved), and therefore, a state can be avoided in which "the efficiency of purifying emissions of the catalyst 43 lowers due to the catalyst-rich-poisoning".

Next, the description continues assuming that the sub feedback control condition is satisfied and the air-fuel correction amount (DFmain+DFsub) is smaller than "0". In this case, the CPU makes a "Yes" determination at step 3105, and makes a "No" determination at step 3110 to proceed to step 3140, at which the CPU sets the increasing correction integrated value ΣRich to (at) "0".

Subsequently, the CPU proceeds to step 3145 to obtain, as a "decreasing correction integrated value ΣLean", an integrated value of an absolute value of the air-fuel correction amount (DFmain+DFsub). That is, the CPU updates the decreasing correction integrated value ΣLean by adding the "absolute value |DFmain+DFsub| of the air-fuel correction amount (DFmain+DFsub) at the present time" to the "decreasing correction integrated value ΣLean at the present time", according to a formula (15) described below. It should be noted that the ΣLean(n+1) is an updated decreasing correction integrated value ΣLean, and ΣLean(n) is an decreasing correction integrated value ΣLean before updated, in formula (15).

$$\mathrm{Lean}(n+1)=\Sigma\mathrm{Lean}(n)+|DF\mathrm{main}+DF\mathrm{sub}| \quad (15)$$

As described above, when the air-fuel correction amount (DFmain+DFsub) is larger than or equal to "0", the decreasing correction integrated value ΣLean is set to (at) "0" at step 3115. Accordingly, the decreasing correction integrated value ΣLean becomes an integrated value of the absolute value of the air-fuel correction amount (DFmain+DFsub) in a period in which the air-fuel correction amount (DFmain+DFsub) continues to be smaller than "0". Further, the air-fuel correction amount (DFmain+DFsub) is a value which is added to the base fuel injection amount Fbase, and therefore, the decreasing correction integrated value ΣLean becomes an integrated value of an "amount (decreasing amount) by which the base fuel injection amount Fbase is decreased by the air-fuel correction amount (DFmain+DFsub)".

Subsequently, the CPU proceeds to step 3150 to determine whether or not the decreasing correction integrated value ΣLean updated at step 3145 is larger than a "predetermined decreasing-amount-threshold ΣLeanth". When the decreasing correction integrated value ΣLean is smaller than or equal to the "predetermined decreasing-amount-threshold ΣLeanth", the CPU makes a "No" determination at step 3150 to directly proceed to step 3195 to end the present routine tentatively.

To the contrary, it is assumed that the decreasing correction integrated value ΣLean becomes larger than the "predetermined decreasing-amount-threshold ΣLeanth". In this case, the CPU makes a "Yes" determination at step 3150 to proceed to step 3155, at which the CPU sets the value of the enforced rich flag XENrich to (at) "1". Thereafter, the CPU sets the decreasing correction integrated value ΣLean to (at) "0" at step 3160, and proceeds to step 3195 to end the present routine tentatively.

In this manner, when the value of the enforced rich flag XENrich is set to (at) "1" and when the CPU proceeds to step 1210 shown in FIG. 12, the CPU makes a "Yes" determination at step 1210 to proceed to step 1215, at which the CPU sets the target upstream-side air-fuel ratio abyfr to (at) the air-fuel ratio AFrich (e.g., 14.2) which is richer than the stoichiometric air-fuel ratio at step 1215. Further, the CPU sets the value of the main feedback amount DFmain to (at) "0" at step 1230 shown in FIG. 12, and sets the sub feedback amount DFsub to (at) "0" at step 1235. Consequently, when the CPU executes steps from 1240, the air-fuel ratio of the engine (thus, the air-fuel ratio of the catalyst inflow gas) is controlled so as to be the rich air-fuel ratio AFrich.

Meanwhile, at an appropriate predetermined timing, the CPU starts the process from step 3200 shown in FIG. 32 to proceed to step 3210, at which the CPU makes a "No" determination at step 3210 to directly proceed to step 3230. Then, the CPU determines whether or not the present time is a "point in time immediately after a second catalyst-restoring-time has elapsed since the point in time at which the value of the enforced rich flag XENrich was changed from "0" to "1" at step 3230.

According to the above assumption, the present time is "immediately after the enforced rich flag XENrich was changed from "0" to "1"". That is, the present time is not the "point in time immediately after the second catalyst-restoring-time has elapsed". Therefore, the CPU makes a "No" determination at step 3230 to directly proceed to step 3295 to end the present routine tentatively.

Thereafter, if this state continues, the second catalyst-restoring-time has elapsed since the point in time at which the value of the enforced rich flag XENrich was changed from "0" to "1". At this time, when the CPU proceeds to step 3210 shown in FIG. 32, the CPU makes a "No" determination at step 3210 to directly proceed to step 3230. Then, the CPU makes a "Yes" determination at step 3230 to proceed to step 3240, at which the CPU sets the value of the enforced rich flag XENrich to (at) "0". Thereafter, the CPU proceeds to step 3295 to end the present routine tentatively.

According the processes described above, the value of the enforced rich flag XENrich is maintained at "1" for the second catalyst-restoring-time. Therefore, the air-fuel ratio of the engine (thus, the air-fuel ratio of the catalyst inflow gas) is controlled so as to be the rich air-fuel ratio AFrich, during a period from the point in time at which the decreasing correction integrated value ΣLean becomes larger than the "predetermined decreasing-amount-threshold ΣLeanth" to the point in time at which the second catalyst-restoring-time elapses.

In this manner, in a case in which the air-fuel ratio correction amount (DFmain+DFsub) continues to be the value which decreases the base fuel injection amount Fbase (i.e., case in which the "No" determination is made at step 3110), and when the decreasing correction integrated value ΣLean reaches the "predetermined decreasing-amount-threshold ΣLeanth", the CPU determines that the catalyst-lean-poisoning is likely to occur, and controls the "air-fuel ratio of the mixture supplied to the engine" in such a manner that the "air-fuel ratio of the mixture supplied to the engine" becomes the "air-fuel ratio richer than the stoichiometric air-fuel ratio" for the predetermined time period (second catalyst-restoring-time) (step 3150 and step 3155 shown in FIG. 31, and step 3230 and step 3240 shown in FIG. 32). Consequently, the catalyst-lean-poisoning is eliminated (resolved), and therefore, a state can be avoided in which "the efficiency of purifying emissions of the catalyst 43 lowers due to the catalyst-lean-poisoning".

5. Fifth Embodiment

Next will be described an air-fuel ratio control apparatus (hereinafter, referred to as a "fifth control apparatus") according to a fifth embodiment of the present invention. The fifth control apparatus performs the sub feedback control by obtaining the sub feedback amount DFsub similarly to the first to fourth control apparatuses, when the output value Voxs of the downstream air-fuel ratio sensor 56 is between the stoichiometric-upper-limit-value VHilimit which is the first threshold and stoichiometric-lower-limit-value VLolimit which is the second threshold.

However, a frequency of the output value Voxs of the downstream air-fuel ratio sensor 56 (frequency of the output value Voxs fluctuating around the middle value Vmid) is smaller than or equal to a predetermined frequency threshold during the sub feedback control, the fifth control apparatus performs an air-fuel ratio feedback control (oxygen storage amount feedback control) which controls the oxygen storage amount OSA of the catalyst 43 in such a manner that the oxygen storage amount OSA is maintained "between an oxygen storage amount lower limit OSALoth and an oxygen storage amount upper limit OSAHith". Other than this point, the fifth control apparatus performs the air-fuel ratio control similarly to the first to fourth control apparatuses. Accordingly, this difference will be mainly described.

Figure 33:
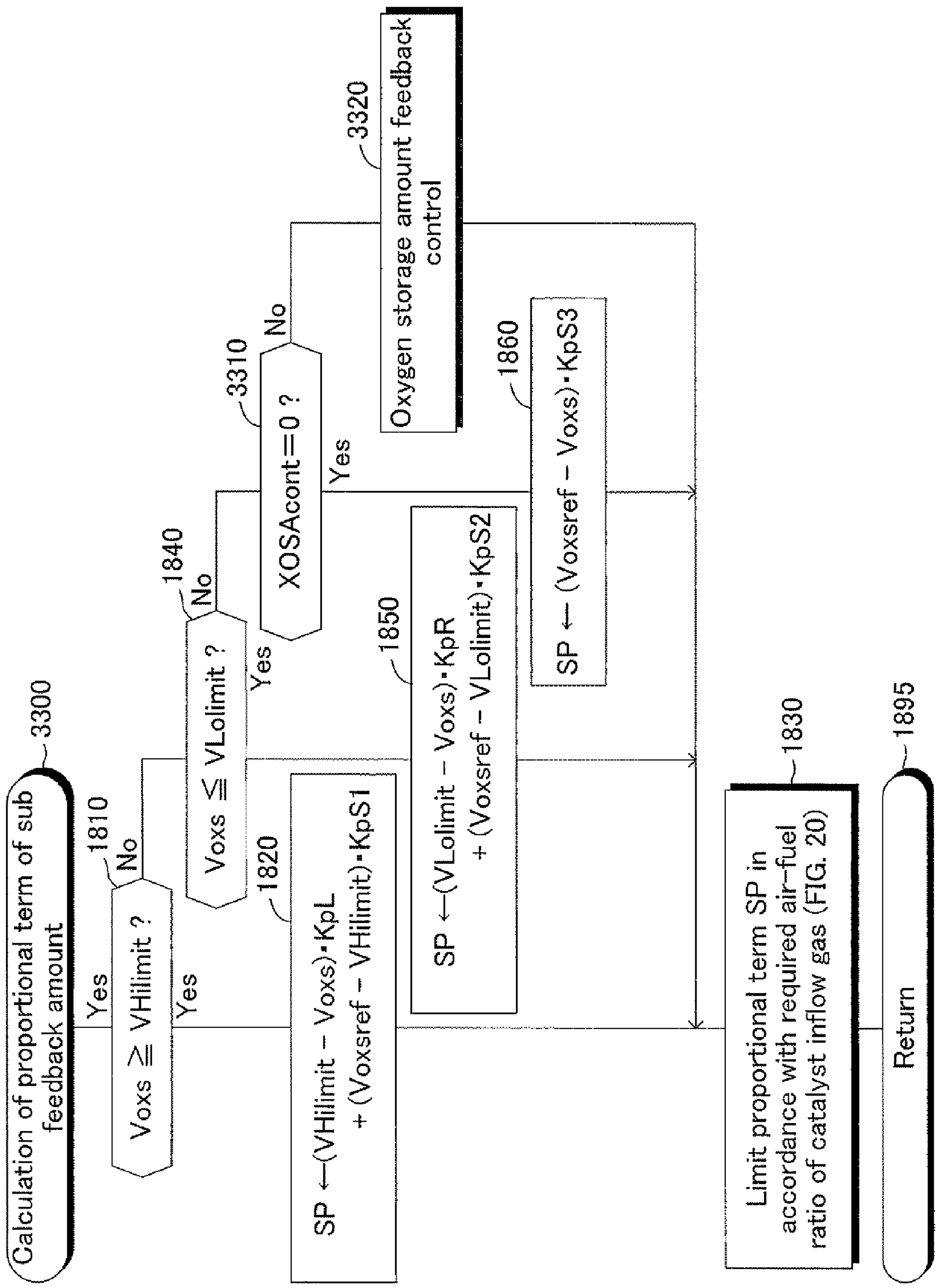
FIG. 33 is a flowchart showing a routine, executed by a CPU of an air-fuel ratio control apparatus for the internal combustion engine (fifth control apparatus) according to a fifth embodiment of the present invention, for calculating a proportional term of the sub feedback amount.

A CPU of the fifth control apparatus executes a "routine for calculating the proportional term of the sub feedback amount" shown by a flowchart in FIG. 33 in place of FIG. 18. Steps shown in FIG. 33 includes some steps that are the same as the steps shown in FIG. 18, and the same signs (numerals) are provided to those steps as in FIG. 18. The detail descriptions of these steps are omitted.

In the routine shown in FIG. 33, step 3310 and step 3320 are added to the routine shown in FIG. 18. More specifically, when the output value Voxs of the downstream air-fuel ratio sensor 56 is between "the stoichiometric-upper-limit-value VHilimit serving as the first threshold" and "the stoichiometric-lower-limit-value VLolimit as the second threshold", the CPU proceeds to step 3310 through step 1810, and step 1840. The CPU determines whether or not a value of the oxygen amount control flag XOSAcont is equal to "1" at step 3310. The value of the oxygen amount control flag XOSAcont is set to (at) "0" in the initialization routine described above, and is set to (at) "1" when the oxygen storage amount control described later is performed.

The description continues assuming that the value of the oxygen amount control flag XOSAcont is equal to "0". In this case, the CPU makes a "Yes" determination at step 3310 to proceed to step 1860, at which CPU calculates the proportional term SP of the sub feedback amount DFsub, according to the formula (13) described above. Thereafter, the CPU executes the process of step 1830 described above, and proceed to step 1895 to end the present routine tentatively.

Figure 34:
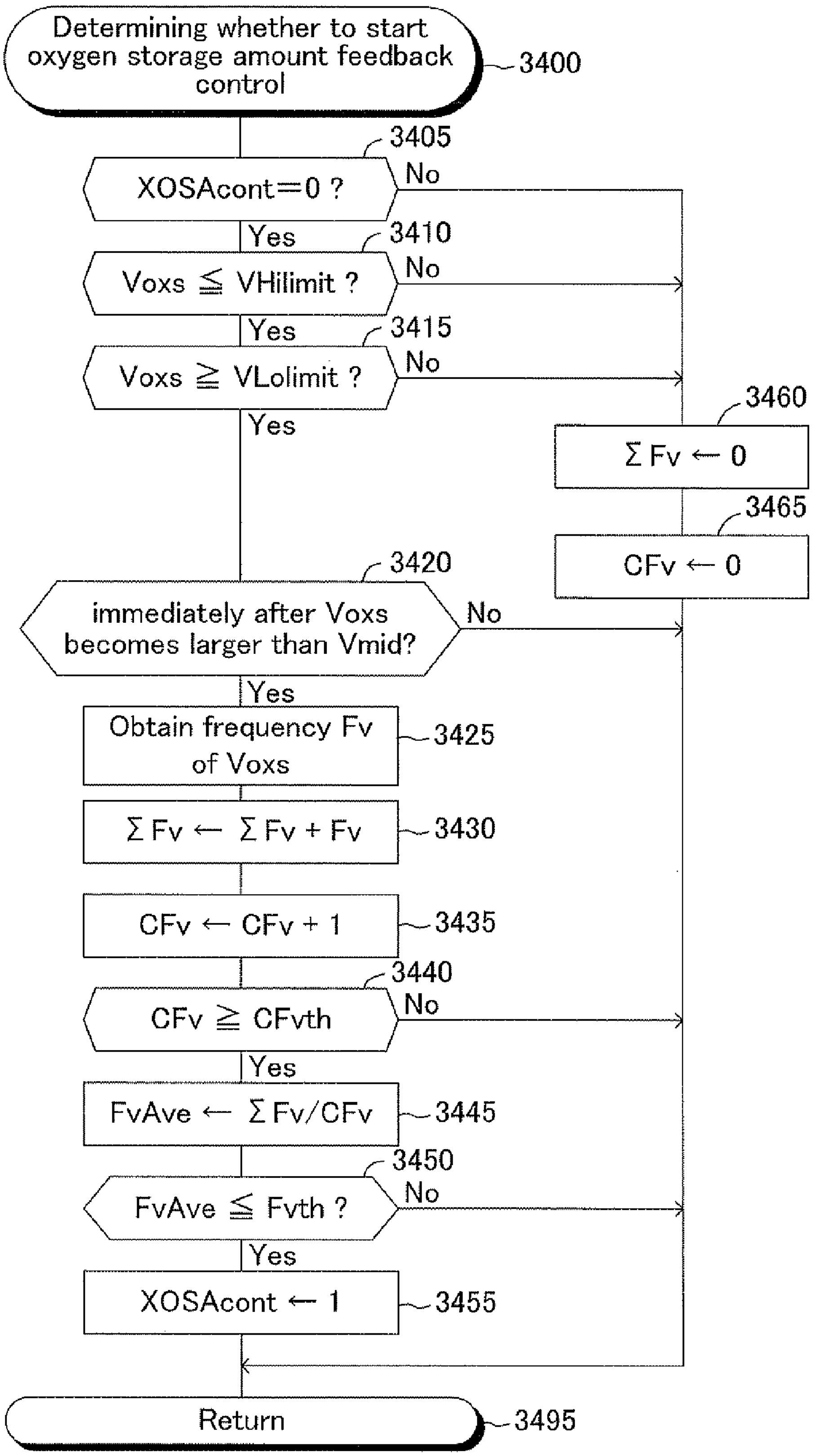
FIG. 34 is a flowchart showing a routine, executed by the CPU of the fifth control apparatus, for determining whether or not to start an oxygen storage amount feedback control.

Meanwhile, the CPU executes a "routine for determining whether or not to start an oxygen storage amount feedback control" shown by a flowchart in FIG. 34, every time a predetermined time period elapses. Accordingly, at an appropriate predetermined timing, the CPU starts the process from step 3400 shown in FIG. 34 to proceed to step 3405 at which CPU determines whether or not the value of the oxygen amount control flag XOSAcont is equal to "0".

According to the assumption described above, the value of the oxygen amount control flag XOSAcont is equal to "0". Therefore, the CPU makes a "Yes" determination at step 3405 to proceed to step 3410, at which the CPU determines whether or not the output value Voxs of the downstream air-fuel ratio sensor 56 is smaller than or equal to the stoichiometric-upper-limit-value VHilimit.

It is further assumed here that the output value Voxs of the downstream air-fuel ratio sensor 56 is larger than or equal to the "stoichiometric-lower-limit-value VLolimit serving as the second threshold value", and is smaller than or equal to the "stoichiometric-upper-limit-value VHilimit serving as the first threshold". In this case, the CPU makes a "Yes" determination at step 3410, and also makes a "Yes" determination at step 3415 at which the CPU determines "whether or not the output value Voxs is larger than or equal to the "stoichiometric-lower-limit-value VLolimit".

Thereafter, the CPU determines whether or not the present time is a "point in time immediately after the output value Voxs changed from a value smaller than the middle value Vmid to a value larger than the middle value Vmid" at step 3420. At this time, when the present time is the point in time immediately after the output value Voxs crossed the middle value Vmid", the CPU makes a "No" determination at step 4320 to directly proceed to step 3495 to end the present routine tentatively.

In contrast, the present time is the "point in time immediately after the output value Voxs changed from the value smaller than the middle value Vmid to the value larger than the middle value", the CPU makes a "Yes" determination at step 3420 to proceed to step 3425, at which the CPU obtains a frequency Fv of the output value Voxs. The frequency Fv is an inverse number of a fluctuation period of the output value Voxs. That is, the frequency Fv is an inverse number of a period T (T=tb−ta) from a point in time ta to a point in time tb, wherein the point in time ta being when the output value Voxs changes from a value smaller than the middle value Vmid to a value larger than the middle value Vmid, and the point in time tb being when the output value Voxs again changes from a value smaller than the middle value Vmid to a value larger than the middle value Vmid after the output value Voxs becomes a value smaller than the middle value Vmid.

Subsequently, the CPU proceeds to step 3430 to obtain an integrated value ΣFv of the frequency Fv. That is, the CPU obtains a new integrated value ΣFv by adding the frequency Fv obtained at step 3420 to the integrated value ΣFv obtained by that moment.

Subsequently, the CPU increments a value of a counter CFv at step 3435 by "1". Then, the CPU determines whether or not the counter CFv is larger than or equal to the counter threshold CFvth at step 3440. At this time, when the counter CFv is neither larger than nor equal to the counter threshold CFvth, the makes a "No" determination at step 3440 to directly proceed to step 3495 to end the present routine tentatively. It should be noted that the counter threshold CFvth may be equal to "1".

In contrast, when the counter CFv is larger than or equal to the counter threshold CFvth, the makes a "Yes" determination at step 3440 to proceed to step 3445, at which the CPU obtains an average FvAve of the frequency Fv by dividing the integrated value ΣFv by the value of the counter CFv.

Thereafter, the CPU proceeds to step 3450 to determine whether or not the average FvAve of the frequency is smaller than or equal to the frequency threshold Fvth. That is, the CPU determines whether or not the output value Voxs gradually changes (varies). When the average FvAve of the frequency is larger than the frequency threshold Fvth, the CPU makes "No" determination at step 3450 to directly proceed to step 3495 to end the present routine tentatively.

In contrast, when the average FvAve of the frequency is smaller than or equal to the frequency threshold Fvth, the CPU makes "Yes" determination at step 3450 to proceed to step 3455, at which the CPU sets the value of the oxygen amount control flag XOSAcont to (at) "1". Thereafter, the CPU proceeds to step 3495 to end the present routine tentatively.

It should be noted that, when the CPU executes the present routine, and when the output value Voxs of the downstream air-fuel ratio sensor 56 is larger than the "stoichiometric-upper-limit-value VHilimit serving as the first threshold", the CPU makes a "No" determination at step 3410 to proceed to step 3460, at which the CPU sets the integrated value ΣFv to (at) "0". Then, the CPU proceeds to step 3465 to set the counter CFv to (at) "0", and thereafter, proceeds to step 3495 to end the present routine tentatively.

It should be also noted that, when the CPU executes the present routine, and when the output value Voxs of the downstream air-fuel ratio sensor 56 is smaller than the "stoichiometric-lower-limit-value VLolimit serving as the second threshold", the CPU makes a "No" determination at step 3415 to executes the processes of step 3460 and step 3465 described above, and then directly proceeds to step 3495 to end the present routine tentatively.

Figure 35:
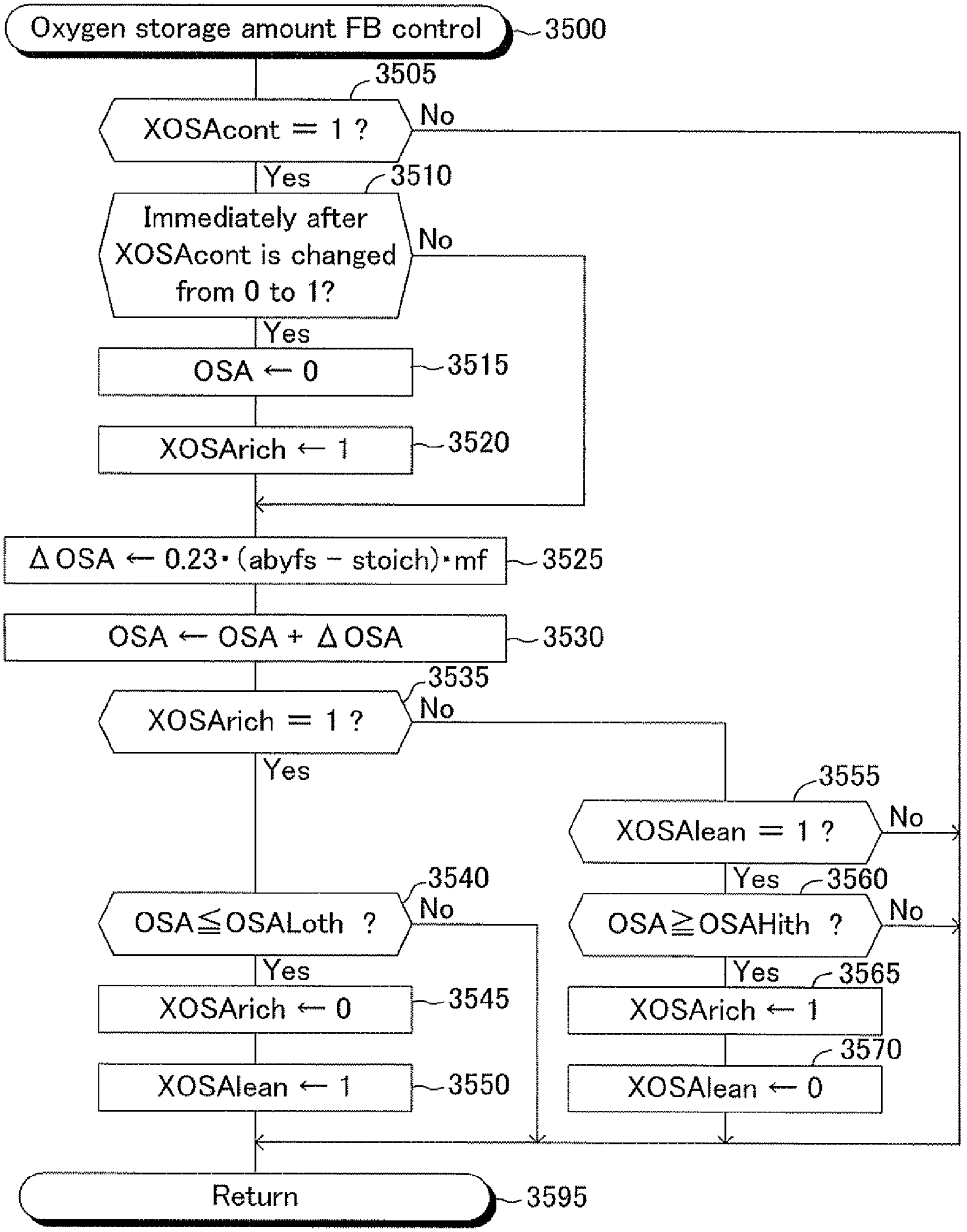
FIG. 35 is a flowchart showing a routine, executed by the CPU of the fifth control apparatus, for performing the oxygen storage amount feedback control.

Furthermore, the CPU executes an "oxygen storage amount feedback control routine" shown by a flowchart in FIG. 35, every time a predetermined time period elapses. Accordingly, at an appropriate predetermined timing, the CPU starts the process from step 3500 shown in FIG. 35 to proceed to step 3505, at which CPU determines whether or not the value of the oxygen amount control flag XOSAcont is equal to "1".

When the oxygen amount control flag XOSAcont is equal to "0", the CPU makes a "No" determination at step 3505 to directly proceed to step 3595 to end the present routine tentatively.

In contrast, when the oxygen amount control flag XOSAcont is set to (at) "1" at step 3455 described above shown in FIG. 34, the CPU makes a "Yes" determination at step 3505 to proceed to 10, at which the CPU determines whether or not the present time is a "point in time immediately after the value of the oxygen amount control flag XOSAcont was changed from "0" to "1".

At this time, when the present time is not the "point in time immediately after the value of the oxygen amount control flag XOSAcont was changed from "0" to "1", the CPU makes a "No" determination at step 3510 to directly proceed to step 3525.

It is assumed here that the present time is the "point in time immediately after the value of the oxygen amount control flag XOSAcont was changed from "0" to "1" at step 3455 shown in FIG. 34 described above". In this case, the CPU makes a "Yes" determination at step 3510 to proceed to step 3515 to set the value of the oxygen storage amount OSA (relative estimated value) to (at) "0". Subsequently, the CPU proceeds to step 3520 to set a value of an oxygen storage amount adjusting rich flag XOSArich to (at) "1". Thereafter, the CPU proceeds to step 3525.

In this manner, when the value of the oxygen storage amount adjusting rich flag XOSArich is set to (at) "1", and when the CPU proceeds to step 1210 shown in FIG. 12, the CPU makes a "Yes" determination at step 1210 to proceed to step 1215, at which the CPU sets the target upstream-side air-fuel ratio abyfr to (at) the air-fuel ratio AFrich (e.g., 14.2) richer than the stoichiometric air-fuel ratio. Further, the CPU sets the value of the main feedback amount DFmain to (at) "0", and sets the value of the sub feedback amount DFsub to (at) "0". As a result, when the CPU executes the processes from step 1240, the air-fuel ratio of the engine (thus, the air-fuel ratio of the catalyst inflow gas) is controlled so as to be the rich air-fuel ratio AFrich. This causes the catalyst inflow gas to include the unburnt substances, and therefore, the oxygen storage amount OSA gradually decreases.

The CPU calculates a change amount ΔOSA of the oxygen storage amount OSA, according to a formula (16) described below, at step 3525. In the formula (16), the value "0.23" is the mass-fraction of oxygen in the air. mf is a total amount of the fuel injection amount Fi in a predetermined time period (execution period tsam of the present routine). stoich is the stoichiometric air-fuel ratio (e.g., 14.6). abyfs is the detected upstream-side air-fuel ratio measured by the upstream air-fuel ratio sensor 55. It should be noted that abyfs may be an average of the upstream-side air-fuel ratio measured by the upstream air-fuel ratio sensor 55 within the predetermined time period tsam.

$$\Delta OSA=0.23\cdot(abyfs-stoich)\cdot mf \quad (16)$$

Subsequently, the CPU proceeds to step 3530 to calculate the newest oxygen storage amount OSA by adding the change amount OSA of the oxygen storage amount OSA obtained at step 3525 to the oxygen storage amount OSA at that time.

Thereafter, the CPU proceeds to step 3535 to determine whether or not the value of the oxygen storage amount adjusting rich flag XOSArich is equal to "1". At the present time, the value of the oxygen storage amount adjusting rich flag XOSArich was set to (at) "1" at step 3520 described above. Accordingly, the CPU makes a "Yes" determination at step 3535 to proceed to step 3540, at which the CPU determines whether or not the oxygen storage amount OSA calculated at step 3530 is smaller than or equal to the oxygen storage amount lower limit OSALoth. The oxygen storage amount lower limit OSALoth is selected to a value smaller than "0", and its absolute value of the oxygen storage amount lower limit OSALoth is smaller than ½ of an absolute value of the maximum oxygen storage amount Cmax. When the oxygen storage amount OSA is larger than the oxygen storage amount lower limit OSALoth, the CPU makes a "No" determination at step 3540 to directly proceed to step 3595 to end the present routine tentatively.

Thereafter, if this state continues, the air-fuel ratio of the engine continues to be controlled so as to be the rich air-fuel ratio AFrich, and therefore, the oxygen storage amount OSA gradually decreases down to a value smaller than or equal to the oxygen storage amount lower limit OSALoth. At this time, when the CPU executes the process of step 3540, the CPU makes a "Yes" determination at step 3540, and sets the value of the oxygen storage amount adjusting rich flag XOSArich to (at) "0" at step 3545. Further, the CPU proceeds to step 3550 to set the value of the oxygen storage amount adjusting lean flag XOSAlean to (at) "1", and proceeds to step 3595 to end the present routine tentatively.

Consequently, when the CPU proceeds to step 1210, the CPU makes a "No" determination at step 1210 to proceed to step 1220, at which the CPU makes a "Yes" determination to proceed to step 1225. The CPU sets the target upstream-side air-fuel ratio abyfr to (at) the lean air-fuel ratio AFlean (e.g., 15.0) learner than the stoichiometric air-fuel ratio at step 1225. Further, the CPU sets the value of the main feedback amount DFmain to (at) "0" at step 1230 shown in FIG. 12, and sets the value of the sub feedback control amount DFsub to (at) "0" at step 1235. Consequently, when the CPU executes the processes after step 1240, the air-fuel ratio of the engine (thus, the air-fuel ratio of the catalyst inflow gas) is controlled so as to be the lean air-fuel ratio AFlean. This causes the catalyst inflow gas to include the excessive oxygen, and therefore, the oxygen storage amount OSA gradually increases.

Further, when the predetermined time elapses, and when the CPU starts the processes of the routine shown in FIG. 35, the CPU executes the processes of step 3505, step 3510, step 3525, and step 3530, and thereafter, makes a "No" determination at step 3535 to proceed to step 3555.

The CPU determines whether or not the value of the oxygen storage amount adjusting lean flag XOSAlean is equal to "1", at step 3555. At the present time, the value of the oxygen storage amount adjusting lean flag XOSAlean was set to (at) "1" at step 3550. Accordingly, the CPU makes a "Yes" determination at step 3555 to proceed to step 3560, at which the CPU determines whether or not the oxygen storage amount OSA calculated at step 3530 is larger than or equal to the oxygen storage amount upper limit OSAHith. The oxygen storage amount upper limit OSAHith is set to (at) a value larger than the oxygen storage amount lower limit OSALoth by a predetermined amount. The oxygen storage amount upper limit OSAHith is selected to a value which is larger than "0", and is smaller than ½ of the absolute value of the maximum oxygen storage amount Cmax.

When the oxygen storage amount OSA is smaller than the oxygen storage amount upper limit OSAHith, the CPU makes a "No" determination at step 3560 to directly proceed to step 3595 to end the present routine tentatively.

Thereafter, if this state continues, the air-fuel ratio of the engine continues to be controlled so as to be the lean air-fuel ratio AFlean, and therefore, the oxygen storage amount OSA gradually increases up to a value larger than or equal to the oxygen storage amount upper limit OSAHith. At this time, when the CPU executes the process of step 3560, the CPU makes a "Yes" determination at step 3560, and sets the value of the oxygen storage amount adjusting rich flag XOSArich to (at) "1" at step 3565. Further, the CPU proceeds to step 3570 to set the value of the oxygen storage amount adjusting lean flag XOSAlean to (at) "0", and proceeds to step 3595 to end the present routine tentatively. Consequently, the air-fuel ratio of the engine is again controlled so as to be the rich air-fuel ratio AFrich.

As described above, when the oxygen storage amount OSA becomes smaller than or equal to the oxygen storage amount lower limit OSALoth, the air-fuel ratio of the engine is set to (at) the lean air-fuel ratio AFlean, and thus, the oxygen storage amount OSA is increased. Further, when the oxygen storage amount OSA becomes larger than or equal to the oxygen storage amount upper limit OSAHith, the air-fuel ratio of the engine is set to (at) the rich air-fuel ratio AFrich, and thus, the oxygen storage amount OSA is decreased. That is, the oxygen storage amount feedback control is performed.

Figure 36:
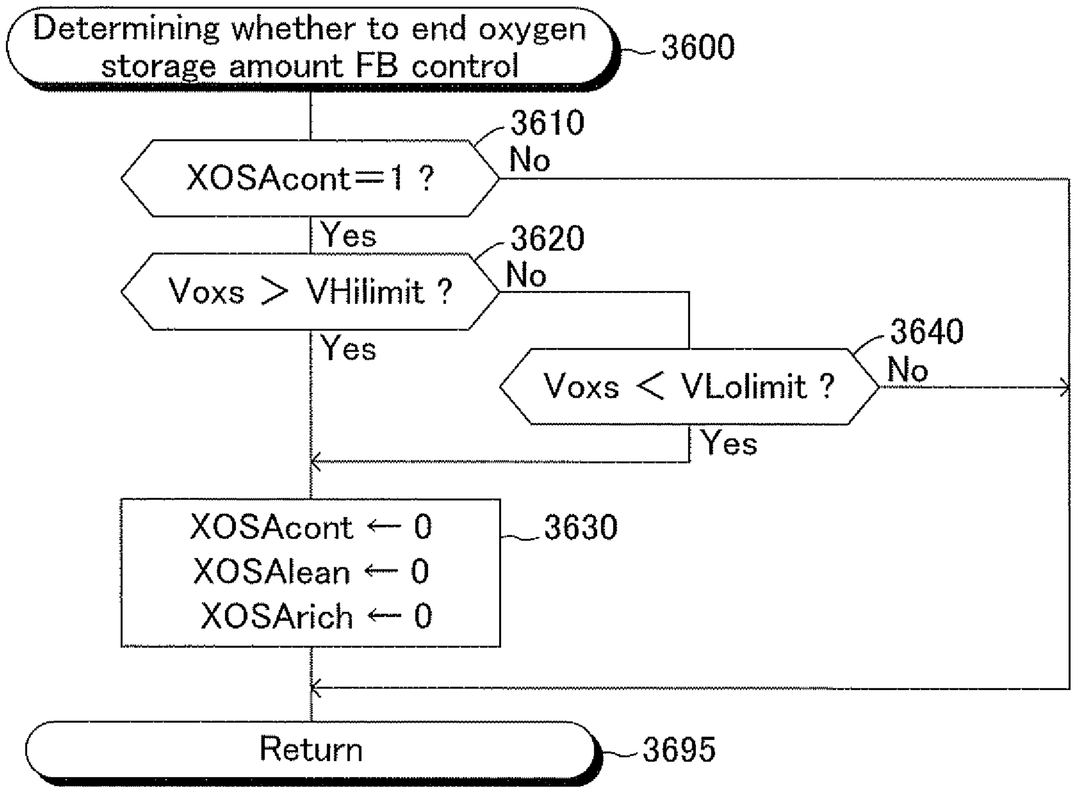
FIG. 36 is a flowchart showing a routine, executed by the CPU of the fifth control apparatus, for determining whether or not to end (terminate) the oxygen storage amount feedback control.

Furthermore, the CPU executes a "routine for determining whether or not to end (terminate) the oxygen storage amount feedback control" shown by a flowchart in FIG. 36, every time a predetermined time period elapses. Accordingly, at an appropriate predetermined timing, the CPU starts the process from step 3600 shown in FIG. 36 to proceed to step 3610, at which CPU determines whether or not the value of the oxygen amount control flag XOSAcont is equal to "1". When the value of the oxygen amount control flag XOSAcont is equal to "0", the CPU makes a "No" determination at step 3610 to directly proceed to step 3695 to end the present routine tentatively.

In contrast, when the oxygen storage amount feedback control is being performed at the present time, and thus, when the value of the oxygen amount control flag XOSAcont is equal to "1", the CPU makes a "Yes" determination at step 3610 to proceed to step 3620, at which the CPU determines whether or not the output value Voxs of the downstream air-fuel ratio sensor 56 is larger than the "stoichiometric-upper-limit-value VHilimit serving as the first threshold".

When the output value Voxs is larger than the "stoichiometric-upper-limit-value VHilimit serving as the first threshold", the CPU makes a "Yes" determination at step 3620 to proceed to step 3630, at which the CPU sets each of the values of the oxygen amount control flag XOSAcont, the oxygen storage amount adjusting lean flag XOSAlean, and the oxygen storage amount adjusting rich flag XOSArich to "0".

Accordingly, when the CPU executes the routine shown in FIG. 12, the CPU makes "No" determination at each of step 1210 and step 1220, and thus, directly proceeds to step 1240. Consequently, the target upstream-side air-fuel ratio abyfr is set to (at) the stoichiometric air-fuel ratio (refer to step 1205). In addition, since the processes of step 1230 and step 1235 are not performed, the control using the main feedback amount DFmain based on the output value Vabyfs of the upstream air-fuel ratio sensor 55 and the control using the sub feedback amount DFsub based on the output value Voxs of the downstream air-fuel ratio sensor 56 are resumed (started again).

Accordingly, thereafter, when the CPU proceeds to step 3310 shown in FIG. 33, the CPU makes a "No" determination at step 3310 to proceed to step 1860. Therefore, the oxygen storage amount feedback is terminated.

Meanwhile, when the CPU proceeds to step 3620, and when the output value Voxs of the downstream air-fuel ratio sensor 56 is smaller than equal to the stoichiometric-upper-limit-value VHilimit serving as the first threshold", the CPU make a "Yes" determination at step 3620 to proceed to step 3640, at which the CPU determines whether or not the output value Voxs of the downstream air-fuel ratio sensor 56 is smaller than the "stoichiometric-lower-limit-value VLolimit serving as the second threshold".

When the output value Voxs is smaller than the "stoichiometric-lower-limit-value VLolimit serving as the second threshold", the CPU makes a "Yes" determination at step 3640 to proceed to step 3630, at which the CPU sets each of the values of the oxygen amount control flag XOSAcont, the oxygen storage amount adjusting lean flag XOSAlean, and the oxygen storage amount adjusting rich flag XOSArich to "0".

Accordingly, in this case as well, the target upstream-side air-fuel ratio abyfr is set to (at) the stoichiometric air-fuel ratio stoich, and both the control using the main feedback amount DFmain and the control using the sub feedback amount DFsub are resumed (started again).

In contrast, when the CPU proceeds to step 3640, and when the output value Voxs of the downstream air-fuel ratio sensor 56 is larger than or equal to the "stoichiometric-lower-limit-value VLolimit serving as the second threshold", the CPU makes a "No" determination at step 3640 to proceed to 3695 to end the present routine tentatively. Accordingly, in this case, each of the values of the oxygen amount control flag XOSAcont, the oxygen storage amount adjusting lean flag XOSAlean, and the oxygen storage amount adjusting rich flag XOSArich is not changed, and thus, the oxygen storage amount feedback control is continued to be performed.

It should be noted that, when the CPU proceeds to step 3310 shown in FIG. 44 after the value of the oxygen amount control flag XOSAcont is set to (at) "0" by the process of step 3630, the CPU makes a "Yes" determination at step 3610 to proceed to step 1860.

As described above, the fifth control apparatus comprises an air-fuel ratio control means for performing the oxygen storage amount feedback control.

That is, the air-fuel ratio control means obtains the "fluctuation frequency (average value FvAVe) of the output value Voxs of the downstream air-fuel ratio sensor 56, in the period in which the output value Voxs is smaller than the first threshold (stoichiometric-upper-limit-value VHilimit) and larger than the second threshold (stoichiometric-lower-limit-value VLolimit), and thus, the "normal air-fuel ratio feedback control is being performed".

Further, the air-fuel ratio control means when the obtained fluctuation frequency (average value FvAVe) becomes smaller than or equal to the predetermined threshold frequency Fvth (refer to step 3450), estimates the oxygen storage amount OSA of the catalyst (relative value of the oxygen storage amount OSA with respect to a value of the oxygen storage amount OSA at a certain point in time), and controls the air-fuel ratio of the mixture supplied to the engine 10 based on the estimated oxygen storage amount in such a manner that the estimated oxygen storage amount is maintained "between the oxygen storage amount lower limit and the oxygen storage amount upper limit" (refer to step 3455 shown in FIG. 34, and the routine shown in FIG. 35), in place of the "normal air-fuel ratio feedback control".

As a result of this configuration, the "air-fuel ratio of the catalyst inflow gas" can be greatly varied around the stoichiometric air-fuel ratio as long as the emissions does not become worse, and thus, the catalyst-rich-poisoning and the catalyst-lean-poisoning can be easily eliminated, and the efficiency of purifying emissions of the catalyst 43 can be improved.

Further, the air-fuel ratio control means is configured so as to:

stop (terminate, end) the oxygen storage amount feedback control, when the output value Voxs of the downstream air-fuel ratio sensor 56 becomes "larger than or equal to the first threshold" or "smaller than or equal to the second threshold" while the oxygen storage amount feedback control is being performed; and start again (resume) the "control of the air-fuel ratio of the mixture supplied to the engine based on the output value of the downstream air-fuel ratio sensor" (refer to the routine shown in FIG. 36).

Accordingly, even when the oxygen storage amount becomes the value in the vicinity of "0" or the "maximum oxygen storage amount Cmax" by performing the oxygen storage amount feedback control, a state can be avoided in which the emissions become worse.

As described above, each of the air-fuel ratio control apparatuses according to the embodiments of the present invention estimates the state of the catalyst 43 (state regarding the oxygen storage) using the output value Voxs of the downstream air-fuel ratio sensor 56 and its change rate ΔVoxs, and controls the air-fuel ratio of the catalyst inflow gas based on the estimated state. Accordingly, the air-fuel ratio of the catalyst inflow gas can be an air-fuel ratio corresponding to the "required air-fuel ratio of the catalyst inflow gas", and therefore, the emissions can be further improved.

It should be noted that the present invention should not be limited to the embodiments described above, but various modifications may be adopted without departing from the scope of the invention. For example, a CPU according to a modified example of the each of the embodiments may determine/judge the state of the catalyst 43 as follows, by executing a "routine for determining a catalyst-rich-state and a catalyst-lean-state" shown in FIG. 37 in place of the routine shown in FIG. 26, every time a predetermined time period is elapses.

That is, the CPU determines whether or not the change rate ΔVoxs of the output value Voxs of the downstream air-fuel ratio sensor 56 is negative at step 3710, and the magnitude |ΔVoxs| of the change rate is larger than or equal to a predetermined change rate threshold ΔVth at step 3720 when the change rate ΔVoxs is negative. When the magnitude |ΔVoxs| of the change rate is larger than or equal to the predetermined change rate threshold ΔVth, the CPU determines that the catalyst 43 is in the "state in which the oxygen is excessive", and sets the value of the catalyst-lean-state flag (oxygen excessive state flag) XCCROlean to (at) "1" at step 3730. At this time, the CPU sets the catalyst-rich-state flag (oxygen short state flag) XCCROrich to (at) "0" at step 3740.

Further, the CPU determines whether or not the change rate ΔVoxs of the output value Voxs of the downstream air-fuel ratio sensor 56 is positive at step 3750, and the magnitude |ΔVoxs| of the change rate is larger than or equal to the predetermined change rate threshold ΔVth at step 3760 when the change rate ΔVoxs is positive. When the magnitude |ΔVoxs| of the change rate is larger than or equal to the predetermined change rate threshold ΔVth, the CPU determines that the catalyst 43 is in the "state in which the oxygen is short", and sets the value of the catalyst-rich-state flag XCCROrich to (at) "1" at step 3770. At this time, the CPU sets the catalyst-lean-state flag XCCROlean to (at) "0" at step 3780.

In this manner, the modified example of the each of the embodiments may be configured so as to determine that the catalyst 43 is in the state in which the oxygen is excessive, when the change rate ΔVoxs of the output value Voxs of the downstream air-fuel ratio sensor 56 is negative, and when the magnitude |ΔVoxs| of the change rate is larger than or equal to the predetermined change rate threshold ΔVth. In addition, the modified example of the each of the embodiments may be configured so as to determine that the catalyst 43 is in the state in which the oxygen is short, when the change rate ΔVoxs of the output value Voxs of the downstream air-fuel ratio sensor 56 is positive, and when the magnitude |ΔVoxs| of the change rate is larger than or equal to the predetermined change rate threshold ΔVth.

Figure 37:
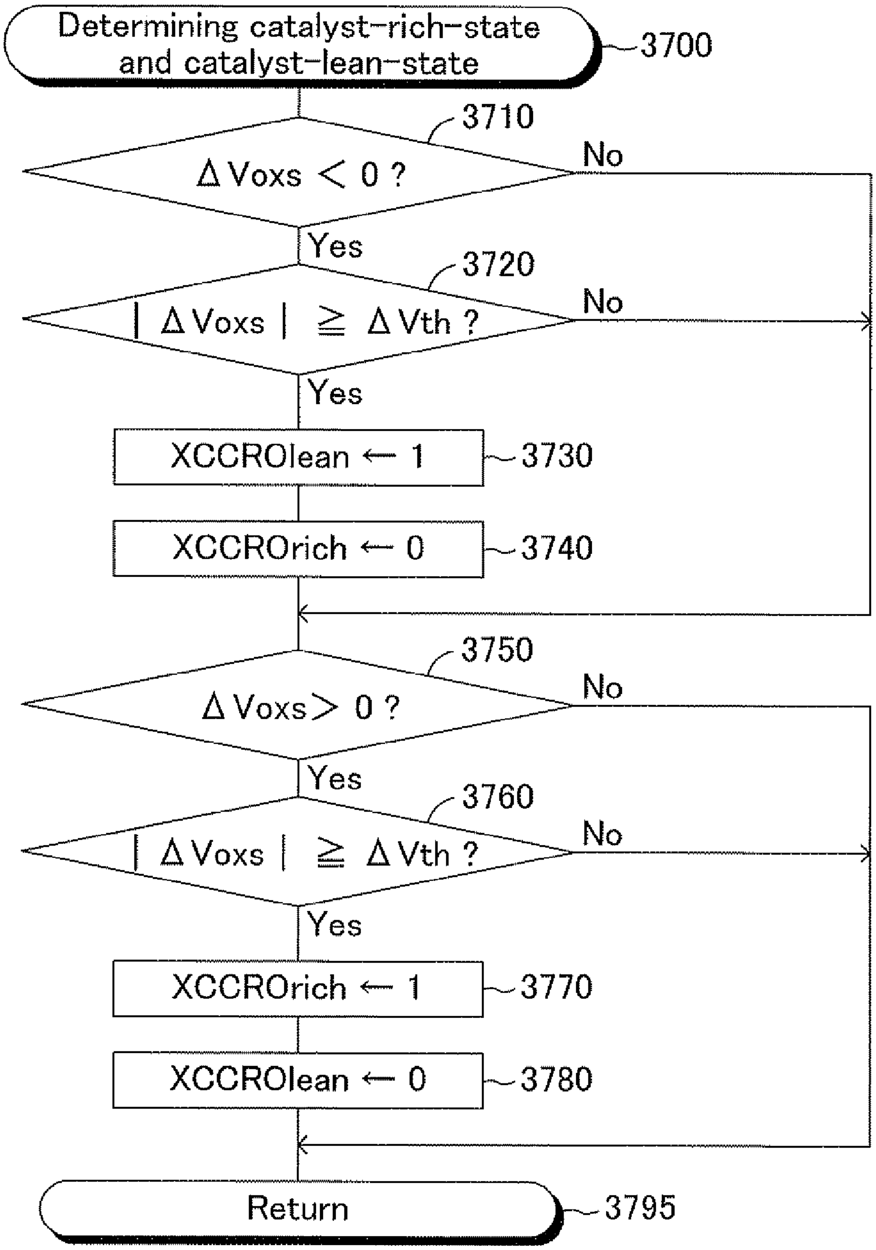
FIG. 37 is a flowchart showing a routine, executed by a CPU of an air-fuel ratio control apparatus for the internal combustion engine according to a modified embodiment of the present invention, for determining a catalyst-rich-state and a catalyst-lean-state.

Furthermore, a CPU according to another modified example of the each of the embodiments may determine/judge the state of the catalyst 43 as follows, by executing a "routine for determining a catalyst-rich-state and a catalyst-lean-state" shown in FIG. 38 in place of the routine shown in FIG. 26, every time a predetermined time period is elapses. It should be noted that each step shown in FIG. 38 at which the same process is performed as each step shown in FIG. 37 is given the same numeral as one given to such step shown in FIG. 37. Detail descriptions for these steps may be omitted.

Figure 38:
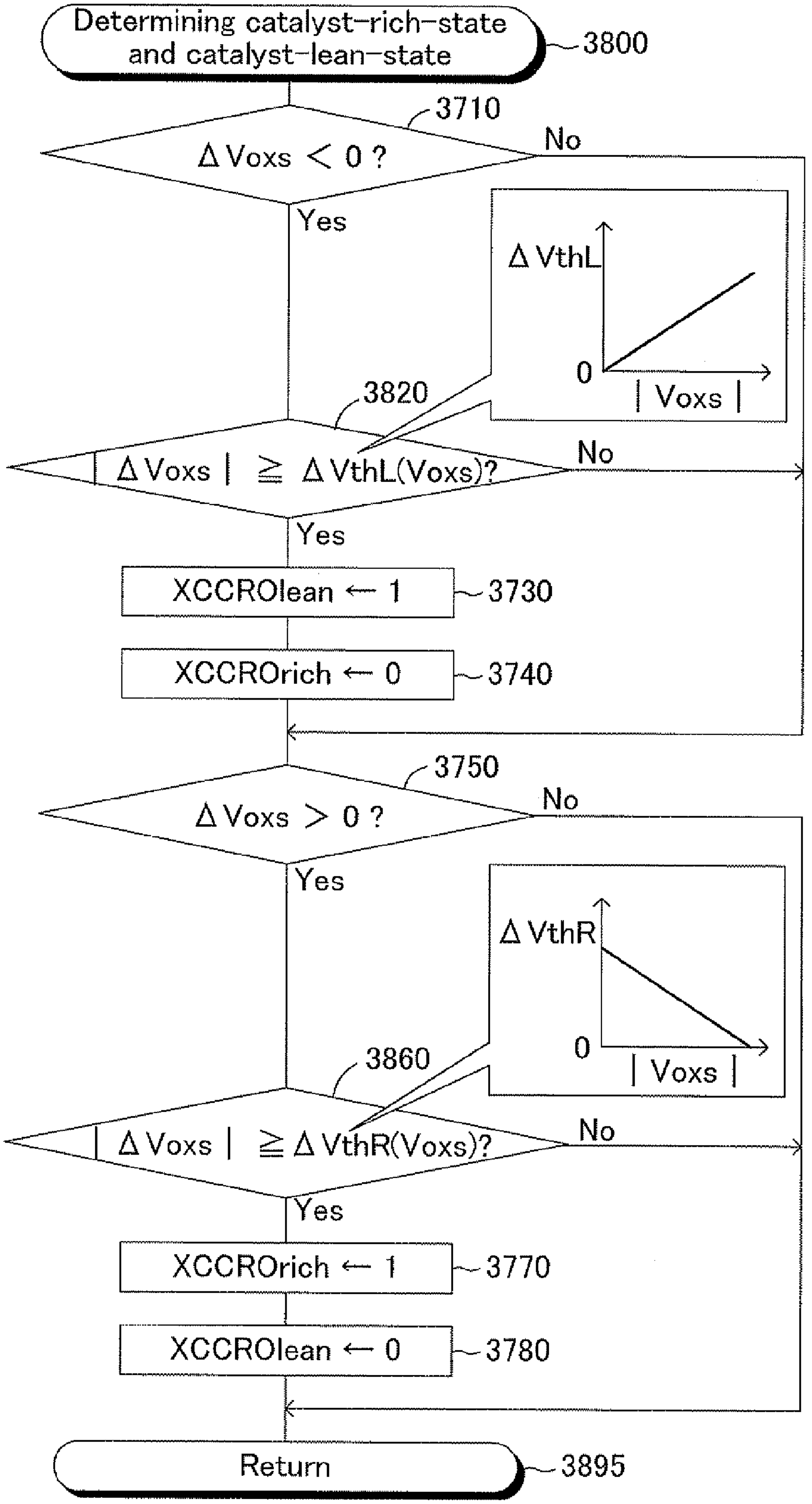
FIG. 38 is a flowchart showing a routine, executed by a CPU of an air-fuel ratio control apparatus for the internal combustion engine according to another modified embodiment of the present invention, for determining a catalyst-rich-state and a catalyst-lean-state.
Figure 39:
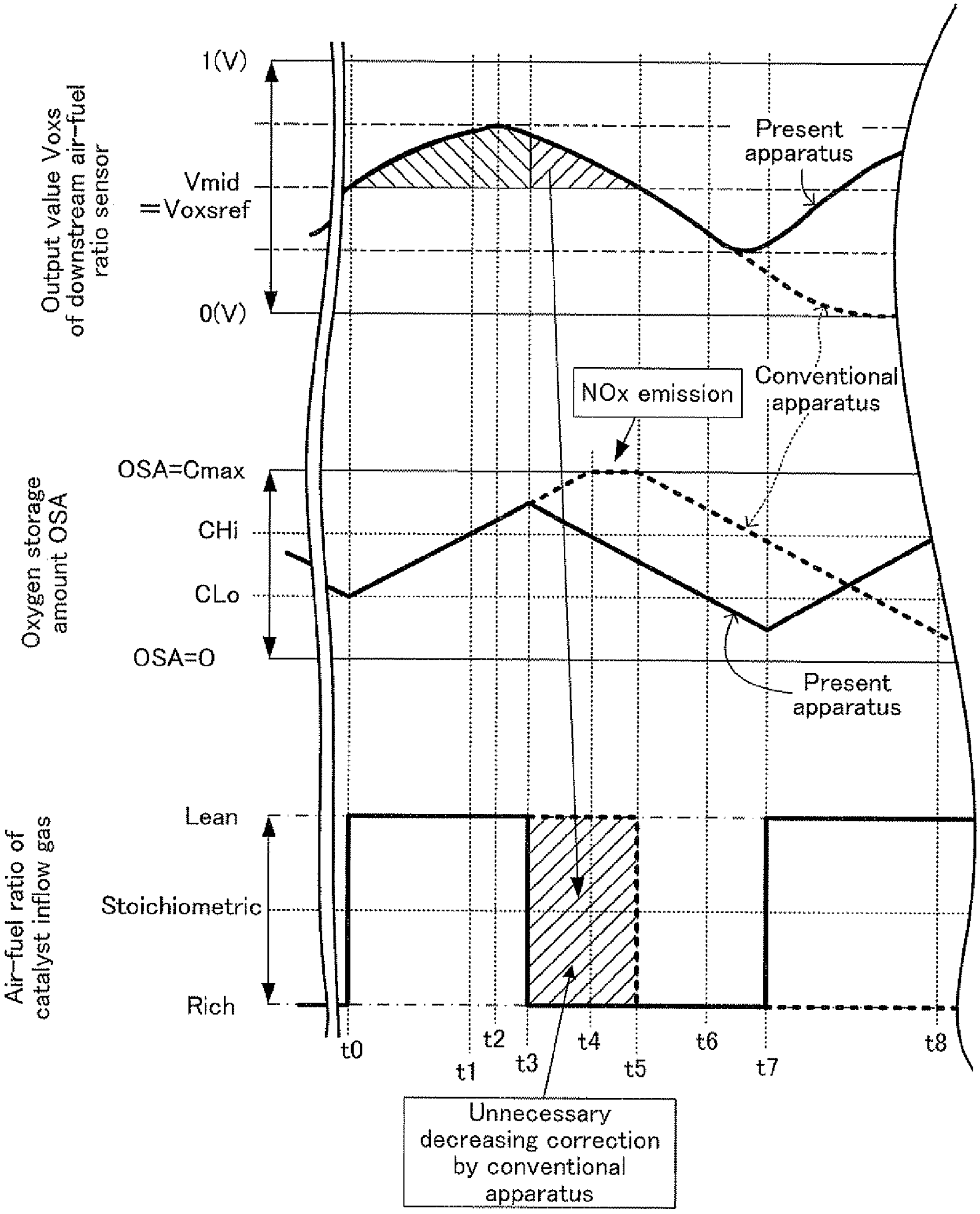
FIG. 39 is a timing chart for describing operations of the conventional air-fuel ratio control apparatus and the air-fuel ratio control apparatus according to the present invention.

In the routine shown in FIG. 38, step 3720 and step 3760 shown in FIG. 37 are replaced by step 3820 and step 3860, respectively. The CPU determines whether or not the magnitude |ΔVoxs| of the change rate is larger than or equal to a change rate threshold for determining a catalyst lean state ΔVthL(Voxs) at step 3820. The change rate threshold for determining a catalyst lean state ΔVthL(Voxs) is set to (at) a value which increases as the magnitude |ΔVoxs| (=Voxs) of the change rate becomes larger, as shown in a region in the vicinity of the step 3820.

This is because, the oxygen storage amount OSA of the catalyst 43 is likely to be smaller as the output Voxs is larger, and therefore, the CPU should determine that the catalyst 43 is in the state in which the oxygen is excessive only when the magnitude |Voxs| of the change rate is relatively large in a case in which the output Voxs is large.

In this manner, the CPU may be configured so as to determine that the catalyst 43 is in the state in which the oxygen is excessive, when the change rate ΔVoxs of the output value Voxs of the downstream air-fuel ratio sensor 56 is negative, and when the magnitude |ΔVoxs| of the change rate is larger than or equal to the "change rate threshold for determining a catalyst lean state ΔVthL which becomes larger as the output value Voxs becomes larger".

In addition, the CPU determines whether or not the magnitude |ΔVoxs| of the change rate is larger than or equal to a change rate threshold for determining a catalyst rich state ΔVthR(Voxs) at step 3860. The change rate threshold for determining a catalyst rich state ΔVthR(Voxs) is set to (at) a value which decreases as the magnitude |ΔVoxs| (=Voxs) of the change rate becomes larger, as shown in a region in the vicinity of the step 3860.

This is because, the oxygen storage amount OSA of the catalyst 43 is likely to be larger as the output Voxs is smaller, and therefore, the CPU should determine that the catalyst 43 is in the state in which the oxygen is short only when the magnitude |ΔVoxs| of the change rate is relatively large in a case in which the output Voxs is small.

In this manner, the CPU may be configured so as to determine that the catalyst 43 is in the state in which the oxygen is short, when the change rate ΔVoxs of the output value Voxs of the downstream air-fuel ratio sensor 56 is positive, and when the magnitude |ΔVoxs| of the change rate is larger than or equal to the "change rate threshold for determining a catalyst rich state ΔVthR which becomes smaller as the output value Voxs becomes larger".

That is, the air-fuel ratio control apparatus according to the embodiments and the modified examples of the present invention is an apparatus, which estimate the oxygen storage state of the catalyst 43 based on the output value Voxs of the downstream air-fuel ratio sensor 56 and the change rate ΔVoxs of the output value Voxs of the downstream air-fuel ratio sensor 56, and which controls, based on the estimated oxygen storage state, the air-fuel ratio of the gas flowing into the catalyst in such a manner that the oxygen storage amount varies between a first oxygen storage amount larger than "0" and a second oxygen storage amount which is larger than the first oxygen storage amount and smaller than the maximum oxygen storage amount.

The invention claimed is:

1. An air-fuel ratio control apparatus for an internal combustion engine, applied to said engine having a catalyst disposed in an exhaust passage of said engine, comprising:

a downstream air-fuel ratio sensor disposed in said exhaust passage and at a position downstream of said catalyst, said downstream air-fuel ratio sensor being an oxygen concentration cell type oxygen concentration sensor, which outputs a maximum output value when an amount of oxygen included in a catalyst outflow gas which is a gas flowing out from said catalyst is smaller than an amount necessary to oxidize unburnt substances included in said catalyst outflow gas, and which outputs a minimum output value when said amount of oxygen included in said catalyst outflow gas is larger than said amount necessary to oxidize said unburnt substances included in said catalyst outflow gas; and air-fuel ratio control means for controlling, based on an output value of said downstream air-fuel ratio sensor, an air-fuel ratio of a mixture supplied to said engine so as to change an air-fuel ratio of a catalyst inflow gas which is a gas flowing into said catalyst;

wherein, said air-fuel ratio control means is configured so as to perform a normal air-fuel ratio feedback control to control said air-fuel ratio of said mixture supplied to said engine so that:

a) said air-fuel ratio of said catalyst inflow gas becomes an air-fuel ratio richer than a stoichiometric air-fuel ratio when:
   i) said output value of said downstream air-fuel ratio sensor decreases, and
   ii) a magnitude of a change rate of said output value of said downstream air-fuel ratio sensor is larger than or equal to a first change rate threshold, even when the output value is larger than a middle value which is a mid-value of said maximum output value and said minimum output value, and b) said air-fuel ratio of said catalyst inflow gas becomes an air-fuel ratio leaner than the stoichiometric air-fuel ratio when:
   i) said output value of said downstream air-fuel ratio sensor increases, and
   ii) said magnitude of said change rate of said output value of said downstream air-fuel ratio sensor is larger than or equal to a second change rate threshold, even when the output value is smaller than said middle value.

2. The air-fuel ratio control apparatus for an internal combustion engine according to claim 1, wherein, said air-fuel ratio control means is configured so as to perform said normal air-fuel ratio feedback control when said output value of said downstream air-fuel ratio sensor is smaller than a predetermined first threshold and larger than a predetermined second threshold which is smaller than said first threshold, wherein said first threshold being set at a value between said middle value and said maximum output value, said middle value being said mid-value of said maximum output value and said minimum output value, and said first threshold being closer to said maximum output value than to said middle value, and said second threshold being set at a value between said middle value and said minimum output value, and being closer to said minimum output value than to said middle value.

3. The air-fuel ratio control apparatus for an internal combustion engine according to claim 2, wherein, said first threshold is set at a value equal to said output value of said downstream air-fuel ratio sensor, obtained when said air-fuel ratio of said catalyst inflow gas is an air-fuel ratio leaner than the stoichiometric air-fuel ratio, an oxygen storage amount of said catalyst is increasing, and said air-fuel ratio of said catalyst outflow gas is equal to the stoichiometric air-fuel ratio; and said second threshold is set at a value equal to said output value of said downstream air-fuel ratio sensor, obtained when said air-fuel ratio of said catalyst inflow gas is an air-fuel ratio richer than the stoichiometric air-fuel ratio, said oxygen storage amount of said catalyst is decreasing, and said air-fuel ratio of said catalyst outflow gas is equal to the stoichiometric air-fuel ratio.

4. The air-fuel ratio control apparatus for an internal combustion engine according to claim 2, wherein, said air-fuel ratio control means controls said air-fuel ratio of said mixture supplied to said engine so that said air-fuel ratio of said catalyst inflow gas becomes an air-fuel ratio leaner than the stoichiometric air-fuel ratio when said output value of said downstream air-fuel ratio sensor is larger than or equal to a value within a predetermined range, wherein the first threshold falls within the predetermined range.

5. The air-fuel ratio control apparatus for an internal combustion engine according to claim 2, wherein, said air-fuel ratio control means controls said air-fuel ratio of said mixture supplied to said engine so that said air-fuel ratio of said catalyst inflow gas becomes an air-fuel ratio richer than the stoichiometric air-fuel ratio when said output value of said downstream air-fuel ratio sensor is smaller than or equal to a value within a predetermined range, wherein the second threshold falls within the predetermined range.

6. The air-fuel ratio control apparatus for an internal combustion engine according to claim 2, wherein, said air-fuel ratio control means controls said air-fuel ratio of said mixture supplied to said engine, so that said air-fuel ratio of said catalyst inflow gas becomes an air-fuel ratio leaner than the stoichiometric air-fuel ratio when said output value of said downstream air-fuel ratio sensor is larger than or equal to a value within a predetermined range, wherein the first threshold falls within the predetermined range, and so that said air-fuel ratio of said catalyst inflow gas becomes an air-fuel ratio richer than the stoichiometric air-fuel ratio when said output value of said downstream air-fuel ratio sensor is smaller than or equal to a value within a predetermined range, wherein the second threshold falls within the predetermined range.

7. The air-fuel ratio control apparatus for an internal combustion engine according to claim 1, wherein, said air-fuel ratio control means comprises:

base fuel injection amount calculating means for obtaining an intake air amount introduced into said engine, and for calculating, based on said obtained intake air amount, a base fuel injection amount to have said air-fuel ratio of said mixture supplied to said engine coincide with the stoichiometric air-fuel ratio;

sub feedback amount calculating means for calculating, based on said output value of said downstream air-fuel ratio sensor, a sub feedback amount which is a feedback amount to correct said base fuel injection amount; and fuel injection means for injecting and supplying to said engine a fuel whose amount is obtained by correcting said base fuel injection amount with said sub feedback amount;

and wherein, said sub feedback amount calculating means is configured so as to calculate said sub feedback amount, in order to perform said normal air-fuel ratio feedback control so that said sub feedback amount becomes a value which increases said base fuel injection amount as said magnitude of said change rate of said output value of said downstream air-fuel ratio sensor becomes larger when said output value of said downstream air-fuel ratio sensor is decreasing, and that said sub feedback amount becomes a value which decreases said base fuel injection amount as said magnitude of said change rate of said output value of said downstream air-fuel ratio sensor becomes larger when said output value of said downstream air-fuel ratio sensor is increasing.

8. The air-fuel ratio control apparatus for an internal combustion engine according to claim 6, wherein, said air-fuel ratio control means comprises:

base fuel injection amount calculating means for obtaining an intake air amount introduced into said engine, and for calculating, based on said obtained intake air amount, a base fuel injection amount to have said air-fuel ratio of said mixture supplied to said engine coincide with the stoichiometric air-fuel ratio;

sub feedback amount calculating means for calculating, based on said output value of said downstream air-fuel ratio sensor, a sub feedback amount which is a feedback amount to correct said base fuel injection amount; and fuel injection means for injecting, and supplying to said engine a fuel whose amount is obtained by correcting said base fuel injection amount with said sub feedback amount;

and wherein, said sub feedback amount calculating means includes time-derivative term calculating means for calculating a time-derivative term of said sub feedback amount by multiplying said change rate of said output value of said downstream air-fuel ratio sensor by a predetermined time-derivative gain Kd, in order to perform said normal air-fuel ratio feedback control, wherein said time-derivative term of said sub feedback amount is a value, which increases said base fuel injection amount as said magnitude of said change rate of said output value of said downstream air-fuel ratio sensor becomes larger when said output value of said downstream air-fuel ratio sensor is decreasing, and which decreases said base fuel injection amount as said magnitude of said change rate of said output value of said downstream air-fuel ratio sensor becomes larger when said output value of said downstream air-fuel ratio sensor is increasing.

9. The air-fuel ratio control apparatus for an internal combustion engine according to claim 8, wherein, said sub feedback amount calculating means includes proportional term calculating means:

for calculating, when said output value of said downstream air-fuel ratio sensor is larger than or equal to said first threshold, as a proportional term of said sub feedback amount to control said air-fuel ratio of said mixture supplied to said engine so that said air-fuel ratio of said mixture supplied to said engine becomes an air-fuel ratio leaner than the stoichiometric air-fuel ratio by decreasing said base fuel injection amount, a sum of a value obtained by multiplying a difference between said first threshold and said output value of said downstream air-fuel ratio sensor by a lean control gain KpL, and a value obtained by multiplying a difference between a predetermined target value and said first threshold by a first gain KpS1, wherein said target value being set between said first threshold and said second threshold;

for calculating, when said output value of said downstream air-fuel ratio sensor is smaller than or equal to said second threshold, as said proportional term of said sub feedback amount to control said air-fuel ratio of said mixture supplied to said engine so that said air-fuel ratio of said mixture supplied to said engine becomes an air-fuel ratio richer than the stoichiometric air-fuel ratio by increasing said base fuel injection amount, a sum of a value obtained by multiplying a difference between said second threshold and said output value of said downstream air-fuel ratio sensor by a rich control gain KpR, and a value obtained by multiplying a difference between said target value and said second threshold by a second gain KpS2; and for calculating, when said output value of said downstream air-fuel ratio sensor is between said first threshold and said second threshold, a value obtained by multiplying a difference between said target value and said output value of said downstream air-fuel ratio sensor by a third gain KpS3, as said proportional term of said sub feedback control amount.

10. The air-fuel ratio control apparatus for an internal combustion engine according to claim 9, wherein, said proportional term calculating means is configured so as to:

set said target value to a first target value which is a value between said first threshold and said middle value, when said output value of said downstream air-fuel ratio sensor is larger than a value within a predetermined range including said first threshold;

set said target value to a second target value which is a value between said second threshold and said middle value, when said output value of said downstream air-fuel ratio sensor is smaller than a value within a predetermined range including said second threshold; and set said target value to a third target value which is a value between said first target value and said second target value, when said output value of said downstream air-fuel ratio sensor is between said value within said predetermined range including said first threshold and said value within said predetermined range including said second threshold.

11. The air-fuel ratio control apparatus for an internal combustion engine according to claim 9, wherein, said proportional term calculating means is configured so as to decrease a magnitude of said proportional term as said magnitude of said change rate of said output value of said downstream air-fuel ratio sensor becomes larger.

12. The air-fuel ratio control apparatus for an internal combustion engine according to claim 1, wherein, said air-fuel ratio control means comprises:

base fuel injection amount calculating means for obtaining an intake air amount introduced into said engine, and calculating, based on said obtained intake air amount, a base fuel injection amount to have said air-fuel ratio of said mixture supplied to said engine coincide with the stoichiometric air-fuel ratio;

an upstream air-fuel ratio sensor disposed in said exhaust passage and at a position upstream of said catalyst, said upstream air-fuel ratio sensor outputting an output value in accordance with an air-fuel ratio of a gas flowing through said position at which said upstream air-fuel ratio sensor is disposed;

main feedback amount calculating means for calculating a main feedback amount which corrects said base fuel injection amount so that an upstream-side air-fuel ratio represented by said output value of said upstream air-fuel ratio sensor coincides with the stoichiometric air-fuel ratio;

sub feedback amount calculating means for calculating a sub feedback amount which corrects said base fuel injection amount so as to increase said base fuel injection amount when said output value of said downstream air-fuel ratio sensor is decreasing, and corrects said base fuel injection amount so as to decrease said base fuel injection amount when said output value of said downstream air-fuel ratio sensor is increasing; and fuel injection means for injecting and supplying to said engine a fuel whose amount is obtained by correcting said base fuel injection amount with an air-fuel ratio correction amount formed of said main feedback amount and said sub feedback amount;

and wherein, said main feedback amount calculating means is configured so as to:

decrease a magnitude of said main feedback amount or set said magnitude of said main feedback amount at 0, when said main feedback amount is a value which decreases said base fuel injection amount while said output value is decreasing; and decrease said magnitude of said main feedback amount or set said magnitude of said main feedback amount at 0, when said main feedback amount is a value which increases said base fuel injection amount while said output value is increasing.

13. The air-fuel ratio control apparatus for an internal combustion engine according to claim 6, wherein, said air-fuel ratio control means comprises:

base fuel injection amount calculating means for obtaining an intake air amount introduced into said engine, and calculating, based on said obtained intake air amount, a base fuel injection amount to have said air-fuel ratio of said mixture supplied to said engine coincide with the stoichiometric air-fuel ratio;

an upstream air-fuel ratio sensor disposed in said exhaust passage and at a position upstream of said catalyst, said upstream air-fuel ratio sensor outputting an output value in accordance with an air-fuel ratio of a gas flowing through said position at which said upstream air-fuel ratio sensor is disposed;

main feedback amount calculating means for calculating a main feedback amount which corrects said base fuel injection amount so that an upstream-side air-fuel ratio represented by said output value of said upstream air-fuel ratio sensor coincides with the stoichiometric air-fuel ratio;

sub feedback amount calculating means for calculating a sub feedback amount which corrects said base fuel injection amount so as to increase said base fuel injection amount when said output value of said downstream air-fuel ratio sensor is decreasing, and corrects said base fuel injection amount so as to decrease said base fuel injection amount when said output value of said downstream air-fuel ratio sensor is increasing; and fuel injection means for injecting and supplying to said engine a fuel whose amount is obtained by correcting said base fuel injection amount with an air-fuel ratio correction amount formed of said main feedback amount and said sub feedback amount;

and wherein, said main feedback amount calculating means is configured so as to:

set said main feedback amount at 0, in a case in which said main feedback amount is a value which increases said base fuel injection amount when said output value of said downstream air-fuel ratio sensor is larger than or equal to a value within a range including said first threshold; and set said main feedback amount at 0, in a case in which said main feedback amount is a value which decreases said base fuel injection amount when said output value of said downstream air-fuel ratio sensor is smaller than or equal to a value within a range including said second threshold.

14. The air-fuel ratio control apparatus for an internal combustion engine according to claim 2, wherein, said air-fuel ratio control means includes stoichiometric upper limit value obtaining means for controlling said air-fuel ratio of said catalyst inflow gas so that said air-fuel ratio of said catalyst inflow gas is set to a predetermined lean air-fuel ratio leaner than the stoichiometric air-fuel ratio when said output value of said downstream air-fuel ratio sensor is equal to said maximum output value, and for obtaining thereafter, as said first threshold, said output value of said downstream air-fuel ratio sensor at a point in time when said magnitude of said change rate of said output value of said downstream air-fuel ratio sensor becomes minimum in a period up to a point in time when said output value of said downstream air-fuel ratio sensor reaches said minimum output value or a value obtained by adding a predetermined value to said minimum output value.

15. The air-fuel ratio control apparatus for an internal combustion engine according to claim 2, wherein, said air-fuel ratio control means includes stoichiometric lower limit value obtaining means for controlling said air-fuel ratio of said catalyst inflow gas so that said air-fuel ratio of said catalyst inflow gas is set to a predetermined rich air-fuel ratio richer than the stoichiometric air-fuel ratio when said output value of said downstream air-fuel ratio sensor is equal to said minimum output value, and for obtaining thereafter, as said second threshold, said output value of said downstream air-fuel ratio sensor at a point in time when said magnitude of said change rate of said output value of said downstream air-fuel ratio sensor becomes minimum in a period up to a point in time when said output value of said downstream air-fuel ratio sensor reaches said maximum output value or a value obtained by subtracting a predetermined value from said maximum output value.

16. The air-fuel ratio control apparatus for an internal combustion engine according to claim 1, wherein, said air-fuel ratio control means comprises:

base fuel injection amount calculating means for obtaining an intake air amount introduced into said engine, and calculating, based on said obtained intake air amount, a base fuel injection amount to have said air-fuel ratio of said mixture supplied to said engine coincide with the stoichiometric air-fuel ratio;

an upstream air-fuel ratio sensor disposed in said exhaust passage and at a position upstream of said catalyst, said upstream air-fuel ratio sensor outputting an output value in accordance with an air-fuel ratio of a gas flowing through said position at which said upstream air-fuel ratio sensor is disposed;

main feedback amount calculating means for calculating a main feedback amount which corrects said base fuel injection amount so that an upstream-side air-fuel ratio represented by said output value of said upstream air-fuel ratio sensor coincides with the stoichiometric air-fuel ratio;

sub feedback amount calculating means for calculating a sub feedback amount which corrects said base fuel injection amount so that said sub feedback amount increases said base fuel injection amount when said output value of said downstream air-fuel ratio sensor is decreasing, and that said sub feedback amount decreases said base fuel injection amount when said output value of said downstream air-fuel ratio sensor is increasing;

fuel injection means for injecting and supplying to said engine a fuel whose amount is obtained by correcting said base fuel injection amount with an air-fuel ratio correction amount formed of said main feedback amount and said sub feedback amount; and catalyst capability restoring means for obtaining an integrated value of an amount by which said base fuel injection amount is increased by said air-fuel ratio correction amount in a case when a state continues in which said air-fuel ratio correction amount is a value which increases said base fuel injection amount, and for controlling an amount of said fuel injected and supplied from said fuel injection means so that said air-fuel ratio of said mixture supplied to said engine becomes an air-fuel ratio leaner than the stoichiometric air-fuel ratio for a predetermined first catalyst-restoring-time, when said obtained integrated value reaches a predetermined increasing-amount-threshold, regardless of said air-fuel ratio correction amount.

17. The air-fuel ratio control apparatus for an internal combustion engine according to claim 1, wherein, said air-fuel ratio control means comprises:

base fuel injection amount calculating means for obtaining an intake air amount introduced into said engine, and calculating, based on said obtained intake air amount, a base fuel injection amount to have said air-fuel ratio of said mixture supplied to said engine coincide with the stoichiometric air-fuel ratio;

an upstream air-fuel ratio sensor disposed in said exhaust passage and at a position upstream of said catalyst, said upstream air-fuel ratio sensor outputting an output value in accordance with an air-fuel ratio of a gas flowing through said position at which said upstream air-fuel ratio sensor is disposed;

main feedback amount calculating means for calculating a main feedback amount which corrects said base fuel injection amount so that an upstream-side air-fuel ratio represented by said output value of said upstream air-fuel ratio sensor coincides with the stoichiometric air-fuel ratio;

sub feedback amount calculating means for calculating a sub feedback amount which corrects said base fuel injection amount so that said sub feedback amount increases said base fuel injection amount when said output value of said downstream air-fuel ratio sensor is decreasing, and that said sub feedback amount decreases said base fuel injection amount when said output value of said downstream air-fuel ratio sensor is increasing;

fuel injection means for injecting and supplying to said engine a fuel whose amount is obtained by correcting said base fuel injection amount with an air-fuel ratio correction amount formed of said main feedback amount and said sub feedback amount; and catalyst capability restoring means for obtaining an integrated value of an amount by which said base fuel injection amount is decreased by said air-fuel ratio correction amount in a case when a state continues in which said air-fuel ratio correction amount is a value which decreases said base fuel injection amount, and for controlling an amount of said fuel injected and supplied from said fuel injection means so that said air-fuel ratio of said mixture supplied to said engine becomes an air-fuel ratio richer than the stoichiometric air-fuel ratio for a predetermined second catalyst-restoring-time, when said obtained integrated value reaches a predetermined decreasing-amount-threshold, regardless of said air-fuel ratio correction amount.

18. The air-fuel ratio control apparatus for an internal combustion engine according to claim 6, wherein, said air-fuel ratio control means is configured so as to:

obtain a fluctuation frequency of said output value of said downstream air-fuel ratio sensor in a period in which said normal air-fuel ratio feedback control is being performed when said output value is a value smaller than said first threshold and larger than said second threshold; and perform an oxygen storage amount feedback control, in place of said normal air-fuel ratio feedback control, when said obtained fluctuation frequency becomes smaller than or equal to a predetermined threshold frequency, by estimating an oxygen storage amount of said catalyst, and by controlling said air-fuel ratio of said mixture supplied to said engine based on said estimated oxygen storage amount so that said estimated oxygen storage amount is maintained between a predetermined oxygen storage amount lower limit and a predetermined oxygen storage amount upper limit which is larger than said oxygen storage amount lower limit.

19. The air-fuel ratio control apparatus for an internal combustion engine according to claim 18, wherein, said air-fuel ratio control means is configured so as to:

stop said oxygen storage amount feedback control, when said output value of said downstream air-fuel ratio sensor becomes larger than or equal to said first threshold or becomes smaller than or equal to said second threshold while said oxygen storage amount feedback control is being performed; and start again a control of said air-fuel ratio of said mixture supplied to said engine based on said output value of said downstream air-fuel ratio sensor.

* * * * *